United States Patent [19]
Wilkinson et al.

[11] Patent Number: 5,966,528
[45] Date of Patent: Oct. 12, 1999

[54] SIMD/MIMD ARRAY PROCESSOR WITH VECTOR PROCESSING

[75] Inventors: Paul Amba Wilkinson, Apalachin; James Warren Dieffenderfer, Owego; Peter Michael Kogge, Endicott; Nicholas Jerome Schoonover, Tioga Center, all of N.Y.

[73] Assignee: International Business Machines Corporation, Armonk, N.Y.

[21] Appl. No.: 08/483,935

[22] Filed: Jun. 7, 1995

Related U.S. Application Data

[63] Continuation-in-part of application No. 08/301,278, Sep. 6, 1994, and a continuation-in-part of application No. 08/324,295, Nov. 17, 1994, Pat. No. 5,475,856, and a division of application No. 08/233,210, Apr. 26, 1994, abandoned, which is a continuation of application No. 07/888,680, May 22, 1992, abandoned, said application No. 08/301,278, is a continuation of application No. 07/611,594, Nov. 13, 1990, abandoned, said application No. 08/324,295, is a continuation of application No. 07/798,788, Nov. 27, 1991, abandoned.

[51] Int. Cl.⁶ ............................. G06F 17/16; G06F 15/80
[52] U.S. Cl. ........................ 395/563; 395/570; 395/379; 395/800
[58] Field of Search .................................... 395/800, 563, 395/570, 379

[56] References Cited

U.S. PATENT DOCUMENTS

| | | | |
|---|---|---|---|
| 3,537,074 | 10/1970 | Stokes et al. | 340/172 |
| 3,544,973 | 12/1970 | Borck et al. | 340/172.5 |

(List continued on next page.)

FOREIGN PATENT DOCUMENTS

| | | |
|---|---|---|
| 0132926 | 2/1985 | European Pat. Off. . |
| 0208497 | 6/1986 | European Pat. Off. . |
| 208457A2 | 6/1986 | European Pat. Off. . |
| 2223867 | 6/1986 | European Pat. Off. . |
| 340668A2 | 4/1989 | European Pat. Off. . |
| 428327A1 | 11/1990 | European Pat. Off. . |
| 429733A2 | 6/1991 | European Pat. Off. . |

(List continued on next page.)

OTHER PUBLICATIONS

T.A. Kriz and M.J. Marple, "Multi–Port Bus Structure With Fast Shared Memory", IBM Technical Disclosure Bulletin, vol. 27, No. 10A, pp., 5579–5580, Mar. 1985.

(List continued on next page.)

*Primary Examiner*—Richard L. Ellis
*Attorney, Agent, or Firm*—Lynn L. Augspurger; Morgan & Finnegan, L.L.P.

[57] ABSTRACT

A parallel array processor for massively parallel applications is formed with low power CMOS with DRAM processing while incorporating processing elements on a single chip. Eight processors on a single chip have their own associated processing element, significant memory, and I/O and are interconnected with a hypercube based, but modified, topology. These nodes are then interconnected, either by a hypercube, modified hypercube, or ring, or ring within ring network topology. Conventional microprocessor MMPs consume pins and time going to memory. The new architecture merges processor and memory with multiple PMEs (eight 16 bit processors with 32K and I/O) in DRAM and has no memory access delays and uses all the pins for networking. The chip can be a single node of a fine-grained parallel processor. Each chip will have eight 16 bit processors, each processor providing 5 MIPs performance. I/O has three internal ports and one external port shared by the plural processors on the chip. Significant software flexibility is provided to enable quick implementation of existing programs written in common languages. The scalable chip PME has internal and external connections for broadcast and asynchronous SIMD, MIMD and SIMIMD (SIMD/MIMD) with dynamic switching of modes. The chip can be used in systems which employ 32, 64 or 128,000 processors. Local and global memory functions can all be provided by the chips themselves, and the system can connect to and support other global memories and DASD.

10 Claims, 24 Drawing Sheets

U.S. PATENT DOCUMENTS

| | | | |
|---|---|---|---|
| 3,970,993 | 7/1976 | Finilla | 340/172.5 |
| 4,101,960 | 7/1978 | Stokes et al. | 364/200 |
| 4,107,773 | 8/1978 | Gilbreath et al. | 364/200 |
| 4,270,170 | 5/1981 | Reddaway | 364/200 |
| 4,314,349 | 2/1982 | Batcher | 364/716 |
| 4,338,675 | 7/1982 | Palmer et al. | 364/748 |
| 4,380,046 | 4/1983 | Fung | 364/200 |
| 4,394,726 | 7/1983 | Kohl | 364/200 |
| 4,412,303 | 10/1983 | Barnes et al. | 364/900 |
| 4,435,758 | 3/1984 | Lorie et al. | 364/200 |
| 4,467,422 | 8/1984 | Hunt | 364/200 |
| 4,468,727 | 8/1984 | Carrison | 364/200 |
| 4,498,133 | 2/1985 | Bolton et al. | 364/200 |
| 4,523,273 | 6/1985 | Adams, III et al. | 364/200 |
| 4,598,400 | 7/1986 | Hillis | 370/60 |
| 4,604,695 | 8/1986 | Widen et al. | 364/200 |
| 4,621,339 | 11/1986 | Wagner et al. | 364/200 |
| 4,622,650 | 11/1986 | Kullsch | 364/748 |
| 4,706,191 | 11/1987 | Hamstra et al. | 364/200 |
| 4,720,780 | 1/1988 | Dolecek | 364/200 |
| 4,736,291 | 4/1988 | Jennings et al. | 364/200 |
| 4,739,474 | 4/1988 | Holaztynski | 364/200 |
| 4,739,476 | 4/1988 | Fiduccia | 364/200 |
| 4,748,585 | 5/1988 | Chiarulli | 364/900 |
| 4,763,321 | 8/1988 | Calvignao et al. | 370/94 |
| 4,780,873 | 10/1988 | Matteyses | 370/94 |
| 4,783,738 | 11/1988 | Li et al. | 364/200 |
| 4,783,782 | 11/1988 | Morton | 371/11 |
| 4,805,091 | 2/1989 | Thiel et al. | 364/200 |
| 4,809,159 | 2/1989 | Sowa | 364/200 |
| 4,809,169 | 2/1989 | Sfarti et al. | 364/200 |
| 4,809,347 | 2/1989 | Nash et al. | 382/49 |
| 4,814,980 | 3/1989 | Peterson et al. | 364/200 |
| 4,825,359 | 4/1989 | Ohkami et al. | 364/200 |
| 4,831,519 | 5/1989 | Morton | 364/200 |
| 4,835,729 | 5/1989 | Morton | 364/200 |
| 4,841,476 | 6/1989 | Mitchell et al. | 364/900 |
| 4,847,755 | 7/1989 | Morrison et al. | 364/200 |
| 4,849,882 | 7/1989 | Aoyama et al. | 364/200 |
| 4,852,048 | 7/1989 | Morton | 364/200 |
| 4,855,903 | 8/1989 | Carleton et al. | 364/200 |
| 4,858,110 | 8/1989 | Miyata | 364/200 |
| 4,860,201 | 8/1989 | Stolfo et al. | 364/200 |
| 4,872,133 | 10/1989 | Leeland | 364/748 |
| 4,873,626 | 10/1989 | Gifford | 364/200 |
| 4,891,787 | 1/1990 | Gifford | 364/900 |
| 4,896,265 | 1/1990 | Fiduccia et al. | 364/200 |
| 4,901,224 | 2/1990 | Ewert | 364/200 |
| 4,903,260 | 2/1990 | Boettle | 370/60 |
| 4,905,143 | 2/1990 | Takahashi et al. | 364/200 |
| 4,907,148 | 3/1990 | Morton | 364/200 |
| 4,910,665 | 3/1990 | Mattheyses et al. | 364/200 |
| 4,916,652 | 4/1990 | Schwarz | 364/748 |
| 4,916,657 | 4/1990 | Morton | 364/900 |
| 4,920,484 | 4/1990 | Racade | 364/200 |
| 4,922,408 | 5/1990 | Davis et al. | 364/200 |
| 4,925,311 | 5/1990 | Neches et al. | 364/200 |
| 4,933,846 | 6/1990 | Humphrey et al. | 364/200 |
| 4,933,895 | 6/1990 | Grinberg et al. | 364/748 |
| 4,942,516 | 7/1990 | Hyatt | 364/200 |
| 4,942,517 | 7/1990 | Cok | 364/200 |
| 4,943,912 | 7/1990 | Aoyma et aal. | 364/200 |
| 4,956,772 | 9/1990 | Neches | 364/200 |
| 4,958,273 | 9/1990 | Anderson et al. | 364/200 |
| 4,964,032 | 10/1990 | Smith | 364/200 |
| 4,967,340 | 10/1990 | Dawes | 364/200 |
| 4,975,834 | 12/1990 | Xu et al. | 364/200 |
| 4,985,832 | 1/1991 | Grondalski | 364/200 |
| 4,992,926 | 2/1991 | Janke et al. | 364/134 |
| 4,992,933 | 2/1991 | Taylor | 364/200 |
| 5,005,120 | 4/1991 | Ruetz | 364/200 |
| 5,006,978 | 4/1991 | Neches | 364/200 |
| 5,008,815 | 4/1991 | Hillis | 364/200 |
| 5,008,882 | 4/1991 | Peterson et al. | 370/94.3 |
| 5,010,477 | 4/1991 | Omoda et al. | 364/200 |
| 5,016,163 | 5/1991 | Jesshope et al. | 364/200 |
| 5,020,059 | 5/1991 | Gorin et al. | 371/11.3 |
| 5,021,945 | 6/1991 | Morrison et al. | 364/200 |
| 5,038,282 | 8/1991 | Gilbert et al. | 364/200 |
| 5,038,386 | 8/1991 | Li | 382/49 |
| 5,041,189 | 8/1991 | Tamitani | 364/501 |
| 5,041,971 | 8/1991 | Carvey et al. | 364/200 |
| 5,045,995 | 9/1991 | Levinthal et al. | 364/200 |
| 5,047,917 | 9/1991 | Athas et al. | 364/200 |
| 5,049,982 | 9/1991 | Lee et al. | 357/81 |
| 5,056,000 | 10/1991 | Chang | 364/200 |
| 5,072,217 | 12/1991 | Georgiou et al. | 340/825.79 |
| 5,113,523 | 5/1992 | Colley et al. | 395/800 |
| 5,121,498 | 6/1992 | Gilbert et al. | 395/700 |
| 5,136,582 | 8/1992 | Firoozmand | 370/85.1 |
| 5,142,540 | 8/1992 | Glasser | 371/40.1 |
| 5,146,608 | 9/1992 | Hillis | 395/800 |
| 5,165,023 | 11/1992 | Gifford | 395/325 |
| 5,170,482 | 12/1992 | Shu et al. | 395/800 |
| 5,170,484 | 12/1992 | Gorodalski | 395/800 |
| 5,173,947 | 12/1992 | Chands et al. | 382/41 |
| 5,175,862 | 12/1992 | Phelps et al. | 395/800 |
| 5,175,865 | 12/1992 | Hillis | 395/800 |
| 5,181,017 | 1/1993 | Frey, Jr. et al. | 340/825.02 |
| 5,187,801 | 2/1993 | Zenios et al. | 395/800 |
| 5,189,665 | 2/1993 | Niehaus et al. | 370/458.1 |
| 5,197,130 | 3/1993 | Chen et al. | 395/325 |
| 5,212,773 | 5/1993 | Hillis | 395/200 |
| 5,212,777 | 5/1993 | Gove et al. | 395/375 |
| 5,218,676 | 6/1993 | Ben-Ayed et al. | 395/200 |
| 5,218,709 | 6/1993 | Fijany et al. | 395/800 |
| 5,230,079 | 7/1993 | Grondalski | 395/800 |
| 5,239,629 | 8/1993 | Miller et al. | 395/325 |
| 5,239,654 | 8/1993 | Ing-Simmons et al. | 395/800 |
| 5,251,097 | 10/1993 | Simmons et al. | 361/687 |
| 5,253,359 | 10/1993 | Spix et al. | 395/575 |
| 5,265,124 | 11/1993 | Staab et al. | 378/3 |
| 5,280,474 | 1/1994 | Nickolls et al. | 370/60 |
| 5,297,260 | 3/1994 | Kametani | 395/325 |
| 5,355,508 | 10/1994 | Kan | 395/800 |
| 5,367,636 | 11/1994 | Colley et al. | 395/200 |

FOREIGN PATENT DOCUMENTS

| | | |
|---|---|---|
| 460599A3 | 12/1991 | European Pat. Off. . |
| 485690A2 | 5/1992 | European Pat. Off. . |
| 493876A2 | 7/1992 | European Pat. Off. . |
| 2223867 | 4/1990 | United Kingdom . |
| 8909967 | 4/1988 | WIPO . |
| 9206436 | 4/1992 | WIPO . |

OTHER PUBLICATIONS

H.P. Bakoglu, "Second–Level Shared Cache Implementation For Multiprocessor Computers With A Common Interface For The Second–Level Shared Cache And The Second–Level Private Cache", *IBM Technical Disclosure Bulletin*, vol. 33, No. 11, pp. 362–365, Apr. 1991.

Mansingh et al., "System Level Air Flow Analysis for a Computer System Processing Unit", *Hewlett–Packard Journal*, vol. 41, No. 5, Oct. 1990, pp. 82–87.

Tewksbury et al., "Communication Network Issues and High–Density Interconnects in Large–Scale Distributed Computing Systems", *IEEE Journal on Selected Areas in Communication*, vol. 6 No. 3, Apr. 1988, pp. 587–607.

Boubekeur et al., "Configuring A Wafer–Scale Two–Dimensional Array of Single–Bit Processors", Computer, vol. 2, Issue 4, Apr. 1992, pp. 29–39.

Korpiharju et al., "TUTCA Configurable Logi Cell Array Architecture" IEEE, Sep. 1991, pp. 3–3.1–3–3.4.

C.K. Baru and S.Y.W. Su, "The Architecture of SM3: A Dynamically Partitionable Multicomputer System", IEEE Transactions on Computers, vol. C–35, No. 9, pp. 790–802, Sep. 1986.

S.P. Booth et al., "An Evaluation of the Melko Computing Surface for HEP Fortran Farming*", Computer Physics Communications 57, pp. 486–491, 1989.

S.R. Colley, "Parallel Solutions to Parallel Problems", Research & Development, pp. 42–45, Nov. 21, 1989.

J.R. Nickolls, "The Design of the MasPar MP–1: A Cost Effective Massively Parallel Computer", 1990 IEEE, pp. 25–28.

J.F. Prins and J.A. Smith, "Parallel Sorting of Large Arrays on the MasPar MP–1", The 3rd Symposium on the Frontiers of Massively Parallel Computation, pp. 59–64, Oct., 1990.

J.B. Rosenberg and J.D. Becher, "Mapping Massive SMD Parallelism onto Vector Architecture for Simulation", Software–Practice and Experience, vol. 19(8), pp. 739–756, Aug. 1989.

J.C. Tilton, "Porting an Interactive Parallel Region Growing Algorithm from the MPP to the MasPar MP", The 3rd Symposium on the Frontiers of Massively Parallel Computation, pp. 170–173, Oct., 1990.

"Sequent Computer Systems Balance and Symmetry Series", Faulkner Technical Reports, Inc., pp. 1–6, Jan., 1988.

"Symmetry 2000/400 and 2000/700 with the DYNIX/ptx Operation System", Sequant Computer Systems Inc.

"Symmetry 2000 Systems—Foundation for Information Advantage", Sequent Computer Systems Inc.

"Our Customers Have Something That Gives Them an Unfair Advantage", The nCUBE Parallel Software Environment, nCUBE Corporation.

Y.M. Leung, "Parallel Technology Mapping With Identification of Cells for Dynamic Cell Generation", Dissertation, Syracuse University, May 1992.

"The Connection Machine CM–5 Technical Summary", Thinking Machines Corporation, Oct., 1991.

Fineberg et al., "Experimental Analysis of a Mixed–Mode Parallel Architecture Using Bitonic Sequences Sorting", *Journal of Parallel And Distributed Computing*, Mar. 1991, pp. 239–251.

T. Bridges, "The GPA Machine: A Generally Partitionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D.A. Nicole, "Esprit Project 1085 Reconfigurable Transputer Processor Architecture", CONPAR 88 Additional Papers, Sep. 1988, pp. 12–39.

E. DeBenedictis and J.M. del Rosario, "nCUBE Parelle I/O Software", IPCCC '92, 1992 IEEE, pp. 0017–0124.

T.H. Dunigan, Hypercube Clock Synchronization: Concurrency: Practice and Experience, vol. 4(3), pp. 257–268, May 1992.

T.H. Dunigan, "Performance of the Intel IPSC/860 and Neubo 6400 hypercubes*", Parallel Computing 17, pp. 1285–1302, 1991.

D.D. Gajaki and J.K. Peir, "Essential Issues in Multiprocessor Systems", 1985 IEEE, pp. 9–27, Jun. 1985.

A. Holman, "The Meiko Computing Surface: A Parallel & Scalable Open Systems Platform for Oracle", A Study of a Parallel Database Machine and its Performance—The NCR/Teradata DBC/1012, pp. 96–114.

Baba et al., "A Parallel Object–Oriented Total Architecture: A–NET", Proceedings Supercomputing, Nov. 1990, pp. 276–285.

Mitchell et al., "Architectural Description of a New, Easily Expandable Self–Routing Computer Network Topology", IEEE INFOCOM, Apr. 1989, pp. 918–988.

K. Padmanabhan, "Hierarchical Communication in Cube–Connected Multiprocessors", The 10th International Conference on Distributed Computing Systems, May 1990, pp. 270–277.

Nudd et al., "An Heterogeneous M–SIMD Architecture for Kalman Filter Controlled Processing of Images Sequences", *IEEE* 1992, pp. 842–845.

Li et al., "Polmorphic–Torus Network", IEEE Transactions on Computers, vol. 38, No. 9, Sep. 1989 pp. 1345–1351.

Li et al., "Sparse Matrix Vector Multiplication of Polymorphic–Torus", IBM Technical Disclosure Bulletin, vol. 32, No. 3A, Aug. 1989, pp. 233–238.

Li et al., "Parallel Local Operator Engine and Fast P300", IBM Tech. Disc. Bulletin, vol. 32, No. 8B, Jan. 1990, pp. 295–300.

R. Duncan, "A Survey of Parallel Computer Architectures", IEEE, Feb. 90' pp. 5–16.

C.R. Jesshope et al., "Design of SIMD Microprocessor Array", UMI Article Clearing house, Nov. 88'.

Sener Ilgen & Issac Schers, "Parallel Processing on VLSI Associative Memory", NSF Award #ECS–8404627, pp. 50–59.

H. Stone, "Introduction to Computer Architecture", Science Research Associates, 1975, Ch. 8, pp. 318–374.

R.M. Lea, "WASP: A WSI Associative String Processor" Journal of VLSI Signal Processing, May 1991, No. 4, pp. 271–285.

Lea, R.M., "ASP Modules: Cost–Effective Building–Blocks for Real–Time DSP Systems", Journal of VLSI Signal Processing, vol. 1, No. 1, Aug. 1989, pp. 69–84.

Isaac D. Scherson, et al., "Bit–Parallel Arithmetic in a Massively–Parallel Associative Processor", *IEEE*, Vo. 41, No. 10, Oct. 1992.

Supreat Singh and Jia–Yuan Han, "Systolic arrays", IEEE, Feb. 1991.

H. Richter and G. Raupp, "Control of a Tokamak Fusion Experiment by a Set of Multitop Parallel Computers", IEEE vol. 39, 1992, pp. 192–197.

Higuchi et al., "IXM2: A Parallel Associative Processor for Semantic Net Processing—Preliminary Evaluation —", IEEE, Jun. 1990, pp. 667–673.

Frison et al., "Designing Specific Systolic Arrays with the AP115C Chip", IEEE 1990, xii+808pp., pp. 505–517.

Berg et al., "Instruction Execution Trade–Offs for SIMD vs. MIMD vs. Mixed Mode Parallelism", IEEE Feb. 1991, pp. 301–308.

Raghaven et al., "Fine Grain Parallel Processors and Real–Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R.M. Lea, "ASP: A Cost–effective Parallel Microcomputer", IEEE Oct. 1988, pp. 10–29.

Mark A. Nichols, "Data Management and Control–Flow Constructs in a SIMD/SPMD Parallel Language/Compiler", IEEE, Feb. 1990, pp. 397–406.

Will R. Moore, "VLSI For Artificial Intelligence", Kluwer Academic Publishers, Ch. 4.1.

Mosher et al., "A Software Architecture for Image Processing on a Medium–Grain Parallel Machine", SPIE vol. 1659 Image Processing and Interchange, 1992/279.

*Patent Abstracts of Japan*, vol. 8, No. 105, May 17, 1984, p. 274, App. No. JP–820 125 341 (Tokyo Shibaura Denki KK) Jan. 27, 1984.

W.D. Hillis, *"The Connection Machine"*, The MIT Press, Chapters 1, 3, and 4.

"Joho–syori", vol. 26(3), 1985–8, pp. 213–225, (Japanese).

S.P. Booth et al., "Large Scale Applications of Transputers in HEP: The Edinburgh Concurrent Supercomputer Project", Computer Physics Communications 57, pp. 101–107, 1989.

Fineberg et al., "Experimental Analysis of Communication/Data–Conditional Aspects of a Mixed–Mode Parallel Architecture via Synthetic Computations", *Proceeding Supercomputing '90*, Nov. 1990, pp. 647–646.

Kan et al., "Parallel Processing on the CAP: Cellular Array Processor", *COMPCON 84*, Sep. 16, 1984, pp. 239–244.

Ezzedine et al., "A 16–bit Specialized Processor Design", *Integration The VLSI Journal*, vol. 6 No. 1, May 1988, pp. 101–110.

A. Mudrow, "High Speed Scientific Arithmetic Using a High Performance Sequencer", *Electro*, vol. 6, No. 11, 1986, pp. 1–5.

Alleyne et al., "A Bit–Parallel, Word–Parallel, Massively Parallel Associatie Processor for Scientific Computing", *Third Symposium on the Frontiers of Massive Parallel Computation*, Oct. 8–10, 1990, pp. 176–185.

Jesshoppe et al., "Design of SIMD Microprocessor Array", *IEEE Proceedings*, vol. 136, May 1989, pp. 197–204.

DeGroot et al., "Image Processing Using the Sprint Multiprocessor", *IEEE*, 1989, pp. 173–176.

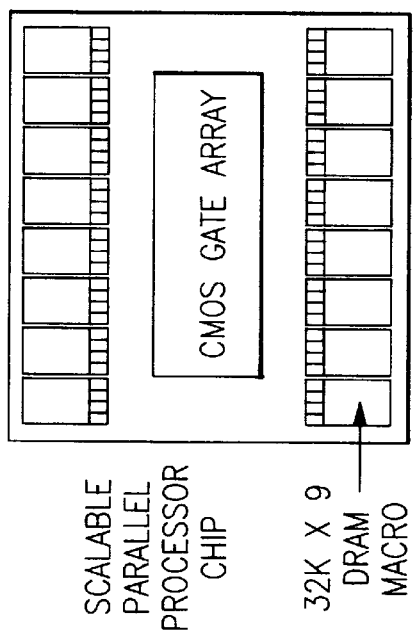
FIG. 2
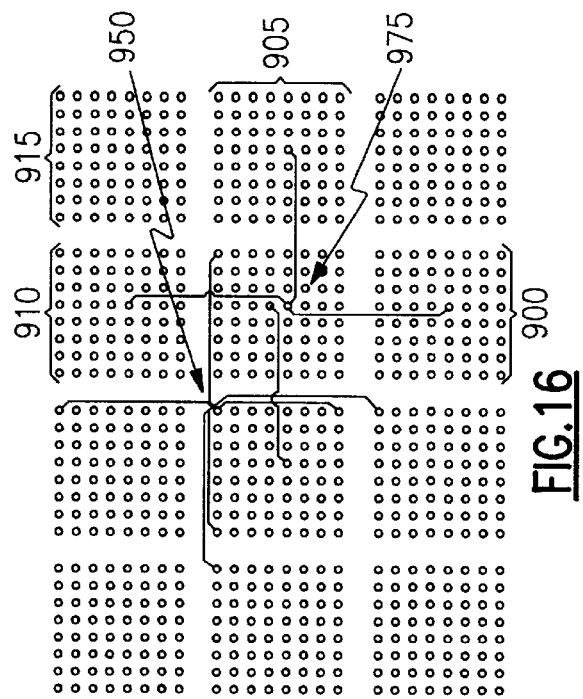
FIG. 16
FIG. 4

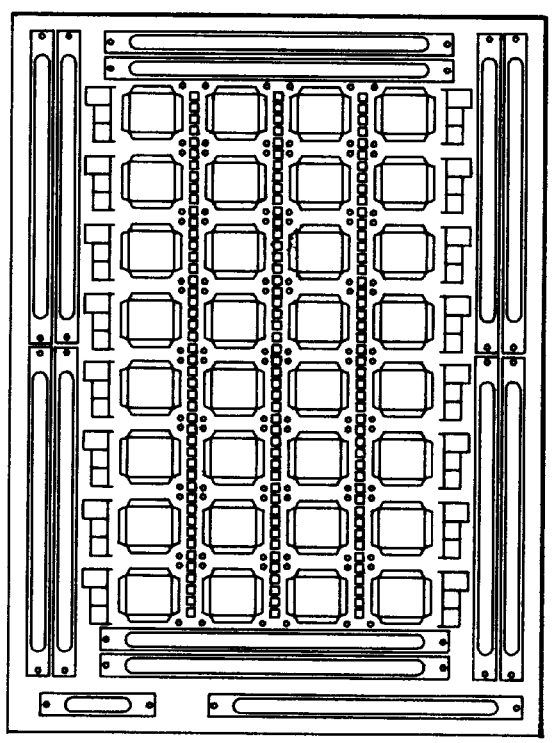
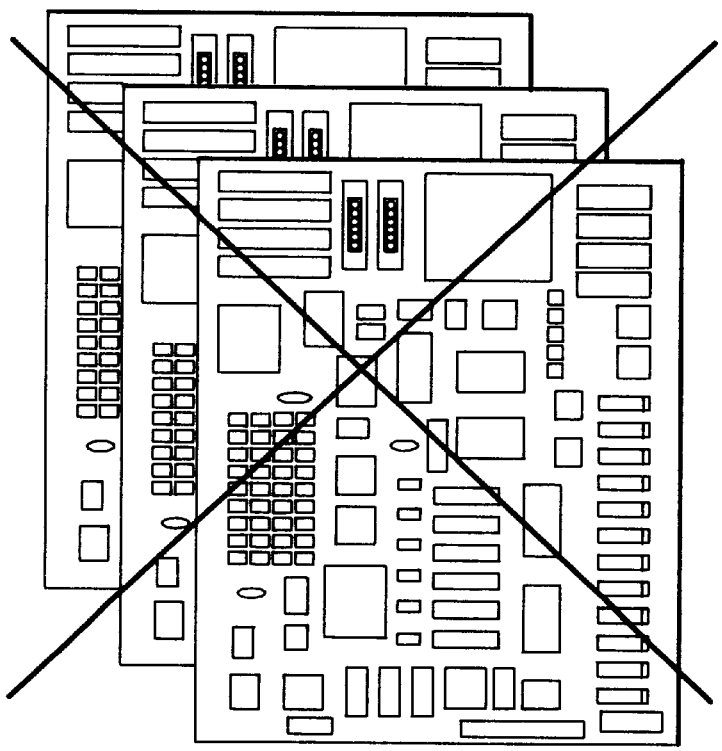
FIG.3

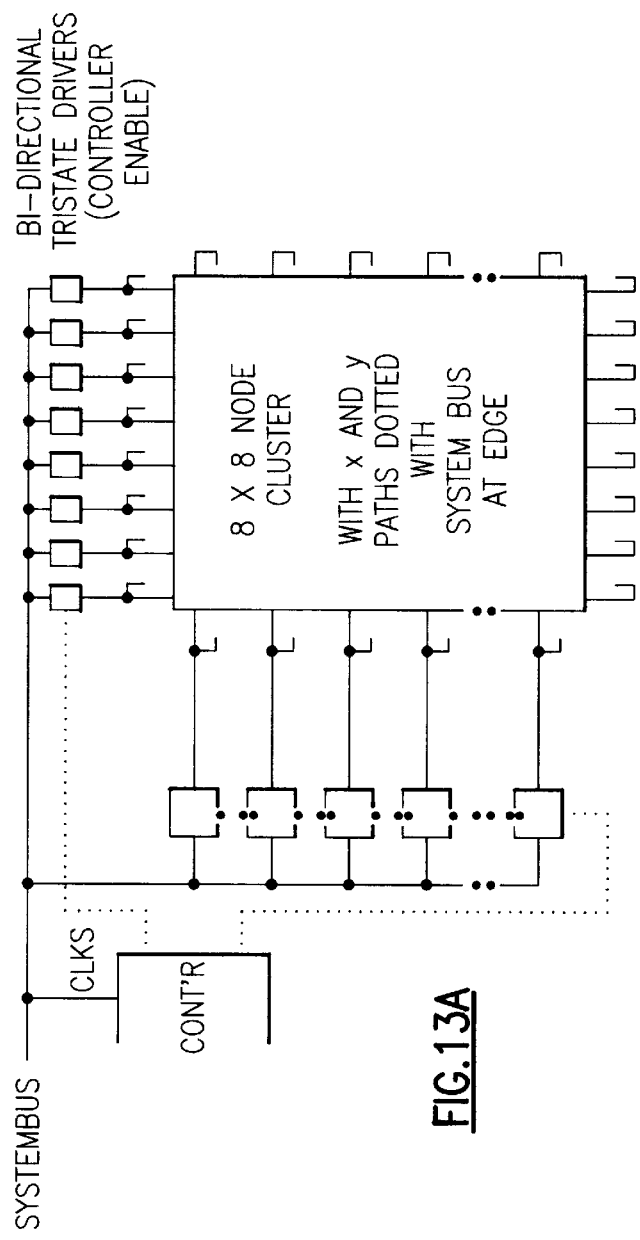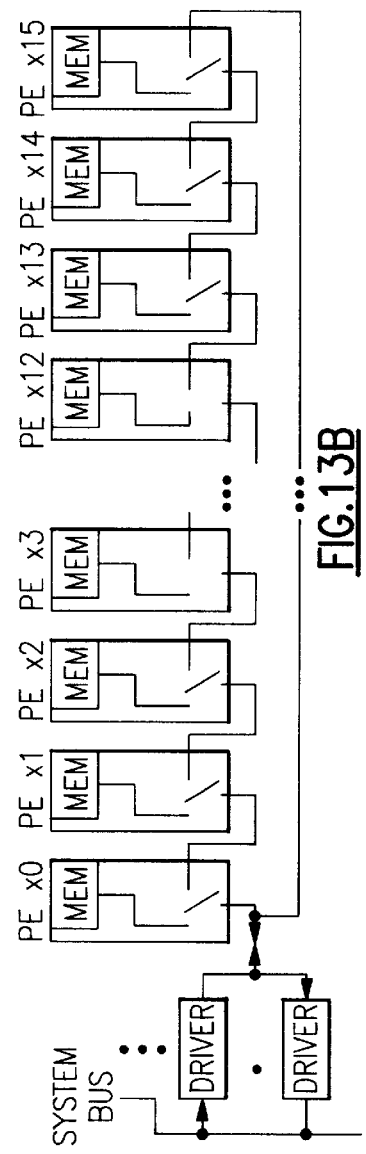

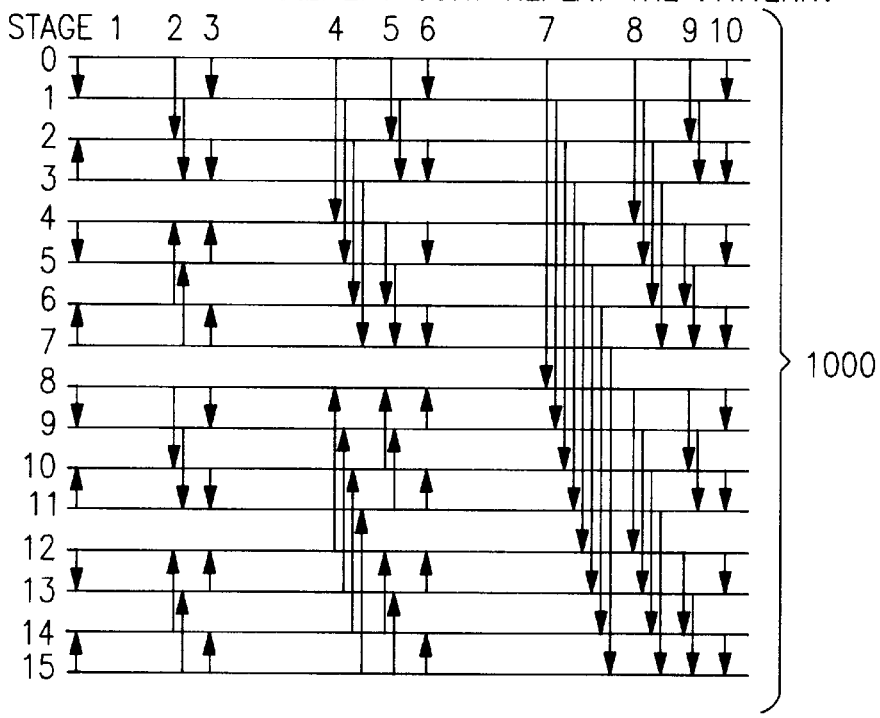

HOW WOULD A 16 ELEMENT SORT REPEAT THE PATTERN?

FOR SORTING n DATA ELEMENTS (n ∈ {$2^i$ : i ∈ N, $2^i$ ≤ # OF PE'S})

do I = 0 to ($\log_2 n$) − 1    do J = 0 to I
  if (PE#/$2^i$ − J) %2 = 0
    then TARGET = PE#+2 − J     else TARGET = PE#2 − J
  send DATA to TARGET
  receive data store in TEMP (if data is not available − wait)
  if (2(($\frac{PE\#}{2^i + 1}$) %2) + (($\frac{PE\#}{2^i + 1}$) %2) +1) %2 = 0
    then if TEMP < DATA then DATA = TEMP else NOP
    then if TEMP > DATA then DATA = TEMP else NOP
end both do's

FIG.17

SIMD/MIMD ARRAY PROCESSOR WITH VECTOR PROCESSING

CROSS REFERENCE TO RELATED APPLICATIONS

This is a divisional of application Ser. No. 08/233,210 filed Apr. 26, 1994 now abandoned.

The present application claims priority and is a continuation-in-part of the following related Patents and co-pending Patent Applications:

U.S. patent application Ser. No. 08/301,278, filed Sep. 6, 1994, which is a continuation of application Ser. No. 07/611,594, filed Nov. 13, 1990, now abandoned, of J. Dieffenderfer et al., entitled "Parallel Associative Processor System;" and U.S. patent application Ser. No. 08/324,295, now U.S. Pat. No. 5,475,856, filed Nov. 17, 1994, which is a continuation of application Ser. No. 07/798,788, filed Nov. 27, 1991, now abandoned, of P. Kogge entitled "Dynamic Multi-Mode Parallel Processor Array;" and a divisional of U.S. patent application Ser. No. 08/233,210, filed Apr. 26, 1994, which is a continuation of application Ser. No. 07/888,680, filed May 22, 1992, now abandoned, of Wilkinson et al. entitled "Multi-PME Parallel Processor;".

In addition, this application is related to the following applications filed concurrently herewith:

U.S. patent application Ser. No. 08/558,763 filed Nov. 15, 1995, which is a continuation of application Ser. No. 08/356,039 filed Dec. 14, 1994 now abandoned, which was a continuation of application Ser. No. 08/274,127 filed Jul. 12, 1994 now abandoned, which was a continuation of application Ser. No. 07/887,718 filed May 22, 1992 now abandoned, of P. Wilkinson et al., entitled "SIMIMD Array Processing System";

U.S. patent application Ser. No. 08/460,515 filed Jun. 1, 1995, which is a continuation of application Ser. No. 07/887,514 filed May 22, 1992 now abandoned, of P. Wilkinson et al., entitled "Floating Point For A SIMD Array Machine";

U.S. patent application Ser. No. 08/431,617 filed May 1, 1995 now abandoned, which is a continuation of application Ser. No. 07/887,455 filed May 22, 1992 now abandoned, of P. Wilkinson et al., entitled "Array Processor Having Grouping of SIMID Pickets";

U.S. patent application Ser. No. 08/458,859 filed Jun. 1, 1995, which is a continuation of application Ser. No. 07/887,456 filed May 22, 1992 now abandoned, of P. Wilkinson et al., entitled "Slide Network For An Array Processor";

U.S. patent application Ser. No. 08/430,931 filed Jun. 7, 1995, which is a continuation of application Ser. No. 07/887,256 filed May 22, 1992 now abandoned, of P. Wilkinson et al., entitled "Picket Autonomy On A SIMD Machine";

U.S. patent application Ser. No. 08/292,943 filed Aug. 18, 1994, which is a continuation of application Ser. No. 07/887,459 filed May 22, 1992 now abandoned, of P. Wilkinson et al., entitled "Controller For A SIMD/MIMD Processor Array"; and U.S. patent application Ser. No. 08/430,708 filed Apr. 27, 1995 now U.S. Pat. No. 5,630,162, which is a continuation of application Ser. No. 07/887,997 filed May 22, 1992 now abandoned, of P. Wilkinson et al., entitled "Array Processor Dotted Communication Network Based On H-DOTS".

Further this application is related to:

U.S. patent application Ser. No. 07/887,630 filed May 22, 1992 now U.S. Pat. No. 5,590,345, of T. Barker, et al., entitled "Advanced Parallel Array Processor";

U.S. patent application Ser. No. 08/459,374 filed Jun. 2, 1995 now U.S. Pat. No. 5,625,836, which is a continuation of application Ser. No. 07/888,000 filed May 22, 1992 now abandoned, of T. Barker, entitled "SIMD/MIMD Processing Memory Element";

U.S. patent application Ser. No. 08/459,380 filed Jun. 2, 1995 now abandoned, which is a continuation of application Ser. No. 07/993,255 filed Dec. 18, 1992 now abandoned, of T. Barker, entitled "PME Store and Forward/Circuit Switched Mode";

U.S. patent application Ser. No. 08/468,500 filed Jun. 6, 1995, which is a continuation of application Ser. No. 07/887,508 filed May 22, 1992 now abandoned, of T. Barker, entitled "Fully Distributed Processing Memory Element";

U.S. patent application Ser. No. 08/519,859 filed Aug. 25, 1995 now U.S. Pat. No. 5,588,152, which is a continuation of application Ser. No. 08/380,230 filed Jan. 30, 1995 now abandoned, which was a continuation of application Ser. No. 07/877,612 filed May 22, 1992 now abandoned, of M. Dapp, et al., entitled "Advanced Parallel Processor Including Advanced Support Hardware";

U.S. patent application Ser. No. 08/412,025 filed Mar. 28, 1995 now abandoned which is a continuation of application Ser. No. 07/587,512 filed May 22, 1992 now U.S. Pat. No. 5,060,108, of M. Dapp, et al., entitled "Advanced Parallel Array Processor Computer Package";

U.S. patent application Ser. No. 08/282,101 filed Jul. 28, 1994, which is a continuation of application Ser. No. 07/888,684 filed May 22, 1992 now abandoned, of T. Barker, et al., entitled "N-Dimensional Modified Hypercube"; and U.S. patent application Ser. No. 08/430,114 filed Apr. 27, 1995, which is a continuation of application Ser. No. 887,258 filed May 22, 1992 now abandoned, of M. Dapp, et al., entitled "APAP I/O Programmable Router".

U.S. patent application Ser. No. 08/400,687 filed Mar. 8, 1995 now U.S. Pat. No. 5,617,577, which is a continuation of U.S. patent application Ser. No. 07/887,259 filed May 22, 1992 now abandoned, of T. Barker et al. entitled "APAP I/O Zipper Connection".

These co-pending applications and the present application are owned by one and the same assignee, International Business Machines Corporation of Armonk, N.Y.

The descriptions set forth in these co-pending applications are incorporated into the present application by reference.

CROSS REFERENCE TO OTHER PATENTS AND CO-PENDING PATENT APPLICATIONS

Other commonly owned Patents also assigned to the same assignee as the present application and co-pending at the time of filing include:

U.S. Pat. No. 4,992,933 of J. Taylor entitled "SIMD Array Processor With Global Instruction Control And Reprogrammable Instruction Decoders" which issued Feb. 12, 1991;

U.S. Pat. No. 5,257,395 of H. Li entitled "Methods And Circuit For Implementing An Arbitrary Graph On A Polymorphic Mesh" which issued Oct. 26, 1993;

U.S. Pat. No. 5,410,727 of R. Jaffe et al. entitled "Input/Output System For A Massively Parallel, Single Instruction, Multiple Data (SIMD) Computer Providing For The Simultaneous Transfer Of Data Between A Host Computer Input/Output System And All SIMD Memory Devices" which issued on Apr. 25, 1995;

U.S. Pat. No. 5,457,789 of W. Dietrich, Jr. et al. entitled "Method And Apparatus For Performing Memory Protection Operations In A Single Instruction, Multiple Data System" which issued Oct. 10, 1995; and U.S. Pat. No. 5,313,645 of D. Rolfe entitled "Method For Interconnecting And System Of Interconnected Processing Elements By Controlling Network Density" which issued May 17, 1994.

All above referenced co-pending applications are also are owned by one and the same assignee, namely, International Business Machines Corporation of Armonk, N.Y. The descriptions set forth in these co-pending applications are also incorporated by reference.

FIELD OF THE INVENTIONS

The invention relates to computer and computer systems and particularly to parallel array processors. In accordance with the invention, multi-PME parallel processor may be incorporated on a single semiconductor silicon chip. This chip forms a basis for the systems described which are capable of massively parallel processing of complex scientific and business applications.

REFERENCES USED IN THE DISCUSSION OF THE INVENTIONS

In the detailed discussion of the invention, other works will be referenced, including references to our own unpublished works which are not Prior Art, which will aid the reader in following the discussion.

GLOSSARY OF TERMS

ALU

ALU is the arithmetic logic unit portion of a processor.

Array

Array refers to an arrangement of elements in one or more dimensions. An array can include an ordered set of data items (array element) which in languages like Fortran are identified by a single name. In other languages such a name of an ordered set of data items refers to an ordered collection or set of data elements, all of which have identical attributes. A program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations and when parallel can each independently and in parallel execute the operations required. Generally, arrays may be thought of as grids of processing elements. Sections of the array may be assigned sectional data, so that sectional data can be moved around in a regular grid pattern. However, data can be indexed or assigned to an arbitrary location in an array.

Array Director

An Array Director is a unit programmed as a controller for an array. It performs the function of a master controller for a grouping of functional elements arranged in an array.

Array Processor

There two principal types of array processors—multiple instruction multiple data (MIMD) and single instruction multiple data (SIMD). In a MIMD array processor, each processing element in the array executes its own unique instruction stream with its own data. In a SIMD array processor, each processing element in the array is restricted to the same instruction via a common instruction stream; however, the data associated with each processing element is unique. Our preferred array processor has other characteristics. We call it Advanced Parallel Array Processor, and use the acronym APAP.

Asynchronous

Asynchronous is without a regular time relationship; the execution of a function is unpredictable with respect to the execution of other functions which occur without a regular or predictable time relationship to other function executions. In control situations, a controller will address a location to which control is passed when data is waiting for an idle element being addressed. This permits operations to remain in a sequence while they are out of time coincidence with any event.

BOPS/GOPS

BOPS or GOPS are acronyms having the same meaning—billions of operations per second. See GOPS.

Circuit Switched/Store Forward

These terms refer to two mechanisms for moving data packets through a network of nodes. Store Forward is a mechanism whereby a data packet is received by each intermediate node, stored into its memory, and then forwarded on towards its destination. Circuit Switch is a mechanism whereby an intermediate node is commanded to logically connect its input port to an output port such that data packets can pass directly through the node towards their destination, without entering the intermediate node's memory.

Cluster

A cluster is a station (or functional unit) which consists of a control unit (cluster controller) and the hardware (which may be terminals, functional units, or virtual components) attached to it. Our Cluster includes an array of PMEs sometimes called a Node array. Usually a cluster has 512 PMEs.

Our Entire PME node array consists of a set of clusters, each cluster supported by a cluster controller (CC).

Cluster Controller

A cluster controller is a device that controls input/output (I/O) operations for more than one device or functional unit connected to it. A cluster controller is usually controlled by a program stored and executed in the unit as it was in the IBM 3601 Finance Communication Controller, but it can be entirely controlled by hardware as it was in the IBM 3272 Control Unit.

Cluster Synchronizer

A cluster synchronizer is a functional unit which manages the operations of all or part of a cluster to maintain synchronous operation of the elements so that the functional units maintain a particular time relationship with the execution of a program.

Controller

A controller is a device that directs the transmission of data and instructions over the links of an interconnection network; its operation is controlled by a program executed by a processor to which the controller is connected or by a program executed within the device.

CMOS

CMOS is an acronym for Complementary Metal-Oxide Semiconductor technology. It is commonly used to manufacture dynamic random access memories (DRAMs). NMOS is another technology used to manufacture DRAMS. We prefer CMOS but the technology used to manufacture the APAP is not intended to limit the scope of the semiconductor technology which is employed.

Dotting

Dotting refers to the joining of three or more leads by physically connecting them together. Most backpanel busses share this connection approach. The term relates to OR DOTS of times past but is used here to identify multiple data sources that can be combined onto a bus by a very simple protocol.

Our I/O zipper concept can be used to implement the concept that the port into a node could be driven by the port out of a node or by data coming from the system bus. Conversely, data being put out of a node would be available to both the input to another node and to the system bus. Note that outputting data to both the system bus and another node is not done simultaneously but in different cycles.

Dotting is used in the H-DOT discussions where Two-ported PEs or PMEs or Pickets can be used in arrays of various organizations by taking advantage of dotting. Several topologies are discussed including 2D and 3D Meshes, Base 2 N-cube, Sparse Base 4 N-cube, and Sparse Base 8 N-cube.

DRAM

DRAM is an acronym for dynamic random access memory, the common storage used by computers for main memory. However, the term DRAM can be applied to use as a cache or as a memory which is not the main memory.

FLOATING-POINT

A floating-point number is expressed in two parts. There is a fixed point or fraction part, and an exponent part to some assumed radix or Base. The exponent indicates the actual placement of the decimal point. In the typical floating-point representation a real number 0.0001234 is represented as 0.1234-3, where 0.1234 is the fixed-point part and -3 is the exponent. In this example, the floating-point radix or base is 10, where 10 represents the implicit fixed positive integer base, greater than unity, that is raised to the power explicitly denoted by the exponent in the floating-point representation or represented by the characteristic in the floating-point representation and then multiplied by the fixed-point part to determine the real number represented. Numeric literals can be expressed in floating-point notation as well as real numbers.

FLOPS

This terms refers to floating-point instructions per second. Floating-point operations include ADD, SUB, MPY, DIV and often many others. Floating-point instructions per second parameter is often calculated using the add or multiply instructions and, in general, may be considered to have a 50/50 mix. An operation includes the generation of exponent, fraction and any required fraction normalization. We could address 32 or 48-bit floating-point formats (or longer but we have not counted them in the mix.) A floating-point operation when implemented with fixed point instructions (normal or RISC) requires multiple instructions. Some use a 10 to 1 ratio in figuring performance while some specific studies have shown a ratio of 6.25 more appropriate to use. Various architectures will have different ratios.

Functional unit

A functional unit is an entity of hardware, software, or both, capable of accomplishing a purpose.

Gbytes

Gbytes refers to a billion bytes. Gbytes/s would be a billion bytes per second.

GIGAFLOPS $(10)^{**}9$ floating-point instructions per second.

GOPS and PETAOPS

GOPS or BOPS, have the same meaning—billions of operations per second. PETAOPS means trillions of operations per second, a potential of the current machine. For our APAP machine they are just about the same as BIPs/GIPs meaning billions of instructions per second. In some machines an instruction can cause two or more operations (ie. both an add and multiply) but we don't do that. Alternatively it could take many instructions to do an op. For example we use multiple instructions to perform 64 bit arithmetic. In counting ops however, we did not elect to count log ops. GOPS may be the preferred use to describe performance, but there is no consistency in usage that has been noted. One sees MIPs/MOPs then BIPs/BOPs and MegaFLOPS/GigaFLOPS/TeraFLOPS/PetaFlops.

ISA

ISA means the Instruction Set Architecture.

Link

A link is an element which may be physical or logical. A physical link is the physical connection for joining elements or units, while in computer programming a link is an instruction or address that passes control and parameters between separate portions of the program. In multisystems a link is the connection between two systems which may be specified by program code identifying the link which may be identified by a real or virtual address. Thus generally a link includes the physical medium, any protocol, and associated devices and programming; it is both logical and physical.

MFLOPS

MFLOPS means $(10)^{**}6$ floating-point instructions per second.

MIMD

MIMD is used to refer to a processor array architecture wherein each processor in the array has its own instruction stream, thus Multiple Instruction stream, to execute Multiple Data streams located one per processing element.

Module

A module is a program unit that is discrete and identifiable or a functional unit of hardware designed for use with other components. Also, a collection of PEs contained in a single electronic chip is called a module.

Node

Generally, a node is the junction of links. In a generic array of PEs, one PE can be a node. A node can also contain a collection of PEs called a module. In accordance with our invention a node is formed of an array of PMEs, and we refer to the set of PMEs as a node. Preferably a node is 8 PMEs.

Node Array

A collection of modules made up of PMEs is sometimes referred to as a node array, is an array of nodes made up of modules. A node array is usually more than a few PMEs, but the term encompasses a plurality.

PDE

A PDE is a partial differential equation.

PDE Relaxation Solution Process

PDE relaxation solution process is a way to solve a PDE (partial differential equation). Solving PDEs uses most of the super computing compute power in the known universe and can therefore be a good example of the relaxation process. There are many ways to solve the PDE equation and more than one of the numerical methods includes the relaxation process. For example, if a PDE is solved by finite element methods relaxation consumes the bulk of the computing time. Consider an example from the world of heat transfer. Given hot gas inside a chimney and a cold wind outside, how will the temperature gradient within the chimney bricks develop? By considering the bricks as tiny segments and writing an equation that says how heat flows between segments as a function of temperature differences then the heat transfer PDE has been converted into a finite element problem. If we then say all elements except those on the inside and outside are at room temperature while the boundary segments are at the hot gas and cold wind temperature, we have set up the problem to begin relaxation. The computer program then models time by updating the temperature variable in each segment based upon the amount of heat that flows into or out of the segment. It takes many cycles of processing all the segments in the model before the set of temperature variables across the chimney relaxes to represent actual temperature distribution that would occur in the physical chimney. If the objective was to model gas cooling in the chimney then the elements would have to extend to gas equations, and the boundary conditions on the inside would be linked to another finite element model, and the process continues. Note that the heat flow is dependent upon the temperature difference between the segment and its neighbors. It thus uses the inter-PE communication paths to distribute the temperature variables. It is this near neighbor communication pattern or characteristic that makes PDE relation very applicable to parallel computing.

PICKET

This is the element in an array of elements making up an array processor. It consists of: data flow (ALU REGS), memory, control, and the portion of the communication matrix associated with the element. The unit refers to a 1/nth of an array processor made up of parallel processor and memory elements with their control and portion of the array intercommunication mechanism. A picket is a form of processor memory element or PME. Our PME chip design processor logic can implement the picket logic described in related applications or have the logic for the array of processors formed as a node. The term PICKET is similar to the commonly used array term PE for processing element, and is an element of the processing array preferably comprised of a combined processing element and local memory for processing bit parallel bytes of information in a clock cycle. The preferred embodiment consisting of a byte wide data flow processor, 32k bytes or more of memory, primitive controls and ties to communications with other pickets.

The term "picket" comes from Tom Sawyer and his white fence, although it will also be understood functionally that a military picket line analogy fits quite well.

Picket Chip

A picket chip contains a plurality of pickets on a single silicon chip.

Picket Processor system (or Subsystem)

A picket processor is a total system consisting of an array of pickets, a communication network, an I/O system, and a SIMD controller consisting of a microprocessor, a canned routine processor, and a micro-controller that runs the array.

Picket Architecture

The Picket Architecture is the preferred embodiment for the SIMD architecture with features that accommodate several diverse kinds of problems including:

set associative processing parallel numerically intensive processing physical array processing similar to images.

Picket Array

A picket array is a collection of pickets arranged in a geometric order, a regular array.

PME or Processor Memory Element

PME is used for a processor memory element. We use the term PME to refer to a single processor, memory and I/O capable system element or unit that forms one of our parallel array processors. A processor memory element is a term which encompasses a picket. A processor memory element is 1/nth of a processor array which comprises a processor, its associated memory, control interface, and a portion of an array communication network mechanism. This element can have a processor memory element with a connectivity of a regular array, as in a picket processor, or as part of a subarray, as in the multi-processor memory element node we have described.

Routing

Routing is the assignment of a physical path by which a message will reach its destination. Routing assignments have a source or origin and a destination. These elements or addresses have a temporary relationship or affinity. Often, message routing is based upon a key which is obtained by reference to a table of assignments. In a network, a destination is any station or network addressable unit addressed as the destination of information transmitted by a path control address that identifies the link. The destination field identifies the destination with a message header destination code.

SIMD

A processor array architecture wherein all processors in the array are commanded from a Single Instruction stream to execute Multiple Data streams located one per processing element.

SIMDMIMD or SIMD/MIMD

SIMDMIMD or SIMD/MIMD is a term referring to a machine that has a dual function that can switch from MIMD to SIMD for a period of time to handle some complex instruction, and thus has two modes. The Thinking Machines, Inc. Connection Machine model CM-2 when placed as a front end or back end of a MIMD machine permitted programmers to operate different modes for execution of different parts of a problem, referred to sometimes a dual modes. These machines have existed since Illiac and have employed a bus that interconnects the master CPU with other processors. The master control processor would have the capability of interrupting the processing of other CPUs. The other CPUs could run independent program code. During an interruption, some provision must be made for checkpointing (closing and saving current status of the controlled processors).

SIMIMD

SIMIMD is a processor array architecture wherein all processors in the array are commanded from a Single Instruction stream, to execute Multiple Data streams located one per processing element. Within this construct, data dependent operations within each picket that mimic instruction execution are controlled by the SIMD instruction stream.

This is a Single Instruction Stream machine with the ability to sequence Multiple Instruction streams (one per Picket) using the SIMD instruction stream and operate on Multiple Data Streams (one per Picket). SIMIMD can be executed by a processor memory element system.

SISD

SISD is an acronym for Single Instruction Single Data.

Swapping

Swapping interchanges the data content of a storage area with that of another area of storage.

Synchronous Operation

Synchronous operation in a MIMD machine is a mode of operation in which each action is related to an event (usually a clock); it can be a specified event that occurs regularly in a program sequence. An operation is dispatched to a number of PEs who then go off to independently perform the function. Control is not returned to the controller until the operation is completed.

If the request is to an array of functional units, the request is generated by a controller to elements in the array which must complete their operation before control is returned to the controller.

TERAFLOPS

TERAFLOPS means $(10)^{**}12$ floating-point instructions per second.

VLSI

VLSI is an acronym for very large scale integration (as applied to integrated circuits).

Zipper

A zipper is a new function provided. It allows for links to be made from devices which are external to the normal interconnection of an array configuration.

BACKGROUND OF THE INVENTION

In the never ending quest for faster computers, engineers are linking hundreds, and even thousands of low cost microprocessors together in parallel to create super supercomputers that divide in order to conquer complex problems that stump today's machines. Such machines are called massively parallel. We have created a new way to create massively parallel systems. The many improvements which we have made should be considered against the background of many works of others.

Multiple computers operating in parallel have existed for decades. Early parallel machines included the ILLIAC which was started in the 1960s. ILLIAC IV was built in the 1970s. Other multiple processors include (see a partial summary in U.S. Pat. No. 4,975,834 issued Dec. 4, 1990 to Xu et al) the Cedar, Sigma-1, the Butterfly and the Monarch, the Intel ipsc, The Connection Machines, the Caltech COSMIC, the N Cube, IBM's RP3, IBM's GF11, the NYU Ultra Computer, the Intel Delta and Touchstone.

Large multiple processors beginning with ILLIAC have been considered supercomputers. Supercomputers with greatest commercial success have been based upon multiple vector processors, represented by the Cray Research Y-MP systems, the IBM 3090, and other manufacturer's machines including those of Amdahl, Hitachi, Fujitsu, and NEC.

Massively Parallel Processors (MPPs) are now thought of as capable of becoming supercomputers. These computer systems aggregate a large number of microprocessors with an interconnection network and program them to operate in parallel. There have been two modes of operation of these computers. Some of these machines have been MIMD mode machines.

Some of these machines have been SIMD mode machines. Perhaps the most commercially acclaimed of these machines has been the Connection Machines series 1 and 2 of Thinking Machines, Inc. These have been essentially SIMD machines. Many of the massively parallel machines have used microprocessors interconnected in parallel to obtain their concurrency or parallel operations capability. Intel microprocessors like i860 have been used by Intel and others. N Cube has made such machines with Intel '386 microprocessors. Other machines have been built with what is called the "transputer" chip. Inmos Transputer IMS T800 is an example. The Inmos Transputer T800 is a 32 bit device with an integral high speed floating point processor.

As an example of the kind of systems that are built, several Inmos Transputer T800 chips each would have 32 communication link inputs and 32 link outputs. Each chip would have a single processor, a small amount of memory, and communication links to the local memory and to an external interface. In addition, in order to build up the system communication link adaptors like IMS C011 and C012 would be connected. In addition switches, like a IMS C004 would provide, say, a crossbar switch between the 32 link inputs and 32 link outputs to provide point-to-point connection between additional transputer chips. In addition, there will be special circuitry and interface chips for transputers adapting them to be used for a special purpose tailored to the requirements of a specific device, a graphics or disk controller. The Inmos IMS M212 is a 16 bit processor, with on chip memory and communication links. It contains hardware and logic to control disk drives and can be used as a programmable disk controller or as a general purpose interface. In order to use the concurrency (parallel operations) Inmos developed a special language, Occam, for the transputer. Programmers have to describe the network of transputers directly in an Occam program.

Some of these massively parallel machines use parallel processor arrays of processor chips which are interconnected with different topologies. The transputer provides a crossbar network with the addition of IMS C004 chips. Some other systems use a hypercube connection. Others use a bus or mesh to connect the microprocessors and there associated circuitry. Some have been interconnected by circuit switch processors that use switches as processor addressable networks. Generally, as with the 14 RISC/6000s which were interconnected last fall at Lawrence Livermore by wiring the machines together, the processor addressable networks have been considered as coarse-grained multiprocessors.

Some very large machines are being built by Intel and nCube and others to attack what are called "grand challenges" in data processing. However, these computers are very expensive. Recent projected costs are in the order of $30,000,000.00 to $75,000,000.00 (Tera Computer) for computers whose development has been funded by the U.S. Government to attack the "grand challenges". These "grand challenges" would include such problems as climate modeling, fluid turbulence, pollution dispersion, mapping of the human genome and ocean circulation, quantum chromodynamics, semiconductor and supercomputer modeling, combustion systems, vision and cognition.

As a footnote to our background, we should recognize one of the early massively parallel machines developed by IBM. In our description we have chosen to use the term processor memory element rather than "transputer" to describe one of the eight or more memory units with processor and I/O capabilities which make up the array of PMEs in a chip, or node. The referenced prior art "transputer" has on a chip one processor, a Fortran coprocessor, and a small memory, with an I/O interface. Our processor memory element could apply to a transputer and to the PME of the RP3 generally. However, as will be recognized, our little chip is significantly different in many respects. Our little chip has many features described later. However, we do recognize that the term PME was first coined for another, now more typical, PME which formed the basis for the massively parallel machine known as the RP3. The IBM Research Parallel Processing Prototype (RP3) was an experimental parallel processor based on a Multiple Instruction Multiple Data (MIMD) architecture. RP3 was designed and built at IBM T.J. Watson Research Center in cooperation with the New York University Ultracomputer project. This work was sponsored in part by Defense Advanced Research Project Agency. RP3 was comprised of 64 Processor-Memory Elements (PMEs) interconnected by a high speed omega network. Each PME contained a 32-bit IBM "PC scientific" microprocessor, 32-kB cache, a 4-MB segment of the system memory, and an I/O port. The PME I/O port hardware and software supported initialization, status acquisition, as well as memory and processor communication through shared I/O support Processors (ISPs). Each ISP supports eight processor-memory elements through the Extended I/O adapters (ETIOs), independent of the system network. Each ISP interfaced to the IBM S/370 channel and the IBM Token-Ring network as well as providing operator monitor service. Each extended I/O adapter attached as a device to a PME ROMP Storage Channel (RSC) and provided programmable PME control/status signal I/O via the ETIO channel. The ETIO channel is the 32-bit bus which interconnected the ISP to the eight adapters. The ETIO channel relied on a custom interface protocol with was supported by hardware on the ETIO adapter and software on the ISP.

Problems addressed by our APAP Machine

The machine which we have called the Advanced Parallel Array Processor (APAP) is a fine-grained parallel processor which we believe is needed to address issues of prior designs. As illustrated above, there have been many fine-grained (and also coarse-grained) processors constructed from both point design and off-the-shelf processors using dedicated and shared memory and any one of the many possible interconnection schemes. To date these approaches have all encountered one or more design and performance limitations. Each "solution" leads in a different direction. Each has its problems. Existing parallel machines are difficult to program. Each is not generally adaptable to various sizes of machines compatible across a range of applications. Each has its design limitations caused by physical design, interconnection and architectural issues.

Physical Issues

Some approaches utilize a separate chip design for each of the various functions required in a horizontal structure. These approaches suffer performance limitations due to chip crossing delays.

Other approaches integrate various functions together vertically into a single chip. These approaches suffer performance limitations due to the physical limit on the number of logic gates which can be integrated onto a producible chip.

Interconnection Issues

Networks which interconnect the various processing functions are important to fine-grained parallel processors. Processor designs with buses, meshes, and hypercubes have all been developed. Each of these networks has inherent limitations as to processing capability. Buses limit both the number of processors which can be physically interconnected and the network performance. Meshes lead to large network diameters which limit network performance. Hypercubes require each node to have a large number of interconnection ports; the number of processors which can be interconnected is limited by the physical input/output pins at the node. Hypercubes are recognized as having some significant performance gains over the prior bus and mesh structures.

Architectural Issues

Processes which are suitable for fine-grained parallel processors fall into two distinct types. Processes which are functionally partitionable tend to perform better on multiple instruction, multiple data (MIMD) architectures. Processes which are not functionally partitionable but have multiple data streams tend to perform better on single instruction, multiple data (SIMD) architectures. For any given application, there is likely to be some number of both types of processes. System trade-offs are required to pick the architecture which best suits a particular application but no single solution has been satisfactory.

SUMMARY OF THE INVENTION

We have created a new way to make massively parallel processors and other computer systems by creating a new "chip" and systems designed with our new concepts. This application is directed to such systems. Components described in our applications can be combined in our systems to make new systems. They also can be combined with existing technology.

Think, our little CMOS DRAM chip of approximately 14×14 mm can be put together much like bricks are walled in a building or paved to form a brick road. Our chip provides the structure necessary to build a "house", a complex computer system, by connected replication.

Placing our development in perspective, four little chips, each one alike, each one with eight or more processors embedded in memory with an internal array capability and external I/O broadcast and control interface, would provide the memory and processing power of thirty-six or more complex computers, and they could all be placed with compact hybrid packaging into something the size of a watch, and operated with very low power, as each chip only dissipates about 2 watts. With this chip, we have created many new concepts, and those that we consider our invention are described in detail in the description and claims. The systems that can be created with our computer system can range from small devices to massive machines with PETAOP potential. More details about such a chip are provided in related applications. Here we will describe some of them and also describe features applicable to multi-processor memory element parallel processors, which are applicable especially to our multiple processor on a chip design, and some features which are applicable to processing elements and pickets which are not so compact.

Our system eliminates a trade-off between SIMD and MIMD are eliminated because the design allows processors to dynamically switch between MIMD and SIMD mode. This eliminates many problems which will be encountered by application programmers of "hybrid" machines. In addition, the design will allow a subset of the processors to be in SIMD or MIMD mode.

The Advanced Parallel Array Processor (APAP) is a fine-grained parallel processor. It consists of control and processing sections which are partitionable such that configurations suitable for supercomputing through personal computing applications can be satisfied. In most configurations it would attach to a host processor and support the off loading of segments of the host's workload. Because the APAP array processing elements are general purpose computers, the particular type of workload off-loaded will vary depending upon the capabilities of the host. For example, our APAP can be a module for an IBM 3090 vector processor mainframe. When attached to a mainframe with high performance vector floating point capability the task off-loaded might be sparse to dense matrix transformations. Alternatively, when attached to a PC personal computer the off-loaded task might be numerically intensive 3 dimensional graphics processing.

The above referenced parent U.S. Ser. No. 07/611,594, filed Nov. 13, 1990 now abandoned of Dieffenderfer et al., titled "Parallel Associative Processor System" describes the idea of integrating computer memory and control logic within a single chip and replicating the combination within the chip and building a processor system out of replications of the single chip. This approach which is continued and expanded here leads to a system which provides massively parallel processing capability at the cost of developing and manufacturing only a single chip type while enhancing performance capability by reducing the chip boundary crossings and line length.

The above referenced parent U.S. Ser. No. 07/611,594, filed Nov. 13, 1990 now abandoned illustrated utilization of 1-dimensional I/O structures(essentially a linear I/O) with multiple SIMD PMEs attached to that structure within a chip. This embodiment elaborates these concepts to dimensions greater than 1. The description which follows will be in terms of 4-dimensional I/O structures with 8 SIMD/MIMD PMEs per chip. However, that can be extended to greater dimensionality or more PMEs per dimension as we will describe with respect to FIGS. 3, 9, 10, 15 and 16. Our processing element includes a full I/O system including both data transfer and program Interrupts. Our description of our preferred embodiment will be primarily described in terms of the preferred 4-dimensional I/O structures with 8 SIMD/MIMD PMEs per chip, which has special advantages now in our view. However, that can be extended to greater dimensionality or more PMEs per dimension as described in our parent application. In addition, for most applications we prefer and have made inventions in areas of greater dimensions with hypercube interconnections, preferably with the modified hypercube we describe. However, in some applications a 2-dimensional mesh interconnection of chips will be applicable to a task at hand. For instance, in certain military computers a 2 dimensional mesh will be suitable and cost effective.

We will elaborate in this and related applications Picket Processors and what we call an Advanced Parallel Array Processor (APAP). It may be interesting to note that the picket processor can employ a PME. A picket processor may be especially useful in military application where a very compact array processor is deireable. In this connection, a picket processor differs somewhat from the preferred embodiment associated with the APAP, our Advanced Parallel Array Processor. However, the commonality exists, and aspects and features which we have provided can be employed in differing machines.

The term picket refers to 1/nth element of an array processor made up of processor and memory and their included communication elements applicable for array intercommunication.

The picket concept is also applicable to the 1/nth of an APAP processing array.

While the picket concept can differ from an APAP in data width, memory size, and number of registers, it is, in the massively parallel embodiment which is an alternative to an APAP, different in that it is configured to have connectivity for 1/nth of a regular array, while a PME in an APAP is a part of a sub-array. Both systems can execute SIMIMD. However, because a picket processor is configured as a SIMD machine with MIMD in the PE, it can directly execute SIMIMD, while a MIMD APAP configuration would execute SIMIMD by using MIMD PEs controlled to emulate SIMD. Both machines use a PME.

Both systems can be configured as a parallel array processor, comprising an array processing unit for the array having 'N' elements interconnected with an array communication network wherein 1/Nth of the processor array is a processing element, it's associated memory, a control bus interface, and a portion of the array communication network.

The parallel array processor a dual operation mode capability wherein the processing unit can be commanded to operate in either or two modes, and freely move between these two modes for SIMD and MIMD operation, where when SIMD is the mode of its organization a processing unit has the ability to command each element to execute it's own instructions in a SIMIMD mode, and where when MIMD is the implementation mode for the processing units organization it has the ability to synchronize selected elements of the array to simulate MIMD execution. We can call this MIMD-SIMD.

A parallal array processor in both system provides an array communication network with paths for the passing of information between elements of the array. The movement of information can be directed by either of two ways, where as a first way, an array controller directs that all messages move in the same direction at the same time such that the data being moved does not define its destination, and in a second way, each message is self routed with a header at the beginning of a message defining its destination.

A segment of the parallel array processor array has plural copies of the processing unit provided on a single semiconductor chip, which each copy is a segment of the array including a portion of the array communication network associated with that segment and buffers, drivers, multiplexers, and control for enabling the segment portion of the array to be seamlessly connected with other segments of the array to extend the array communication network.

The control bus or path from a controller is provided for each processing unit so that the control bus extends to each of the elements of the array and controls its activities.

Each processing element segment of the parallel array, contains plural copies of a processor memory element, which is contained within the limits of a single semiconductor chip, has a segment of the array includes a portion of the array control bus and the register buffers to support the communication of controls to the array segment contained within the chip.

Both can implement mesh moves or routed moves. Normally, the APAP implements a dual interconnect structure, with eight elements on the chip interrrelating in one way, while the chips interrelate in another way. The programmable routing on the chip generally causes links to be established between the PMEs as we have described, but the nodes can be and normally are related in another way. On the chip essentially the normal APAP configuration would be a 2×4 mesh, which the node interconnection can be a routed sparse octal N-cube. Both systems have inter-PE intercommunication pathways between PEs (PMEs) enabling a matrix to be made up of point-to-point paths.

With this background and perspective, we will describe in detail features and aspects of our invention related to the preferred embodiment of our invention with reference to the FIGURES.

BRIEF DESCRIPTION OF THE DRAWINGS

FIG. 2 shows a massively parallel processor building block in accordance with our invention, representing our new chip design.

FIG. 3 illustrates on the right side the preferred chip physical cluster layout for our preferred embodiment of a chip single node fine grained parallel processor. There each chip is a scalable parallel processor chip providing 5 MIPs performance with CMOS DRAM memory and logic permitting air cooled implementation of massive concurrent systems. On the left side of FIG. 3, there is illustrated the replaced technology.

FIG. 4 shows a computer processor functional block diagram in accordance with the invention.

FIG. 7 illustrates the hardware for the processing element (PME) data flow and local memory in accordance with our invention, while

FIG. 9 shows the PME to PME connection (binary hypercube) and data paths that can be taken in accordance with our invention, while

FIGS. 13A & 13B in part (a) illustrates the system bus to or from a cluster array coupling enabling loading or unloading of the array by connecting the edges of clusters to the system bus (see FIG. 14). In FIG. 13 in part (b) there is the bus to/from the processing element portion. FIG. 13 illustrates how multiple system buses can be supported with multiple clusters. Each cluster can support 50 to 57 Mbyte/s bandwidth.

FIG. 16 shows two independent node connections in the hypercube.

FIG. 17 shows the Bitonic Sort algorithm as an example to illustrate the advantages of the defined SIMD/MIMD processor system.

We have provided, as part of the description, Tables illustrating the hardwired instructions for a PME, in which Table 1 illustrates Fixed-point arithmetic instructions; Table 2 illustrates storage to storage instructions; Table 3 illustrates logical instructions; Table 4 illustrates shift instructions; Table 5 illustrates branch instructions; Table 6 illustrates the status switching instructions; and Table 7 illustrates the input/output instructions.

(Note: For convenience of illustration in the formal patent drawings, FIGURES may be separated in parts and as a convention we place the top of the FIGURE as the first sheet, with subsequent sheets proceeding down and across when viewing the FIGURE, in the event that multiple sheets are used.)

Our detailed description follows with parts explaining the preferred embodiments of our invention provided by way of example.

DETAILED DESCRIPTION OF THE INVENTION

Figures 1, 1A:
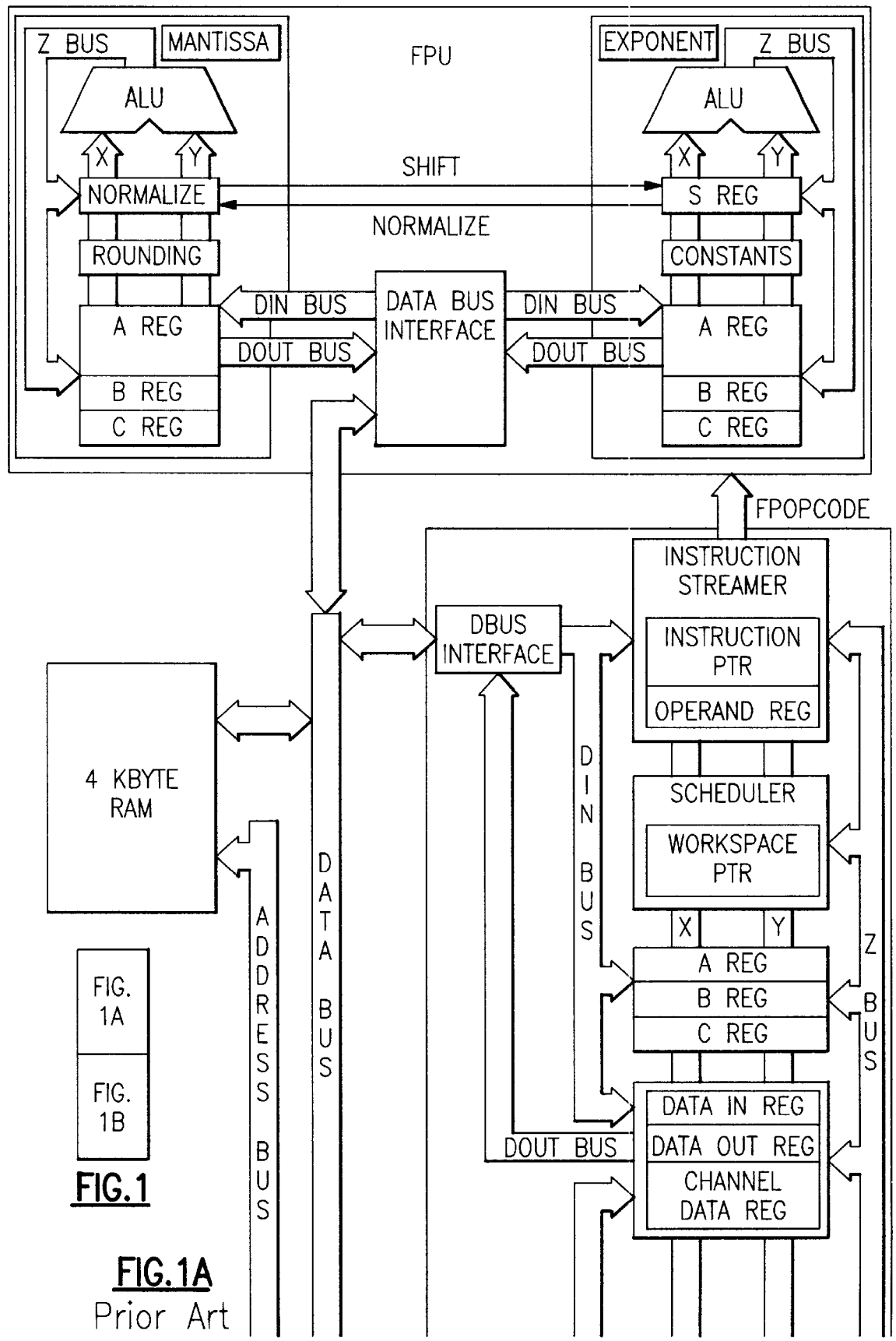
FIGS. 1A & 1B shows a parallel processor processing element like those which would utilize old technology.
Figure 1B:
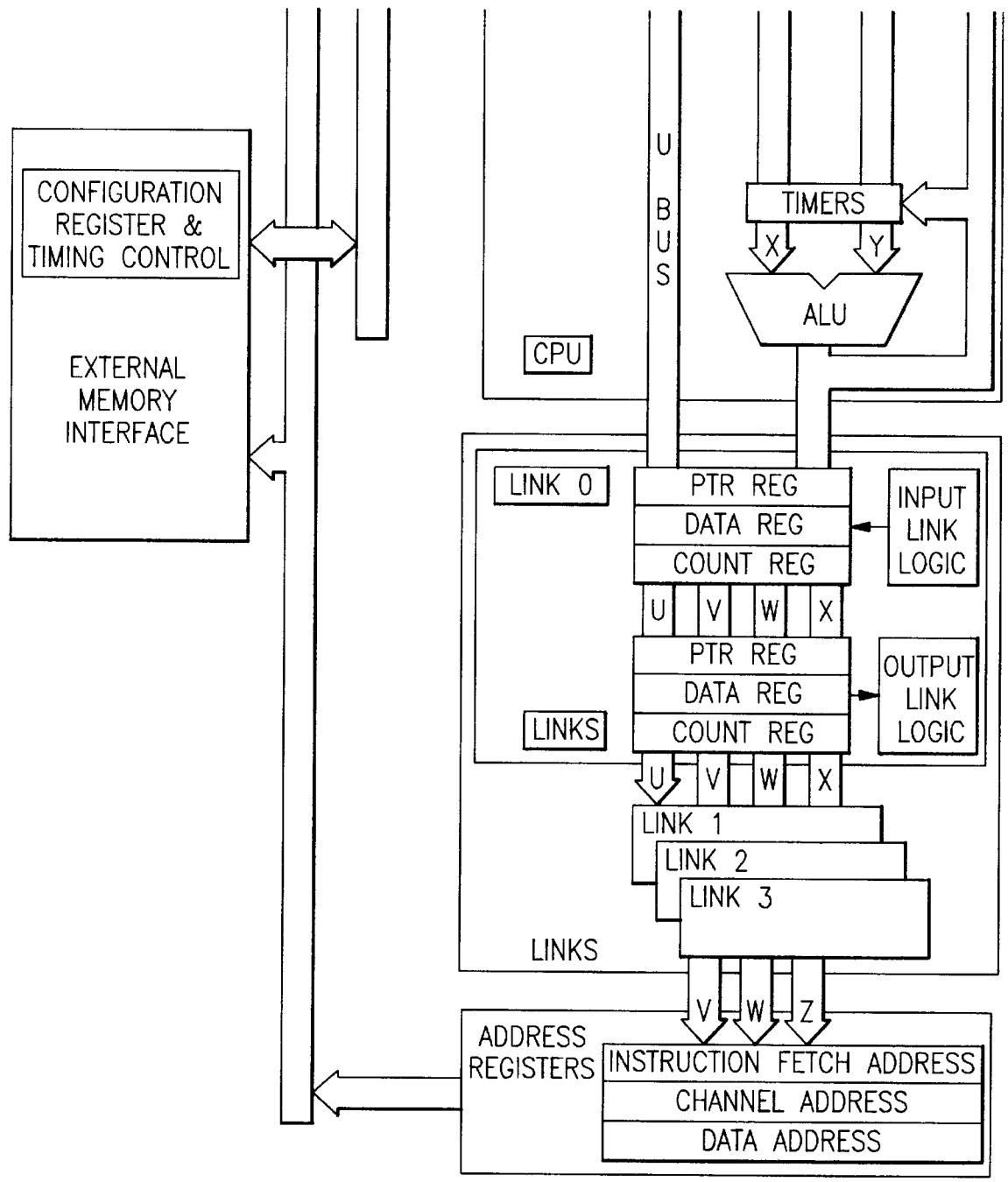

Turning now to our invention in greater detail, it will be seen from FIG. 1, which illustrates the existing technology level, illustrated by the transputer T800 chip, and representing similar chips for such machines as the illustrated by the Touchstone Delta (i860), N Cube ('386), and others. When FIG. 1 is compared with the developments here, it will be seen that not only can systems like the prior systems be substantially improved by employing our invention, but also new powerful systems can be created, as we will describe. FIG. 1's conventional modern microprocessor technology consumes pins and memory. Bandwidth is limited and inter-chip communication drags the system down.

The new technology leapfrog represented by FIG. 2 merges processors, memory, I/O into multiple PMEs (eight or more 16 bit processors each of which has no memory access delays and uses all the pins for networking) formed on a single low power CMOS DRAM chip. The system can make use of ideas of our prior referenced disclosures as well as invention separately described in the applications filed concurrently herewith and applicable to the system we describe here. Thus, for this purpose they are incorporated herein by reference. Our concepts of grouping, autonomy, transparency, zipper interaction, asynchronous SIMD, SIMIMD or SIMD/MIMD, can all be employed with the new technology, even though to lesser advantage they can be employed in the systems of the prior technology and in combination with our own prior multiple picket processor.

Our picket system can employ the present processor. Our basic concept is that we have now provided a replicable brick, a new basic building block for systems with our new memory processor, a memory unit having embedded processors, router and I/O. This basic building block is scalable. The basic system which we have implemented employs a 4 Meg. CMOS DRAM. It is expandable to be used in larger memory configurations, with 16 Mbit DRAMS, and 64 Mbit chips by expansion. Each processor is a gate array. With denser deposition, many more processors, at higher clock speeds, can be placed on the same chip, and using gates and additional memory will expand the performance of each PME. Scaling a single part type provides a system framwork and architecture which can have a performance well into the PETAOP range.

FIG. 2 illustrates the memory processor which we call the PME or processor memory element in accordance with our preferred embodiment. The processor has eight or more processors. In the pictured embodiment there are eight. The chip can be expanded (horizontally) to add more processors. The chip can, as preferred, retain the logic and expand the DRAM memory with additional cells linearly (vertically). Pictured are 16–32k by 9 bit sections of DRAM memory surrounding a field of CMOS gate array gates which implement 8 replications of 16 bit wide data flow processors.

Using IBM CMOS low power sub-micron IBM CMOS deposition on silicon technology, it uses selected silicon with trench to provide significant storage on a small chip surface. Our memory and multiple processors organized interconnect is made with IBM's advanced art of making semiconductor chips. However, it will be recognized that the little chip we describe has about 4 Meg. memory. It is designed so that as 16 Meg. memory technology becomes stable, when improved yields and methods of accommodating defects are certain, our little chip can migrate to larger memory sizes each 9 bits wide without changing the logic. Advances in photo and X-ray lithography keep pushing minimum feature size to well below 0.5 microns. Our design envisions more progress. These advances will permit placement of very large amounts of memory with processing on a single silicon chip.

Our device is a 4 MEG CMOS DRAM believed to be the first general memory chip with extensive room for logic. 16 replications of a 32k by 9-bit DRAM macro make up the memory array. The DRAM has 120K cells it allocates with significant surface area for application logic on the chip, with triple level metal wiring. The processor logic cells are preferably gate array cells. The 35 ns or less DRAM access time matches the processor cycle time. This CMOS implementation provides logic density for a very effective PE (picket) and does so while dissipating 1.3 watts for the logic. The separate memory section of the chip, each 32K by 9 bits, (with expansion not changing logic) surrounds the field of CMOS gate array gates representing 120K cells, and having the logic described in other figures. Memory is barriered and with a separated power source dissipates 0.9 watts. In providing the combining of significant amounts of logic on the same silicon substrate with significant amounts of memory problems involved with the electrical noise incompatibility of logic and DRAM have been overcome. Logic tends to be very noisy while memory needs relative quiet to sense the millivolt size signals that result from reading the cells of DRAM. We prefer to provide trenched triple metal layer silicon deposition, with separate barriered portions of the memory chip devoted to memory and to processor logic with voltage and ground isolation, and separate power distribution and barriers, to achieve compatibility between logic and DRAM.

APAP System Overview of Preferred Embodiments

This description introduces the new technology in the following order:

1. Technology
2. Chip H/W description
3. Networking and system build up
4. Software
5. Applications The initial sections of the detailed description describe how 4-Meg DRAM low power CMOS chips are made to include 8 processors on and as part of the manufactured PME DRAM chips each supporting:

1. 16 bit, 5 MIP dataflows,
2. independent instruction stream and interrupt processing and 3. 8 bit (plus parity and controls) wide external port and interconnection to 3 other on chip processors.

Our invention provides multiple functions which are integrated into a single chip design. The chip will provide PME functions which are powerful and flexible and sufficiently so such that a chip having scalability will be effective at processing, routing, storage and three classes of I/O. This chip has integrated memory and control logic within the single chip to make the PME, and this combination is replicated within the chip. A processor system is built from replications of the single chip.

The approach partitions the low power CMOS DRAM. It will be formed as multiple word length (16) bit by 32K sections, associating one section with a processor. (We use the term PME to refer to a single processor, memory and I/O capable system unit.) This partitioning leads to each DRAM chip being an 8 way 'cube connected' MIMD parallel processor with 8 byte wide independent interconnection ports. (See FIG. 6 for an illustration of a replication of fine-grained parallel technology, illustrating replication and the ring torus possibilities.)

The software description addresses several distinct program types. At the lowest level, processes interface the user's program (or services called by the application) to the detailed hardware H/W needs. This level includes the tasks required to manage the I/O and interprocessor synchronization and is what might be called a microprogram for the MPP. An intermediate level of services provide for both mapping applications (developed with vector or matrix operations) to the MPP, and also control, synchronization, startup, diagnostic functions. At the host level, high order languages are supported by library functions that support vectorized programs with either simple automatic data allocation to the MPP or user tuned data allocation. The multilevel software S/W approach permits applications to exploit different degrees of control and optimization within a single program. Thus, a user can code application programs without understanding the architecture detail while an optimizer might tune at the microcode level only the small high usage kernels of a program.

Sections of our description that describe 1024 element 5 GIPS units and a 32,768 element 164 GIPS unit illustrate the range of possible systems. However, those are not the limits; both smaller and larger units are feasible. These particular sizes have been selected as examples because the small unit is suitable to microprocessors (accelerators), personal computers, workstation and military applications (using of coarse different packaging techniques), while the larger unit is illustrative of a mainframe application as a module or complete supercomputer system. A software description will provide examples of other challenging work that might be effectively programmed on each of the illustrative systems.

PME DRAM CMOS—A BASE FOR A MULTIPROCESSOR PME

FIG. 2 illustrates our technology improvement at the chip technology level. This extendable computer organization is very cost and performance efficient over the wide range of system sizes because it uses only one chip type. Combining the memory and processing on one chip eliminates the pins dedicated to the memory bus and their associated reliability and performance penalties. Replication of our design within the chip makes it economically feasible to consider custom logic designs for processor subsections. Replication of the chip within the system leads to large scale manufacturing economies. Finally, CMOS technology requires low power per MIP, which in turn minimizes power supply and cooling needs. The chip architecture can be programmed for multiple word lengths enabling operations to be performed that would otherwise require much larger length processors. In combination these attributes permit the extensive range of system performance.

Our new technology can be compared with a possible extension of the old technology it overlaps. It is apparent that the advantages of smaller features have been used by processor designers to construct more complex chips and by memory designers to provide greater replication of the simple element. If the trend continues one could expect memories to get four times as large while processors might exploit density to:

1. include multiple execute units with instruction routers,
2. increase cache sizes and associative capability and/or
3. increase instruction look ahead and advance computation capability.

However, these approaches to the old technology illustrated by FIG. 1 all tend to dead end. Duplicating processors leads to linearly increasing pin requirements but pins per chip is fixed. Better cache-ing can only exploit the application's data reuse pattern. Beyond that, memory bandwidth becomes the limit. Application data dependencies and branching limit the potential advantage of look ahead schemes. Additionally, it is not apparent that MPP applications with fine-grained parallelism need 1, 4, or 16 Megaword memories per processing unit. Attempting to share such large memories between multiple processors results in severe memory bandwidth limitations.

Our new approach is not dead ended. We combine both significant memory and I/O and processor into a single chip, as illustrated by the FIG. 2 and subsequent illustration and description. It reduces part number requirements and eliminates the delays associated with chip crossing. More importantly, this permits all the chip's I/O pins to be dedicated to interprocessor communication and thus, maximizes network bandwidth.

To implement our preferred embodiment illustrated in FIG. 2 we use a process that is available now, using IBM low power CMOS technology. Our illustrated embodiment can be made with CMOS DRAM density, in CMOS and can be implemented in denser CMOS. Our illustrated embodiment of 32K memory cells for each of 8 PMEs on a chip can be increased as CMOS becomes denser. In our embodiment we utilize the real estate and process technology for a 4 MEG CMOS DRAM, and expand this with processor replication associated with 32K memory on the chip itself. The chip, it will be seen has processor, memory, and I/O in each of the chip packages of the cluster shown in FIG. 3. Within each package is a memory with embedded processor element, router, and I/O, all contained in a 4 MEG CMOS DRAM believed to be the first general memory chip with extensive room for logic. It uses selected silicon with trench to provide significant storage on a small chip surface. Each processor chip of our design alternatively can be made with 16 replications of a 32K by 9 bit DRAM macro (35/80 ns) using 0.87 micron CMOS logic to make up the memory array. The device is unique in that it allocates surface area for 120 K cells of application logic on the chip, supported by the capability of triple level metal wiring. The multiple cards of the old technology is shown crossed out on the left side of FIG. 3.

Our basic replicable element brick technology is an answer to the old technology. If one considered the "Xed" technology on the left of FIG. 3, one would see too many chips, too many cards, and waste. For example, today's proposed teraflop machines that others offer would have literally a million or more chips in them. With todays other technology only a few percent of these chips, at best, are truly operations producers. The rest are "overhead" (typically memory, network interface, etc.).

It will become evident that it is not feasible to package such chips, in such a large number, in anything that must operate in a constrained environment of physical size. (How many could you fit in a small area of a cockpit?) Furthermore, such proposed teraflop machines of others, already huge, must scale up 1000× times to reach the petaop range. We have a solution which dramatically decreases the percent of non-operations producting chips. We provide increased bandwidth. We provide this within a reasonable network dimensionality. With such a brick technology, where memory becomes the operator, and networks are used for passing controls, where operations producing chips are dramatically increased. In addition, the upgrade dramatically reduces the number of different types of chips. Our system is designed for scale-up, without a requirement for specialized packaging, cooling, power, or environmental constraints.

With our brick technology, utilizing instead of separate processors, memory units with built in processors and network capability, the configuration shown in FIG. 3, representing a card, with chips which are pin compatable with current 4Mbit DRAM cards at the connector level. Such a single card could hold, with a design point of a basic 40 mip per chip performance level, 32 chips, or 1280 mips. Four such cards would provide 5 gips. The workstation configuration which is illustrated would preferably have such a PE memory array, a cluster controller, and an IBM RISC System/6000 which has sufficient performance to run and monitor execution of an array processor application developed at the workstation.

A very gate efficient processor can be used in the processor portion. Such designs for processors have been employed, but never within memory. Indeed, in addition, we have provided the ability to mix MIMD and SIMD basic operation provisions. Our chip provides a "broadcast bus" which provides an alternate path into each CPU's instruction buffer. Our cluster controller issues commands to each of the PEs in the PMEs, and these can be stored in the PME to control their operation in one mode or another. Each PME does not have to store an entire program, but can store only those portions applicable to a given task at various times during processing of an application.

Given the basic device one can elect to develop a single processor memory combination. Alternatively, by using a more simple processor and a subset of the memory macros one can design for either 2, 4, 8 or 16 replications of the basic processing element (PME). The PME can be made simpler either by adjusting the dataflow bandwidth or by substituting processor cycles for functional accelerators. For most embodiments we prefer to make 8 replications of the basic processing element we describe.

Our application studies have indicated that for now the most favorable answer is 8 replications of a 16 bit wide data flow and 32K word memory. We conclude this because:

1. 16 bit words permit single cycle fetch of instructions and addresses.
2. 8 PMEs each with an external port permits 4 dimensional torus interconnections. Using 4 or 8 PMEs on each ring leads to modules suitable for the range of targeted system performances,
3. 8 external ports requires about 50% of the chip pins, providing sufficient remainder for power, ground and common control signals.
4. 8 Processors implemented in a 64 KByte Main Store
    a. allows for a register based architecture rather than a memory mapped architecture, and it
    b. forces some desirable but not required accelerators to be implemented by multiple processor cycles.

This last attribute is important because it permits use of the developing logic density increase. Our new accelerators (ex. floating point arithmetic unit per PME) are added as chip hardware without affecting system design, pins and cables or application code.

The resultant chip layout and size (14.59×14.63 mm) is shown in FIG. 2, and FIG. 3 shows a cluster of such chips, which can be packaged in systems like those shown in later FIGURES for stand alone units, workstations which slide next to a workstation host with a connection bus, in AWACs applications, and in supercomputers. This chip technology provides a number of system level advantages. It permits development of the scalable MPP by basic replication of a single part type. The two DRAM macros per processor provide sufficient storage for both data and program. An SRAM of equivalent size might consume more than 10 times more power. This advantage permits MIMD machine models rather than the more limited SIMD models characteristic of machines with single chip processor/memory designs. The 35 ns or less DRAM access time matches the expected processor cycle time. CMOS logic provides the logic density for a very effective PME and does so while dissipating only 1.3 watts. (Total chip power is 1.3+0.9 (memory)=2.2 w.) Those features in turn permit using the chip in MIL applications requiring conduction cooling. (Air cooling in non-MIL applications is significantly easier.) However, the air cooled embodiment can be used for workstation and other environments. A standalone processor might be configured with an 80 amp-5 volt power supply.

Figure 5:
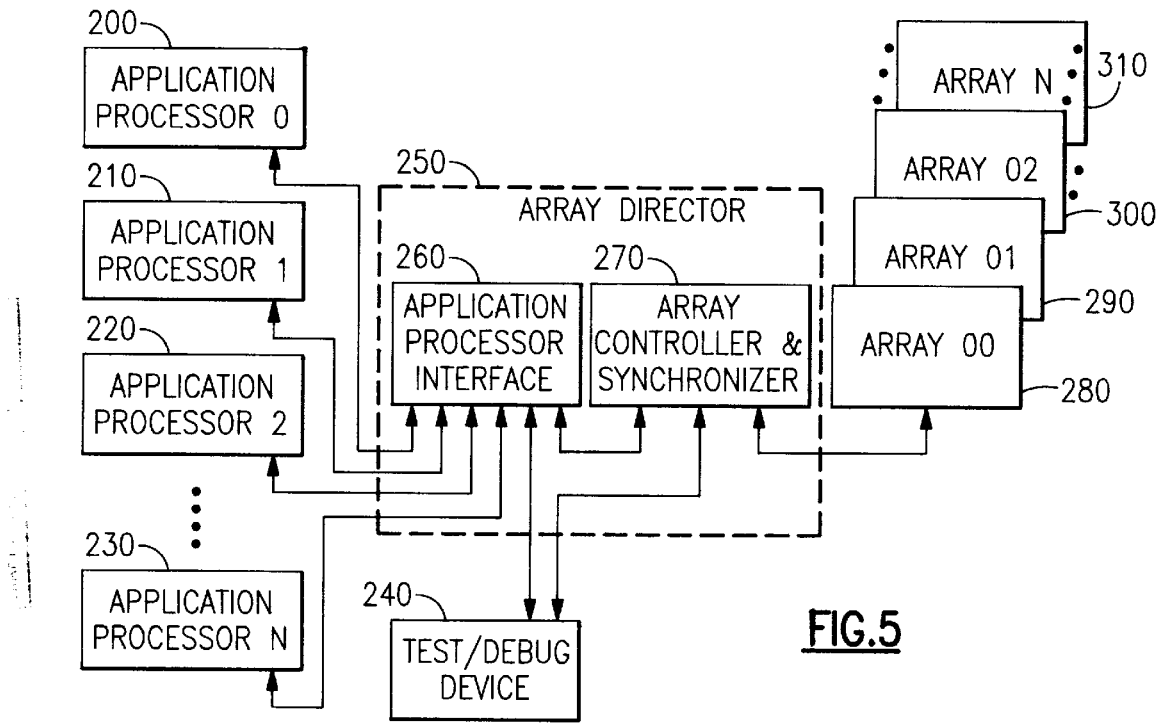
FIG. 5 shows a typical Advanced Parallel Array Processor computer system configuration.

Advanced Parallel Array Processor (APAP) building blocks are shown in FIG. 4 and in FIG. 5. FIG. 4 illustrates the functional block diagram of the Advanced Parallel Array Processor. Multiple application interfaces 150, 160, 170, 180 exist for the application processor 100 or processors 110, 120, 130. FIG. 5 illustrates the basic building blocks that can be configured into different system block diagrams. The APAP, in a maximum configuration, can incorporate 32,768 identical PMEs. The processor consists of the PME Array 280, 290, 300, 310, an Array Director 250 and an Application Processor Interface 260 for the application processor 200 or processors 210, 220, 230. The Array Director 250 consists of three functional units: Application Processor Interface 260, cluster Synchronizer 270 and cluster Controller 270. An Array Director can perform the functions of the array controller of our prior linear picket system for SIMD operations with MIMD capability. The cluster controller 270, along with a set of 64 Array clusters 280, 290, 300, 310, (i.e. cluster of 512 PMEs), is the basic building block of the APAP computer system. The elements of the Array Director 250 permit configuring systems with a wide range of cluster replications. This modularity based upon strict replication of both processing and control elements is unique to this massively parallel computer system. In addition, the Application Processor Interface 260 supports the Test/Debug device 240 which will accomplish important design, debug, and monitoring functions.

Controllers are assembled with a well-defined interface, e.g. IBMs Micro-channel, used in other systems today, including controllers with i860 processors. Field programmable gate arrays add functions to the controller which can be changed to meet a particular configuration's requirements (how many PMEs there are, their couplings, etc.)

The PME arrays 280, 290, 300, 310 contain the functions needed to operate as either SIMD or MIMD devices. They also contain functions that permit the complete set of PMEs to be divided into 1 to 256 distinct subsets. When divided into subsets the Array Director 250 interleaves between subsets. The sequence of the interleave process and the amount of control exercised over each subset is program controlled. This capability to operate distinct subsets of the array in one mode, i.e., MIMD with differing programs, while other sets operate in tightly synchronized SIMD mode under Array Director control, represents an advance in the art. Several examples presented later illustrate the advantages of the concept.

Array Architecture

The set of nodes forming the Array is connected as a n-dimensional modified hypercube. In that interconnection scheme, each node has direct connections to 2n other nodes. Those connections can be either simplex, half-duplex or full-duplex type paths. In any dimension greater than 3d, the modified hypercube is a new concept in interconnection techniques. (The modified hypercube in the 2d case generates a torus, and in the 3d case an orthogonally connected lattice with edge surfaces wrapped to opposing surface.)

To describe the interconnection scheme for greater than 3d cases requires an inductive description. A set of $m_1$ nodes can be interconnected as a ring. (The ring could be 'simply connected', 'braided', 'cross connected', 'fully connected', etc. Although additional node ports are needed for greater than simple rings, that added complexity does not affect the modified hypercube structure.) The $m_2$ rings can then be linked together by connecting each equivalent node in the $m_2$ set of rings. The result at this point is a torus. To construct a i+1d modified hypercube from an id modified hypercube, consider $m_{i+1}$, sets of Id modified hypercubes and interconnect all of the equivalent $m_i$ level nodes into rings.

Figure 6:
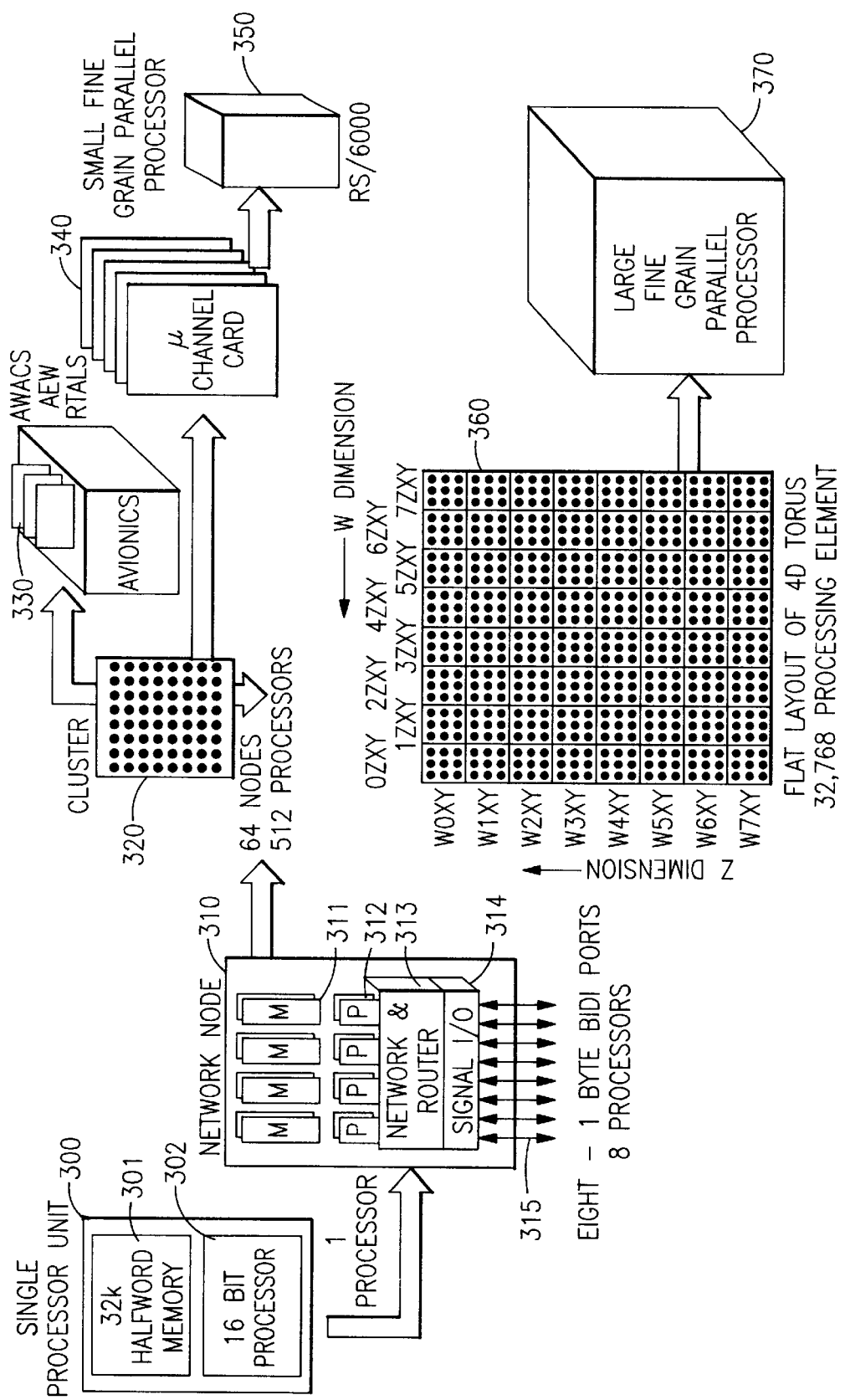
FIG. 6 shows a system overview of our fine-grained parallel processor technology in accordance with our invention, illustrating system build up using replication of the PME element which permits systems to be developed with 40 to 193,840 MIPS performance.

This process is illustrated for the 4d modified hypercube, using $m_i=8$ for i=1 . . . 4 by the illustration in FIG. 6. Compare our description under node Topology and also FIGS. 6, 9, 10, 15 and 16.

FIG. 6 illustrates the fine-grained parallel technology path from the single processor element 300, made up of 32K 16-bit words with a 16-bit processor to the Network node 310 of eight processors 312 and their associated memory 311 with their fully distributed I/O routers 313 and Signal I/O ports 314, 315, on through groups of nodes labeled clusters 320 and into the cluster configuration 360 and to the various applications 330, 340, 350, 370. The 2d level structure is the cluster 320, and 64 clusters are integrated to form the 4d modified-hypercube of 32,768 Processing Elements 360.

Processing Array Element (PME) Preferred Embodiment

Figure 11:
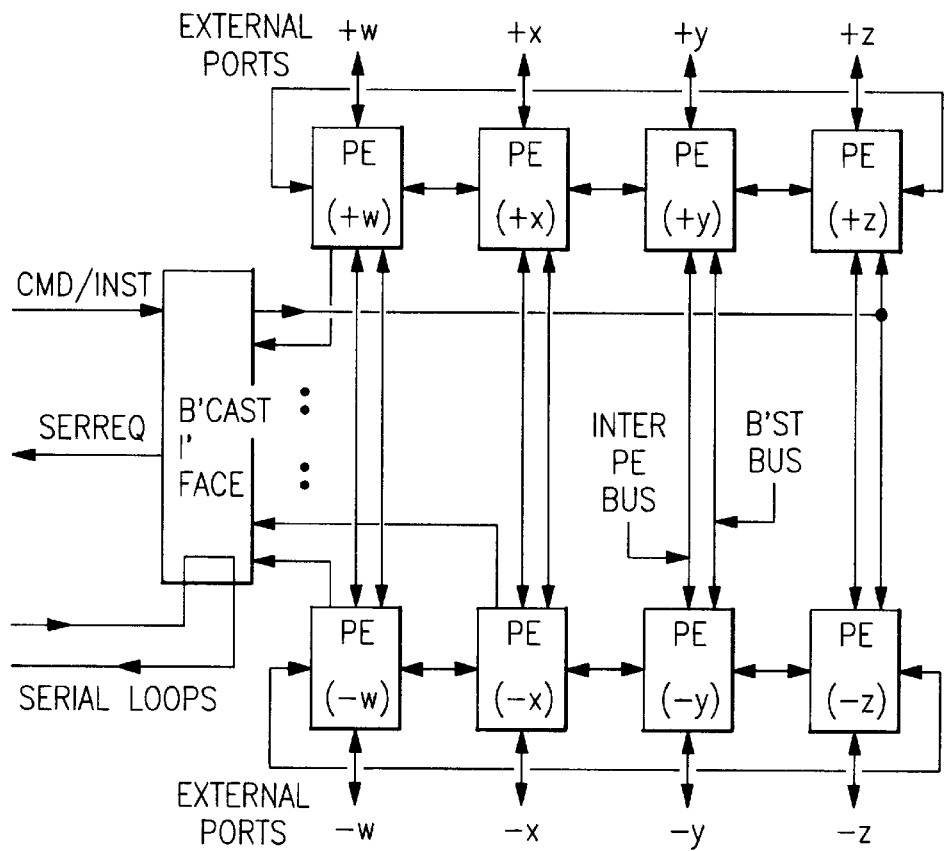
FIG. 11 is a block diagram of a scalable parallel processor chip where each PME is a 16 bit wide processor with 32 K words of local memory and there is I/O porting for a broadcast port which provides a controller-to-all interface while external ports are bidirectional point-to-point interfaces permitting ring torus connections within the chip and externally.

As illustrated by FIG. 2 and FIG. 11 the preferred APAP has a basic building block of a one chip node. Each node contains 8 identical processor memory elements (PMEs) and one broadcast and control interface (BCI). While some of our inventions may be implemented when all functions are not on the same chip, it is important from a performance and cost reduction standpoint to provide the chip as a one chip node with the 8 processor memory elements using the advanced technology which we have described and can be implemented today.

The preferred implementation of a PME has a 64 KByte main store, 16 16-bit general registers on each of 8 program interrupt levels, a full function arithmetic/logic unit (ALU) with working registers, a status register, and four programmable bi-directional I/O ports. In addition the preferred implementation provides a SIMD mode broadcast interface via the broadcast and control interface (BCI) which allows an external controller (see our original parent application and the description of our currently preferred embodiment for a nodal array and system with clusters) to drive PME operation decode, memory address, and ALU data inputs. This chip can perform the functions of a microcomputer allowing multiple parallel operations to be performed within it, and it can be coupled to other chips within a system of multiple nodes, whether by an interconnection network, a mesh or hypercube network, or our preferred and advanced scalable embodiment.

The PMEs are interconnected in a series of rings or tori in our preferred scalable embodiment. In some applications the nodes could be interconnected in a mesh. In our preferred embodiment each node contains two PMEs in each of four tori. The tori are denoted W,X,Y, and Z (see FIG. 6). FIG. 11 depicts the interconnection of PMEs within a node. The two PMEs in each torus are designated by their external I/O port (+W, −W, +X. −X, +Y, −Y, +Z, −Z). Within the node, there are also two rings which interconnect the 4+n and 4−n PMEs. These internal rings provide the path for messages to move between the external tori. Since the APAP can be in our preferred embodiment a four dimensional orthogonal array, the internal rings allow messages to move throughout the array in all dimensions.

The PMEs are self-contained stored program microcomputers comprising a main store, local store, operation decode, arithmetic/logic unit (ALU), working registers and Input/Output I/O ports. The PMEs have the capability of fetching and executing stored instructions from their own main store in MIMD operation or to fetch and execute commands via the BCI interface in SIMD mode. This interface permits intercommunication among the controller, the PME, and other PMEs in a system made up of multiple chips.

The BCI is the node's interface to the external array controller element and to an array director. The BCI provides common node functions such as timers and clocks. The BCI provides broadcast function masking for each nodal PME and provides the physical interface and buffering for the broadcast-bus-to-PME data transfers, and also provides the nodal interface to system status and monitoring and debug elements.

Each PME contains separate interrupt levels to support each of its point-to-point interfaces and the broadcast interface. Data is input to the PME main store or output from PME main store under Direct Memory Access (DMA) control. An "input transfer complete" interrupt is available for each of the interfaces to signal the PME software that data is present. Status information is available for the software to determine the completion of data output operations.

Each PME has a "circuit switched mode" of I/O in which one of its four input ports can be switched directly to ones of its four output ports, without having the data enter the PME main store. Selection of the source and destination of the "circuit switch" is under control of the software executing on the PME. The other three input ports continue to have access to PME main store functions, while the fourth input is switched to an output port.

An additional type of I/O has data that must be broadcast to, or gathered from all PMEs, plus data which is too specialized to fit on the standard buses. Broadcast data can include SIMD commands, MIMD programs, and SIMD data. Gathered data is primarily status and monitor functions. Diagnostic and test functions are the specialized data elements. Each node, in addition to the included set of PMEs, contains one BCI. During operations the BCI section monitors the broadcast interface and steers/collects broadcast data to/from the addressed PME(s). A combination of enabling masks and addressing tags are used by the BCI to determine what broadcast information is intended for which PMEs.

Each PME is capable of operating in SIMD or in MIMD mode in our preferred embodiment. In SIMD mode, each instruction is fed into the PME from the broadcast bus via the BCI. The BCI buffers each broadcast data word until all of its selected nodal PMEs have used it. This synchronization provides accommodation of the data timing dependencies associated with the execution of SIMD commands and allows asynchronous operations to be performed by a PME. In MIMD mode, each PME executes its own program from its own main store. The PMEs are initialized to the SIMD mode. For MIMD operations, the external controller normally broadcasts the program to each of the PMEs while they are in SIMD mode, and then commands the PMEs to switch to MIMD mode and begin executing. Masking/tagging the broadcast information allows different sets of PMEs to contain different MIMD programs, and/or selected sets of PMEs to operate in MIMD mode while other sets of PMEs execute in SIMD mode. In various software clusters or partitions these separate functions can operate independently of the actions in other clusters or partitions.

The operation of the Instruction Set Architecture (ISA) of the PME will vary slightly depending on whether the PME is in the SIMD or MIMD mode. Most ISA instructions operate identically regardless of mode. However, since the PME in SIMD mode does not perform branching or other control functions some code points dedicated to those MIMD instructions are reinterpreted in SIMD mode to allow the PME to perform special operations such as searching main memory for a match to a broadcast data value or switching to MIMD mode. This further extends system flexibility of an array.

PME Architecture

Basically, our preferred architecture comprises a PME which has a 16 bit wide data flow, 32K of 16 bit memory, specialized I/O ports and I/O switching paths, plus the necessary control logic to permit each PME to fetch, decode and execute the 16 bit instruction set provided by our instruction set architecture (ISA). The preferred PME performs the functions of a virtual router, and thus performs both the processing functions and data router functions. The memory organization allows by cross addressing of memory between PMEs access to a large random access memory, and direct memory for the PME. The individual PME memory can be all local, or divided into local and shared global areas programmatically. Specialized controls and capabilities which we describe permit rapid task switching and retention of program state information at each of the PMEs interrupt execution levels. Although some of the capabilities we provide have existed in other processors, their application for management of interprocessor I/O is unique in massively parallel machines. An example is the integrate of the message router function into the PME itself. This eliminates specialized router chips or development of specialized VLSI routers. We also recognize that in some instances one could distribute the functions we provide on a single chip onto several chips interconnected by metalization layers or otherwise and accomplish improvements to massively parallel machines. Further, as our architecture is scalable from a single node to massively parallel supercomputer level machines, it is possible to utilize some of our concepts at different levels. As we will illustrate for example our PME data flow is very powerful, and yet operates to make the scalable design effective.

Figure 7:
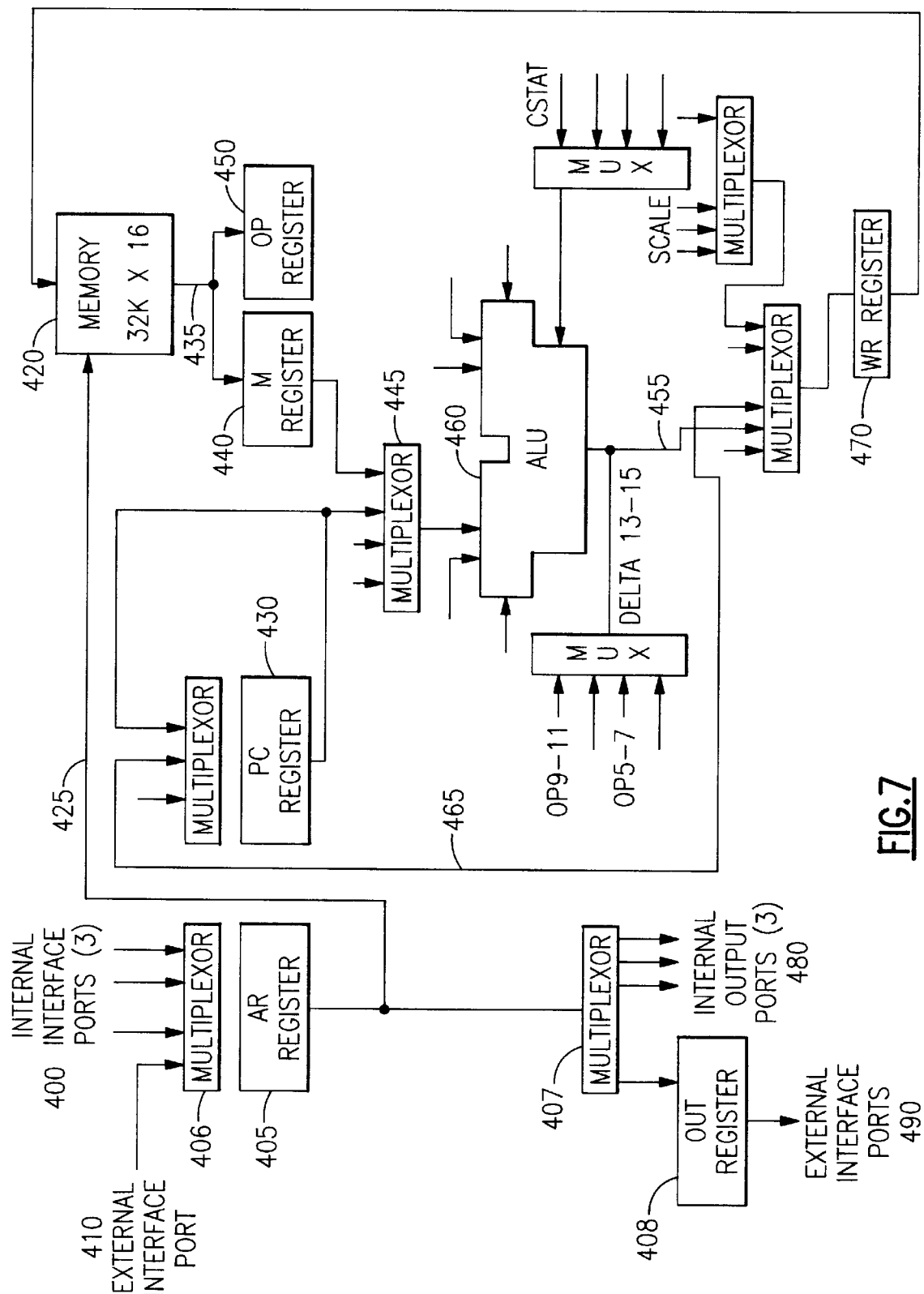
Figure 8:
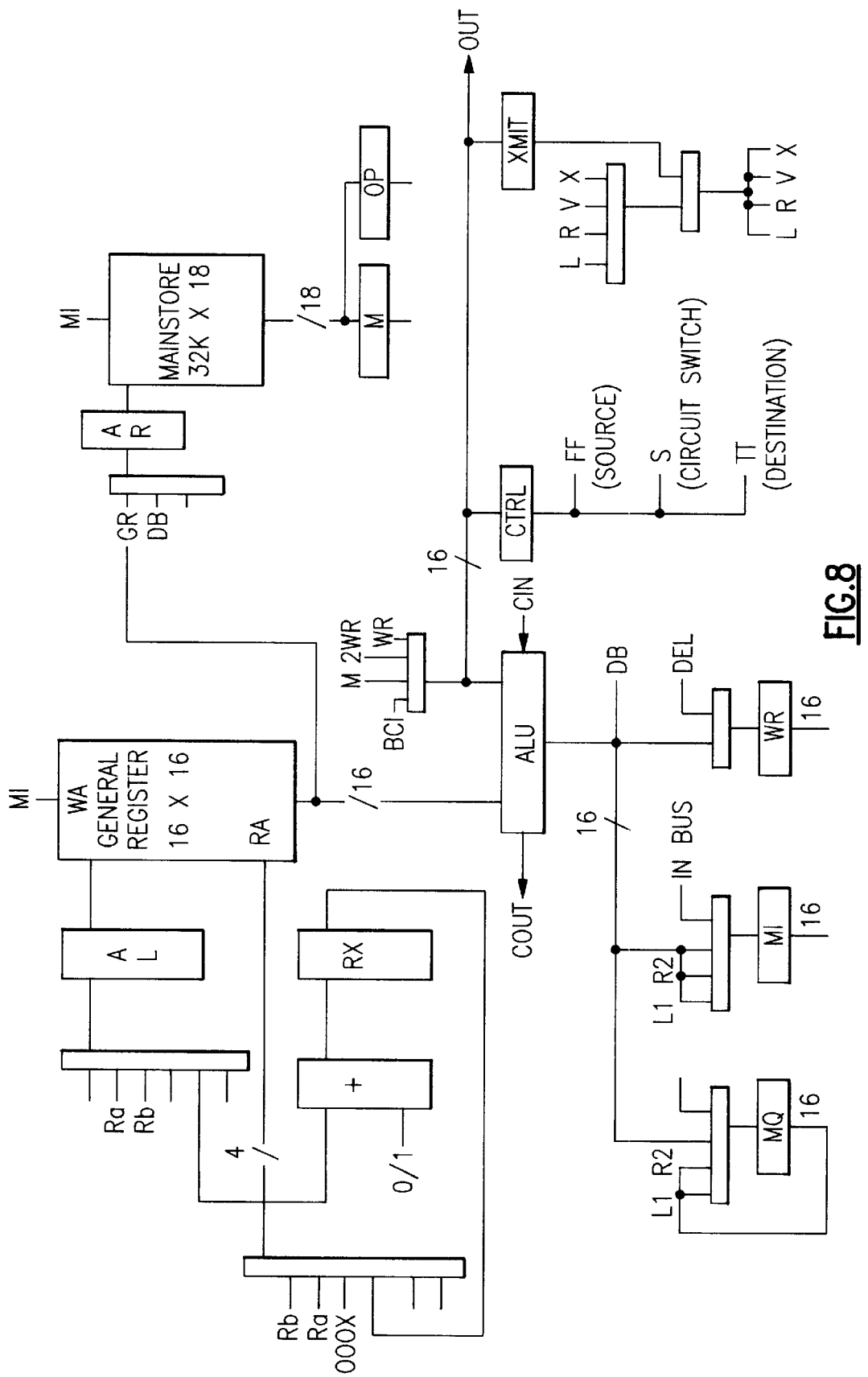
FIG. 8 illustrates PME data flow where a processor memory element is configured as a hardwired general purpose computer that provides about 5 MIPS fixed point processing or 0.4 MflopS via programmed control floating point operations.

The PME processing memory element develops for each of the multiple PMEs of a node, a fully distributed architecture. Every PME will be comprised of processing capability with 16 bit data flow, 64K bytes of local storage, store and forward/circuit switch logic, PME to PME communication, SIMD/MIMD switching capabilities, programmable routing, and dedicated floating point assist logic. These functions can be independently operated by the PME and integrated with other PMEs within the same chip to minimize chip crossing delays. Referring to FIGS. 7 and 8 we illustrate the PME dataflow. The PME consists of 16 bit wide dataflow 425, 435, 445, 455, 465, 32K by 16 bit memory 420, specialized I/O ports 400, 410, 480, 490 and I/O switching paths 425, plus the necessary control logic to permit the PME to fetch, decode and execute a 16 bit reduced instruction set 430, 440, 450, 460. The special logic also permits the PME to perform as both the processing unit 460 and data router. Specialized controls 405, 406, 407, 408 and capabilities are incorporated to permit rapid task switching and retention of program state information at each of the PMEs' interrupt execution levels. Such capabilities have been included in other processors; however, their application specifically for management of interprocessor I/O is unique in massively parallel machines. Specifically, it permits the integration of the router function into the PME without requiring specialized chips or VLSI development macros.

16 bit Internal Data Flow and Control

The major parts of the internal data flow of the processing element are shown in FIG. 7. FIG. 7 illustrates the internal data flow of the processing element. This processing element has a full 16 bit internal data flow 425, 435, 445, 455, 465. The important paths of the internal data flows use 12 nanosecond hard registers such as the OP register 450, M register 440, WR register 470, and the program counter PC register 430. These registers feed the fully distributed ALU 460 and I/O router registers and logic 405, 406, 407, 408 for all operations. With current VLSI technology, the processor can execute memory operations and instruction steps at 25 Mhz, and it can build the important elements, OP register 450, M register 440, WR register 470, and the PC register 430 with 12 nanosecond hard registers. Other required registers are mapped to memory locations.

As seen in FIG. 8 the internal data flow of the PME has its 32K by 16 bit main store in the form of two DRAM macros. The remainder of the data flow consists of CMOS gate array macros. All of the memory can be formed with the logic with low power CMOS DRAM deposition techniques to form an very large scaled integrated PME chip node. The PME is replicated 8 times in the preferred embodiment of the node chip. The PME data flow consists of a 16 word by 16 bit general register stack, a multi-function arithmetic/logic unit (ALU) working registers to buffer memory addresses, memory output registers, ALU output registers, operation/command, I/O output registers, and multiplexors to select inputs to the ALU and registers. Current CMOS VLSI technology for 4 MByte DRAM memory with our logic permits a PME to execute instruction steps at 25 Mhz. We are providing the OP register, the M register, the WR register and the general register stack with 12 nanosecond hard registers. Other required registers are mapped to memory locations within a PME.

The PME data flow is designed as a 16 bit integer arithmetic processor. Special multiplexor paths have been added to optimize subroutine emulation of n×16 bit floating point operations (n=>1). The 16 bit data flow permits effective emulation of floating point operations. Specific paths within the data flow have been included to permit floating point operations in as little as 10 cycles. The ISA includes special code point to permit subroutines for extended (longer than 16-bit) operand operations. The subsequent floating point performance is approximately one twentieth the fixed floating point performance. This performance is adequate to eliminate the need for special floating point chips augmenting the PME as is characteristic of other massively parallel machines. Some other processors do include the special floating point processors on the same chip as a single processor (See FIG. 1). We can enable special floating point hardware processors on the same chip with our PMEs but we would now need additional cells than is required for the preferred embodiment. For floating point operations, see also the concurrently filed FLOATING POINT application referenced above for improvements to the IEEE standard.

The approach developed is well poised to take advantage of the normal increases in VLSI technology performance. As circuit size shrinks and greater packaging density becomes possible then data flow elements like base and index registers, currently mapped to memory could be moved to hardware. Likewise, floating point sub-steps are accelerated with additional hardware which we will prefer for the developing CMOS DRAM technology as reliable higher density levels are achieved. Very importantly, this hardware alternative does not affect any software.

The PME is initialized to SIMD mode with interrupts disabled. Commands are fed into the PME operation decode buffer from the BCI. Each time an instruction operation completes, the PME requests a new command from the BCI. In a similar manner, immediate data is requested from the BCI at the appropriate point in the instruction execution cycle. Most instructions of the ISA operate identically whether the PME is in SIMD mode or in MIMD mode, with the exception of that SIMD instructions and immediate data are taken from the BCI; in MIMD mode the PME maintains a program counter (PC) and uses that as the address within its own memory to fetch a 16 bit instruction. Instructions such as "Branch" which explicitly address the program counter have no meaning in SIMD mode and some of those code points are reinterpreted to perform special SIMD functions as comparing immediate data against an area of main store.

The PME instruction decode logic permits either SIMD/ MIMD operational modes, and PMEs can transition between modes dynamically. In SIMD mode the PME receives decoded instruction information and executes that data in the next clock cycle. In MIMD mode the PME maintains a program counter PC address and uses that as the address within its own memory to fetch a 16 bit instruction. Instruction decode and execution proceeds as in most any other RISC type machine. A PME in SIMD mode enters MIMD mode when given the information that represents a decode branch. A PME in MIMD mode enters the SIMD mode upon executing a specific instruction for the transition.

When PMEs transition dynamically between SIMD and MIMD modes, an MIMD mode is entered by execution of a SIMD "write control register" instruction with the appropriate control bit set to a "1". At the completion of the SIMD instruction, the PME enters the MIMD mode, enables interrupts, and begins fetching and executing its MIMD instructions from the main store location specified by its general register R0. Interrupts are masked or unmasked depending on the state of interrupt masks when the MIMD control bit is set. The PME returns to SIMD mode either by being externally reinitialized or by executing a MIMD "write control register" instruction with the appropriate control bit set to zero.

Data Communication Paths and Control

Returning to FIG. 7 it will be seen that each PME has 3 input ports 400, and 3 output ports 480 intended for on-chip communication plus 1 I/O port 410, 490 for off chip communications. Existing technology, rather than the processor idea, requires that the off-chip port be byte wide half duplex. Input ports are connected such that data may be routed from input to memory, or from input AR register 405 to output register 408 via direct 16 bit data path 425. Memory would be the data sink for messages targeted at the PME or for messages that were moved in 'store and forward' mode. Messages that do not target the particular PME are sent directly to the required output port, providing a 'circuit switched' mode, when blocking has not occurred. The PME S/W is charged with performing the routing and determining the selected transmission mode. This makes dynamically selecting between 'circuited switched' and 'store and forward' modes possible. This is also another unique characteristic of the PME design.

Thus, our preferred node has 8 PMEs and each PME has 4 output ports (Left, Right, Vertical, and External). Three of the input ports and three of the output ports are 16-bit wide full duplex point-to-point connections to the other PMEs on the chip. The fourth ports are combined in the preferred embodiment to provide a half duplex point-to-point connection to an off-chip PME. Due to pin and power constraints that we have imposed to make use of the less dense CMOS we employ, the actual off-chip interface is a byte-wide path which is used to multiplex two halves of the inter-PME data word. With special "zipper" circuitry which provides a dynamic, temporary logical breaking of intermodal rings to allow data to enter or leave an array, these external PME ports provide the APAP external I/O array function.

For data routed to the PME memory, normal DMA is supported such that the PME instruction stream must become involved in the I/O processing only at the beginning and end of messages. Finally, data that is being 'circuit switched to an internal output port is forwarded without clocking. This permits single cycle data transfers within a chip and detects when chip crossings will occur such that the fastest but still reliable communication can occur. Fast forwarding utilizes forward data paths and backward control paths, all operating in transparent mode. In essence, a source looks through several stages to see the acknowledgments from the PME performing a DMA or off-chip transfer.

As seen by FIGS. 7 and 8 Data on a PME input port may be destined for the local PME, or for a PME further down the ring. Data destined for a PME further down the ring may be stored in the local PME main memory and then forwarded by the local PME towards the target PME (store and forward), or the local input port may be logically connected to a particular local output port (circuit switched) such that the data passes "transparently" through the local PME on its way to the target PME. Local PME software dynamically controls whether or not the local PME is in "store and forward" mode or in "circuit switched" mode for any of the four inputs and four outputs. In circuit switched mode, the PME concurrently processes all functions except the I/O associated with the circuit switch; in store and forward mode the PME suspends all other processing functions to begin the I/O forwarding process.

While data may be stored externally of the array in a shared memory or DASD (with external controller), it may be stored anywhere in the memories provided by PMEs. Input data destined for the local PME or buffered in the local PME during "store and forward" operations is placed into local PME main memory via a direct memory access (address) mechanism associated with each of the input ports. A program interrupt is available to indicate that a message has been loaded into PME main memory. The local PME program interprets header data to determine if the data destined for the local PME is a control message which can be used to set up a circuit-switched path to another PME, or whether it is a message to be forwarded to another PME. Circuit switched paths are controlled by local PME software. A circuit switched path logically couples a PME input path directly to an output path without passing through any intervening buffer storage. Since the output paths between PMEs on the same chip have no intervening buffer storage, data can enter the chip, pass through a number of PMEs on the chip and be loaded into a target PME's main memory in a single clock cycle! Only when a circuit switch combination leaves the chip, is an intermediate buffer storage required. This reduces the effective diameter of the APAP array by a number of unbuffered circuit switched paths. As a result data can be sent from a PME to a target PME in as few clock cycles as there are intervening chips, regardless of the number of PMEs in the path. This kind of routing can be compared to a switched environment in which at each node cycles are required to carry data on to the next node. Each of our nodes has 8 PMEs!

Memory and Interrupt Levels

The PME contains 32K by 16 bit 420 dedicated storage words. This storage is completely general and can contain both data and program. In SIMD operations all of memory could be data as is characteristic of other SIMD massively parallel machines. In MIMD modes, the memory is quite normal; but, unlike most massively parallel MIMD machines the memory is on the same chip with the PME and is thus, immediately available. This then eliminates the need for cache-ing and cache coherency techniques characteristic of other massively parallel MIMD machines. In the case for instance of Inmos's chip, only 4K resides on the chip, and external memory interface bus and pins are required. These are eliminated by us.

Low order storage locations are used to provide a set of general purpose registers for each interrupt level. The particular ISA developed for the PME uses short address fields for these register references. Interrupts are utilized to manage processing, I/O activities and S/W specified functions (i.e., a PME in normal processing will switch to an interrupt level when incoming I/O initiates). If the level is not masked, the switch is made by changing a pointer in H/W such that registers are accessed from a new section of low order memory and by swapping a single PC value. This technique permits fast level switching and permits S/W to avoid the normal register save operations and also to save status within the interrupt level registers.

The PME processor operates on one of eight program interrupt levels. Memory addressing permits a partitioning of the lower 576 words of memory amoung the eight levels of interrupts. 64 of these 576 words of memory are directly addressable by programs executing on any of the eight levels. The other 512 words are partitioned into eight 64 word segments. Each 64 word segment is directly accessible only by programs executing on its associated interrupt level. Indirect addressing techniques are employed for allowing all programs to access all 32K words of PME memory.

The interrupt levels are assigned to the input ports, the BCI, and to error handling. There is a "normal" level, but there is no "privileged", nor "supervisor" level. A program interrupt causes a context switch in which the contents of the PC program counter, status/control register, and selected general registers are stored in specified main memory locations and now values for these registers are fetched from other specified main memory locations.

The PME data flow discussed with reference to FIGS. 7 and 8, may he amplified by reference to the additional sections below. In a complex system, the PME data flow uses the combination of the chip as an array node with memory, processor and I/O which sends and receives messages with the BCI that we replicate as the basic building block of an MMP built with our APAP. The MMP can handle many word lengths.

PME Multiple Length Data Flow Processing

The system we describe can perform the operations handled by current processors with the data flow in the PME which is 16 bits wide. This is done by performing operations on data lengths which are multiples of 16 bits. This is accomplished by doing the operation in 16 bit pieces. One may need to know the result of each piece (i.e. was it zero, was there a carry out of the high bits of the sum).

Adding two numbers of 48 bits can be an example of data flow. In this example two numbers of 48 bits (a(0–47) and b(0–47)) are added by performing the following in the hardware:

a(32–47)+b(32–47)->ans(32–47)     step one 1) save the carry out of high bit of sum
2) remember if partial result was zero or non-zero a(16–31)+b(16–31)+save carry->ans(16-31)     step two 1) save the carry out of high bit of sum
2) remember if partial result was zero or non-zero from this result and from previous step; if both are zero remember zero; if either is non-zero remember non-zero a(0–15)+b(0–15)+saved carry->ans(0–15)     final step 1) if this piece is zero and last piece was zero ans is zero
2) if this piece is zero and last piece was non-zero ans is non-zero
3) if this piece is non-zero ans is positive or negative based on sign of sum (assuming no overflow)
4) if carry into sign of ans is not-equal to carry out of sign of answer, ans has wrong sign and result is an overflow (can not properly represent in the available bits)

The length can be extended by repeating the second step in the middle as many times as required. If the length were 32 the second step would not be performed. If the length were greater than 48, step two would be done multiple times. If the length were just 16 the operation in step one, with conditions 3 and 4 of the final step would be done. Extending the length of the operands to multiple lengths of the data flow is a technique having a consequence that the instruction usually takes longer to execute for a narrower data flow. That is, a 32 bit add on a 32 bit data flow only takes one pass through the adder logic, while the same add on a 16 bit data flow takes two passes through the adder logic.

What we have done that is interesting is that in the current implementation of the machine we have single instructions which can perform adds/subtracts/compares/moves on operands of length 1 to 8 words (length is defined as part of the instruction). Individual instructions available to the programmer perform the same kind of operations as shown above for steps one, two, and final (except to the programmer the operand length is longer i.e. 16 to 128 bits). At the bare bones hardware level, we are working on 16 bits at a time, but the programmer thinks s/he's doing 16 to 128 bits at a time.

By using combinations of these instructions, operands of any length can be manipulated by the programmer i.e. two instructions can be used to add two numbers of up to 256 bits in length.

PME Processor

Our PME processor is different from modern microprocessors currently utilized for MPP applications. The processor portion differences include:

1. the processor is a fully programmable hardwired computer (see the ISA description for an instruction set overview) with:
   - it has a complete memory module shown in the upper right corner (see FIG. 8),
   - it has hardware registers with controls required to emulate separate register sets for each interrupt level (shown in upper left corner),
   - its ALU has the required registers and controls to permit effective multi-cycle integer and floating point arithmetic,
   - it has I/O switching paths needed to support packet or circuit switched data movement between PMEs interconnected by point-to-point links shown in the lower right corner.
2. This is our minimal-ist approach to processor design permitting eight replications of the PME per chip with the CMOS DRAM technology.
3. This processor portion of the PME provides about the minimum dataflow width required to encode a fast Instruction Set Architecture (ISA)—see Tables—which is required to permit effective MIMD or SIMD operation of our MMP.

PME Resident Software

The PME is the smallest element of the APAP capable of executing a stored program it can execute a program which is resident in some external control element and fed to it by the broadcast and control interface (BCI) in SIMD mode or it can execute a program which is resident in its own main memory (MIMD mode). It can dynamically switch between SIMD mode and MIMD mode representing SIMD/MIMD mode duality functions, and also the system can execute these dualities at the same time (SIMIMD mode). A particular PME can make this dynamic switch by merely setting or resetting a bit in a control register. Since SIMD PME software is actually resident in the external control element, further discussion of this may be found in our discussion of the Array Director and in related applications.

MIMD software is stored into the PME main memory while the PME is in SIMD mode. This is feasible since many of the PMEs will contain identical programs because they will be processing similar data in an asynchronous manner. Here we would note that these programs are not fixed, but they can be modified by loading the MIMD program from an external source during processing of other operations.

Since the PME instruction set architecture represented in the Tables is that of a microcomputer, there are few restrictions with this architecture on the functions which the PME can execute. Essentially each PME can function like a RISC microprocessor. Typical MIMD PME software routines are listed below:

1. Basic control programs for dispatching and prioritizing the various resident routines.
2. Communication software to pass data and control messages among the PMEs. This software would determine when a particular PME would go into/out of the "circuit switched" mode. It performs a "store and forward" function as appropriate. It also initiates, sends, receives, and terminates messages between its own main memory and that of another PME.
3. Interrupt handling software completes the context switch, and responds to an event which has caused the interrupt. These can include fail-safe routines and rerouting or reassignment of PMEs to an array.
4. Routines which implement the extended Instruction Set Architecture which we describe below. These routings perform macro level instructions such as extended precision fixed point arithmetic, floating point arithmetic, vector arithmetic, and the like. This permits not only complex math to be handled but image processing activities for display of image data in multiple dimensions (2d and 3d images) and multimedia processes.
4. Standard mathematical library functions can be included. These can preferably include LINPAK and VPSS routines. Since each PME may be operating on a different element of a vector or matrix, the various PMEs may all be executing different routines or differing portions of the same matrix at one time.
5. Specialized routines for performing scatter/gather or sorting functions which take advantage of the APAP nodal interconnection structure and permit dynamic multi-dimensional routing are provided. The routines effectively take advantage of some amount of synchronization provided among the various PMEs, while permitting asynchronous operations to continue. For sorts, there are sort routines. The APAP is well suited to a Batcher Sort. Because that sort requires extensive calculations to determine particular element to compare versus very short comparison cycles. Program synchronization is managed by the I/O statements. The program allows multiple data elements per PME and very large parallel sorts in quite a straight forward manner.

While each PME has its own resident software, the systems made from these microcomputers can execute higher level language processes designed for scalar and parallel machines. Thus the system can execute application programs which have been written for UNIX machines, or those of other operating systems, in high level languages such as Fortran, C, C++, FortranD, and so on.

It may be an interesting footnote that our processor concepts use an approach to processor design which is quite old. Perhaps thirty years of use of a similar ISA design has occurred in IBM's military processors. We have been the first to recognize that this kind of design can be used to advantage to leapfrog the dead ended current modern microprocessor design when combined with our total PME design to move the technology to a new path for use in the next century.

Although the processor's design characteristics are quite different from other modern microprocessors, similar gate constrained military and aerospace processors have used the design since the '60s. It provides sufficient instructions and registers for straight forward compiler development, and both general and signal processing applications are effectively running on this design. Our design has minimal gate requirements, and IBM has implemented some similar concepts for years when embedded chip designs were needed general purpose processing. Our adoption now of parts of the older ISA design permits use of many utilities and other software vehicles which will enable adoption of our systems at a rapid rate because of the existing base and the knowledge that many programmers have of the design concepts.

PME I/O

The PME will interface to the broadcast and control interface (BCI) bus by either reading data from the bus into the ALU via the path labeled BCI in FIG. 8 or by fetching instructions from the bus directly into the decode logic (not shown). The PME powers up in SIMD mode and in that mode reads, decodes and executes instructions until encountering a branch. A broadcast command SIMD mode causes the transition to MIMD with instructions fetched locally. A broadcast PME instruction 'INTERNAL DIOW' reverts the state.

PME I/O can be sending data, passing data or receiving data. When sending data, the PME sets the CTL register to connect XMIT to either L, R, V, or X. H/W services then pass a block of data from memory to the target via the ALU multiplexer and the XMIT register. This processing interleaves with normal instruction operation. Depending upon application requirements, the block of data transmitted can contain raw data for a predefined PME and/or commands to establish paths. A PME that receives data will store input to memory and interrupt the active lower level processing. The interpretation task at the interrupt level can use the interrupt event to do task synchronization or initiate a transparent I/O operation (when data is addressed elsewhere.) During the transparent I/O operation, the PME is free to continue execution. Its CTL register makes it a bridge. Data will pass through it without gating, and it will remain in that mode until an instruction or the data stream resets CTL. While a PME is passing data it cannot be a data source, but it can be a data sink for another message.

PME Broadcast Section

This is a chip-to-common control device interface. It can be used by the device that serves as a controller to command I/O, or test and diagnose the complete chip.

Input is word sequences (either instruction or data) that are available to subsets of PMEs. Associated with each word is a code indicating which PMEs will use the word. The the BCI will use the word both to limit a PME's access to the interface and to assure that all required PMEs receive data. This serves to adjust the BCI to the asynchronous PME operations. (Even when in SIMD mode PMEs are asynchronous due to I/O and interrupt processing.) The mechanism permits PMEs to be formed into groups which are controlled by interleaved sets of command/data words received over the BCI.

Besides delivering data to the PMEs, the BCI accepts request codes from the PME combines them, and transmits the integrated request. This mechanism can be used in several ways. MIMD processes can be initiated in a group of processors that all end with an output signal. The 'AND' of signals triggers the controller to initiate a new process. Applications, in many cases, will not be able to load all required S/W in PME memory. Encoded request to the controller will be used to acquire a S/W overlay from perhaps the host's storage system.

The controller uses a serial scan loop through many chips to acquire information on individual chips or PMEs. These loops initially interface to the BCI but can in the BCI be bridged to individual PMEs.

Broadcast and Control Interface

The BCI broadcast and control interface provided on each chip provides a parallel input interface such that data or instructions can be sent to the node. Incoming data is tagged with a subset identifier and the BCI includes the functions required to assure that all PMEs within the node, operating within the subset, are provided the data or instructions. The parallel interface of the BCI serves both as a port to permit data to be broadcast to all PMEs and as the instruction interface during SIMD operations. Satisfying both requirements plus extending those requirements to supporting subset operations is completely unique to this design approach.

Our BCI parallel input interface permits data or instructions to be sent from a control element that is external to the node. The BCI contains "group assignment" registers (see the grouping concepts in our above application entitled GROUPING OF SIMD PICKETS) which are associated with each of the PMEs. Incoming data words are tagged with a group identifier and the BCI includes the functions required to assure that all PMEs within the node which are assigned to the dedicated group are provided the data or instructions. The parallel interface of the BCI serves as both a port to permit data to be broadcast to the PMEs during MIMD operations, and as the PME instruction/immediate operand interface during SIMD operations.

The BCI also provides two serial interfaces. The high speed serial port will provide each PME with the capability to output a limited amount of status information. That data is intended to:

1. signal our Array Director 610 when the PME, e.g. 500, has data that needs to be read or that the PME has completed some operation. It passes a message to the external control element represented by the Array Director.
2. provide activity status such that external test and monitor elements can illustrate the status of the entire system.

The standard serial port permits the external control element means for selectively accessing a specific PME for monitor and control purposes. Data passed over this interface can direct data from the BCI parallel interface to a particular PME register or can select data from a particular PME register and route it to the high speed serial port. These control points allow the external control element to monitor and control individual PMEs during initial power up and diagnostic phases. It permits Array Director to input control data so as to direct the port to particular PME and node internal registers and access points. These registers provide paths such that PME of a node can output data to the Array Director, and these registers permit the Array Director to input data to the units during initial power up and diagnostic phases. Data input to access point can be used to control test and diagnostic operations, ie. perform single instruction step, stop on compare, break points, etc.

Node Topology

Our modified hypercube topology connection is most useful for massively parallel systems, while other less powerful connections can be used with our basic PMEs. Within our initial embodiment of the VLSI chip are eight PMEs with fully distributed PME internal hardware connections. The internal PME to PME chip configuration is a two rings of four PMEs, with each PME also having one connection to a PME in the other ring. For the case of eight PMEs in a VLSI chip this is a three dimensional binary hypercube, however our approach in general does not use hypercube organizations within the chip. Each PME also provides for the escape of one bus. In the initial embodiment the escaped buses form one ring are called +X, +Y, +W and +Z, while those from the other ring are labeled similarly except − (minus).

The specific chip organization is referred to as the node of the array, and a node can be in a cluster of the array. The nodes are connected using +-X and +-Y into an array, to create a cluster. The dimensionality of the array is arbitrary, and in general greater than two which is the condition required for developing a binary hypercube. The clusters are then connected using +-W, +-Z into a array of clusters. Again, the dimensionality of the array is arbitrary. The result is the 4-dimensional hypercube of nodes. The extension to a 5-dimensional hypercube requires the usage of a 10 PME node and uses the additional two buses, say +-E1 to connect the 4-dimensional hypercube into a vector of hypercubes. We have then shown the pattern of extension to either odd or even radix hypercubes. This modified topology limits the cluster to cluster wiring while supporting the advantages of the hypercube connection.

Our wireability and topology configuration for massively parallel machines has advantages in keeping the X and Y dimensions within our cluster level of packaging, and in distributing the W and Z bus connections to all the neighboring clusters. After implementing the techniques described, the product will be wireable, and manufacturable while maintaining the inherent characteristics of the topology defined.

Figure 15:
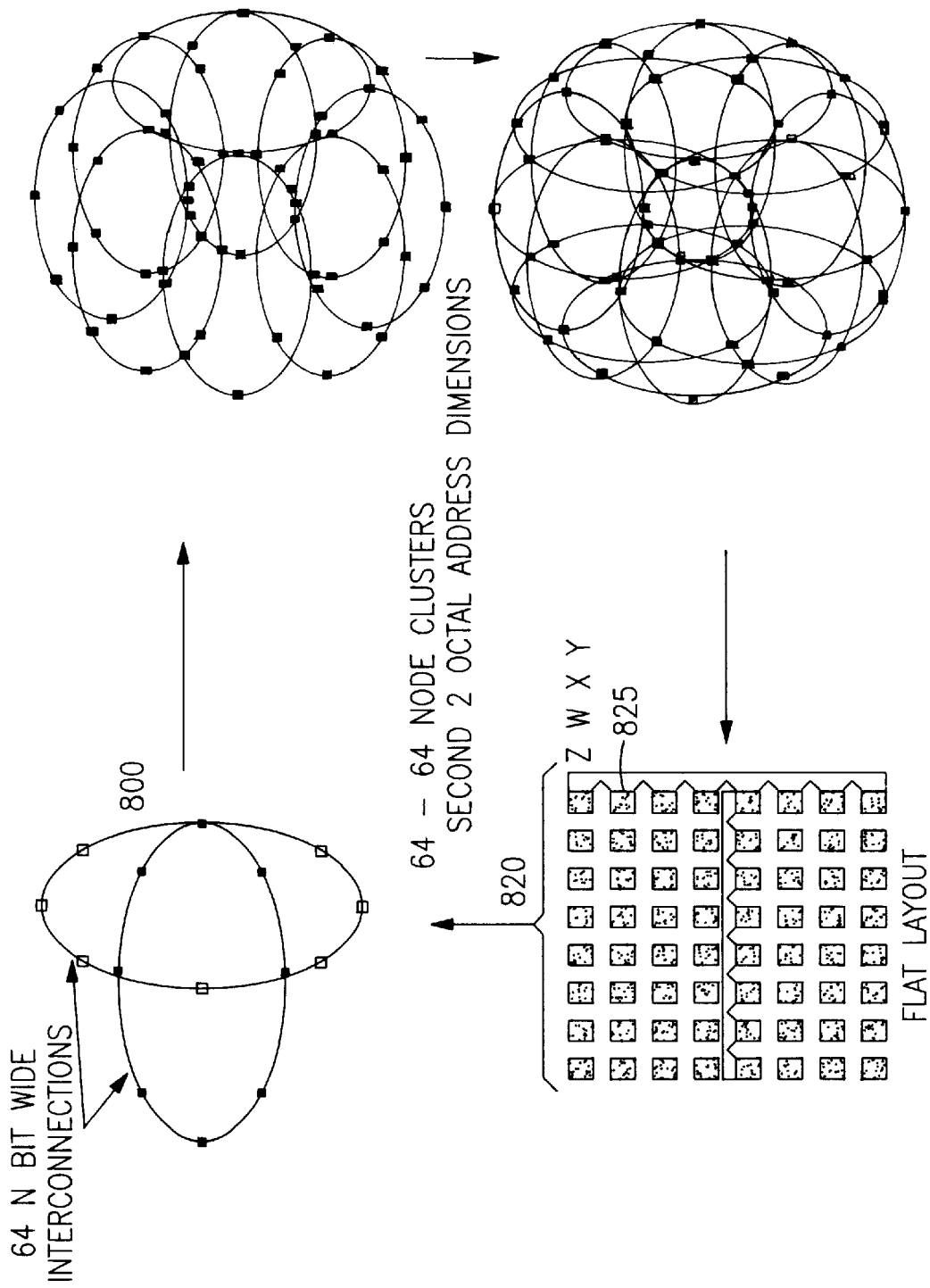
FIG. 15 shows an 8 degree hypercube connection illustrating a packaging technique in accordance with our invention applicable to an 8 degree hypercube.

The node consists of k*n PMEs plus the Broadcast and Control Interface (BCI) section. Here "n" represents the number of dimensions or rings, which characterize the modified hypercube, while "k" represents the number of rings that characterize the node. Although a node can contain k rings it is a characteristic of the concept that only two of those rings may provide escape buses. "n" and "k" is limited in our preferred embodiment, because of the physical chip package to N=4 and k=2. This limitation is a physical one, and different chips sets will allow other and increased dimensionality in the array. In addition to being a part of the physical chip package, it is our preferred embodiment to provide a grouping of PMEs that interconnect a set of rings in a modified hypercube. Each node will have 8 PMEs with their PME architecture and ability to perform processing and data router functions. As such, n is the dimensionality of the modified hypercube (see following section), i.e., a 4d modified hypercube's node element would be 8 PMEs while a 5d modified hypercube's node would be 10 PMEs. For visualization of nodes which we can employ, refer to FIG. 6, as well as FIGS. 9 and 10 for visualization of interconnections and see FIG. 11 for a block diagram of each node. FIGS. 15 and 16 elaborate on possible interconnections for an APAP.

It will be noted that the application entitled "METHOD FOR INTERCONNECTING AND SYSTEM OF INTERCONNECTED PROCESSING ELEMENTS" of co-inventor David B. Rolfe, filed in the United States Patent and Trademark office on May 13, 1991, under U.S. Ser. No. 07/698,866 now U.S. Pat. No. 5,313,615, described the modified hypercube criteria which can preferably be used in connection with our APAP MMP. That application is incorporated by reference and describes a method of interconnecting processing elements in such a way that the number of connections per element can be balanced against the network diameter (worst case path length). This is done by creating a topology that maintains many of the well known and desirable topological properties of hypercubes while improving its flexibility by enumerating the nodes of the network in number systems whose base can be varied. When using a base 2 number system this method creates the hypercube topology. The invention has fewer interconnections than a hypercube, uniform connections and preserves the properties of a hypercube. These properties include: 1) large number of alternate paths, 2) very high aggregate bandwidth, and 3) well understood and existing methods that can be used to map other common problem topologies with the topology of the network. The result is a generalized non-binary hypercube with less density. It will be understood that with the preference we have given to the modified hypercube approach, in some applications a conventional hypercube can be utilized. In connecting nodes, other approaches to a topology could be used; however, the ones we describe herein are believed to be new and an advance, and we prefer the ones we describe.

The interconnection methods for the modified hypercube topology for interconnecting a plurality of nodes in a network of PMEs:

1. defines a sets of integers e1, e2, e3, . . . such the product of all elements equals the number of PMEs in the network called M, while the product of all elements in the set excepting e1 and e2 is the number of nodes called N, and the number of elements in the set called m defines the dimensionality of the network n by the relationship n=m−2.
2. addresses a PME located by a set of indexes a1, a2, . . . am, where each index is the PMEs position in the equivalent level of expansion such that the index ai is in the range of zero to ei−1 for i equal to 1, 2, to m., by the formula ( . . . (a(m)*e(m−1)+a(m−2))e(m−1) . . . a(2)*e(1))+a(1) where the notation a(i) has the normal meaning of the the ith element in the list of elements called a, or equivalently for e.
3. connects two PMEs (with addresses f and g) if and only if either of the following two conditions hold:
   a. the integer part of r/(e1*e2) equals the integer part of s/(e1*e2) and:
      1) the remainder part of r/e1 differs from the remainder part of s/e1 by 1 or,
      2) the remainder part of r/e2 differs from the remainder part of s/e2 by 1 or e2−1.
   b. the remainder part of r/ei differs from the remainder part of s/ei for i in the range 3, 4, . . . m and the remainder part of r/e1 equals the remainder part of s/e2 which equals i minus three, and the remainder part of r/e2 differs from the remainder part of s/e2 by e2 minus one.

As a result the computing system nodes will form a non-binary hypercube, with the potential for being different radix in each dimension. The node is defined as an array of PMEs which supports 2*n ports such that the ports provided by nodes match the dimensionality requirements of the modified hypercube. If the set of integers e3, e4, . . . em, which define the specific extent of each dimension of a particular modified hypercube are all taken as equal, say b, and if e1 and e2 are taken a 1, then the previous formulas for addressability and connections reduce to:

1. N=b * * n
2. addressing a PME as numbers representing the base b numbering system
3. connecting two computing elements (f and g) if and only if the address of f differs from the address of g in exactly one base b digit. using the rule that 0 and b-1 are separated by 1.
4. the number of connections supported by each PME is 2*n Which is exactly as described in the base application, with the number of communication buses spanning non-adjacent PMEs chosen as zero.

Intra-Node PME Interconnections

Figure 9:
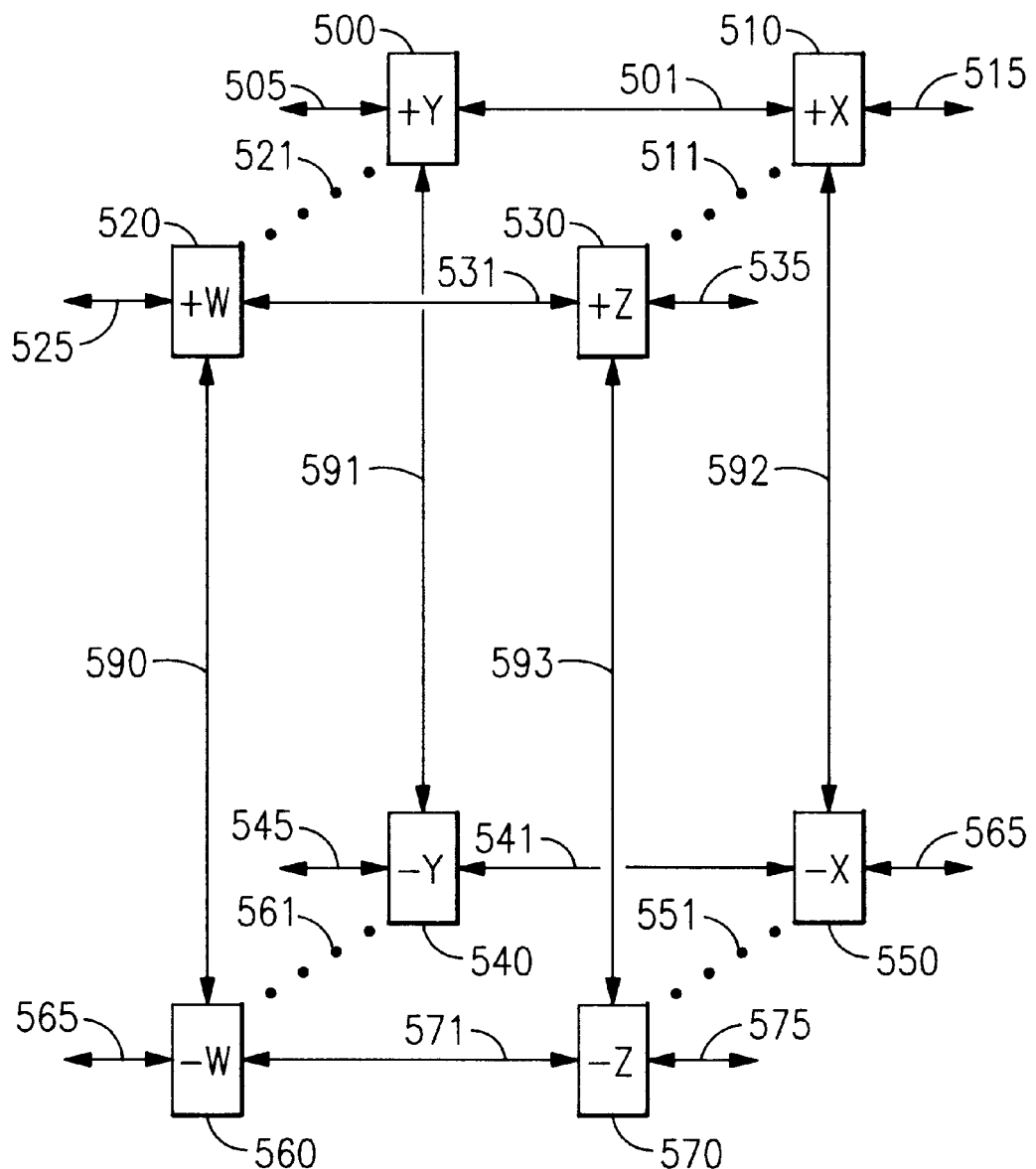
Figure 10:
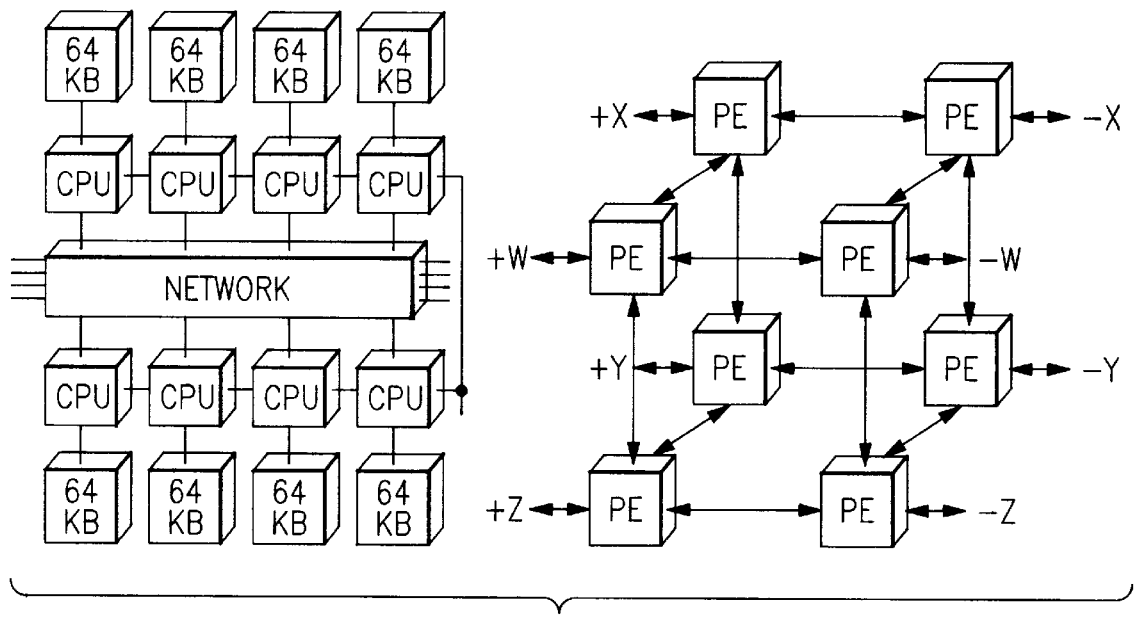
FIG. 10 illustrates node interconnections for the chip or node which has 8 PMEs, each of which manages a single external port and permits distribution of the network control function and eliminates a functional hardware port bottleneck.

PMEs are configured within the node as a 2 by n array. Each PME is interconnected with its three neighbors (edges wrap only in the second dimension) using a set of input/output ports, thus, providing full duplex communication capability between PMEs. Each PMEs external input and output port is connected to node I/O pins. Input and output ports may be connected to share pins for half-duplex communication or to separate pins for full-duplex capability. The interconnections for a 4d modified hypercube node are shown in FIGS. 9 and 10. (Note that where n is even the node can be considered to be a 2 by 2 by n/2 array.)

FIG. 9 illustrates the the eight processing elements 500, 510, 520, 530, 540, 550, 560, 570 within the node. The PMEs are connected in a binary hypercube communication network. This binary hypercube displays three intra connections between PMEs (501, 511 521, 531, 541, 551, 561, 571, 590, 591, 592, 593). Communication between the PME is controlled by in and out registers under control of the processing element. This diagram shows the various paths that can be taken to escape I/O out any of the eight directions, +-w 525, 565, +-x 515, 555, +-y 505, 545, +-z 535, 575. The communication can be accomplished without storing the data into memory if desired.

It may be noted that while a network switch chip could be employed to connect various cards each having our chip with other chips of the system, it can and should desirably be eliminated. Our inter PME network that we describe as the "4d torus" is the mechanism used for inter PME-communication. A PME can reach any other PME in the array on this interface. (PMEs in between may be Store/Forward or Circuit Switched)

Chip Relationships for Interconnections

We have discussed the chip, and FIG. 11 shows a block diagram of the PME Processor/Memory chip. The chip consists of the following elements each of which will be described in later paragraphs:

1. 8 PMEs each consisting of a 16 bit programmable processor and 32K words of memory (64K bytes),
2. Broadcast Interface (BCI) to permit a controller to operate all or subsets of the PMEs and to accumulate PME requests,
3. Interconnection Levels
   a. Each PME supports four 8 bit wide inter-PME communication paths. These connect to 3 neighboring PMEs on the chip and 1 off chip PME.
   b. Broadcast-to-PME busing, which makes data or instructions available.
   c. Service Request lines that permit any PME to send a code to the controller. The BCI combines the requests and forwards a summary.
   d. Serial Service loops permit the controller to read all detail about the functional blocks. This level of interconnection extends from the BCI to all PMEs (FIG. 11 for ease of presentation omits this detail.)

Interconnection and Routing

The MPP will be implemented by replication of the PME. The degree of replication does not affect the interconnection and routing schemes used. FIG. 6 provides an overview of the network interconnection scheme. The chip contains 8 PMEs with interconnections to their immediate neighbors.

This interconnection pattern results in the three dimensional cube structure shown in FIG. 10. Each of the processors within the cube has a dedicated bidirectional byte port to the chip's pins; we refer to the set of 8 PMEs as a node.

An n by n array of nodes is a cluster. Simple bridging between the + and -x ports and the + and -y ports provide the cluster node interconnections. Here the our preferred chip or node has 8 PMEs, each of which manages a single external port. This distributes the network control function and eliminates a possible bottleneck for ports. Bridging the outer edges makes the cluster into a logical torus. We have considered clusters with n=4 and n=8 and believe that n=8 is the better solution for commercial applications while n=4 is better for military conduction cooled applications. Our concept does not impose an unchangeable cluster size. On the contrary, we anticipate some applications using variations.

An array of clusters results in the 4 dimensional torus or hypercube structure illustrated in FIG. 10. Bridging between the + and -w ports and + and -z ports provides the 4d torus interconnections. This results in each node within a cluster connected to an equivalent node in all adjacent clusters. (This provides 64 ports between two adjacent clusters rather than the 8 ports that would result from larger clusters.) As with the cluster size, the scheme does not imply a particular size array. We have considered 2×1 arrays desirable for workstations and MIL applications and 4×4 , 4×8 and 8×8 arrays for mainframe applications.

Developing an array of 4d toruses is beyond the gate, pin, and connector limitations of our current preferred chip. However, that limitation disappears with our alternative on-chip optical driver/receiver is employed. In this embodiment our network could use an optical path per PME; with 12 rather than 8 PMEs per chip the array of 4d toruses with multi-Tflop (Teraflop) performance and it seems to be economically feasible to make such machines available for the workstation environment. Remember that such alternative machines will use the application programs developed for our current preferred embodiment.

4d cluster Organization

For constructing a 4d modified hypercube 360, as illustrated in FIGS. 6 and 10, nodes supporting 8 external ports 315 are required. Consider the external ports to be labeled as +X, +Y, +Z, +W, -X, -Y, -Z, -W. Then using $m_1$ nodes, a ring can be constructed by connecting the +X to -X ports. Again $m_2$ such rings can be interconnected into a ring of rings by interconnecting the matching +Y to -Y ports. This level of structure will be called a cluster 320. With $m_1=m_2=8$ it provides for 512 PMEs and such a cluster will be a building block for several size systems (330, 340, 350), as illustrated with m=8 in FIG. 6.

4d Array Organization

For building large fine-grained systems, sets of $m_3$ clusters are interconnected in rows using the +Z to –Z ports. The $m_4$ rows are then interconnected using the +W to –W ports. For $m_1=\ldots m_4=8$ this results in system with 32768 or $8^{4+1}$ PMEs. The organization does not require that every dimension be equally populated as shown in FIG. 6 (large fine-grained parallel processor 370). In the case of the fine-grained small processor, only a cluster might be used with the unused Z and W ports being interconnected on the card. This technique saves card connector pins and makes possible the application of this scalable processor to workstations 340, 350 and avionics applications 330, both of which are connector pin limited. Connecting +/– ports together in the Z and W pairs leads to a workstation organization that permits debug, test and large machine software development.

Again, much smaller scale versions of the structure can be developed by generating the structure with a value smaller than m=8. This will permit construction of single card processors compatible with the requirements for accelerators in the PS/2 or RISC System 6000 workstation 350.

I/O Performance

I/O performance includes overhead to setup transfers and actual burst rate data movement. Setup overhead depends upon application function I/O complexity and network contention. For example, an application can program circuit switched traffic with buffering to resolve conflicts or it can have all PMEs transmit left and synchronize. In the first case, I/O is a major task and detailed analysis would be used to size it. We estimate that simple case setup overhead is 20 to 30 clock cycles or 0.8 to 1.2 u-sec.

Burst rate I/O is the maximum rate a PME can transfer data (with either an on or off chip neighbor.) Memory access limits set the data rate at 140 nsec per byte, corresponding to 7.14 Mbyte/s. This performance includes buffer address and count processing plus data read/write. It uses seven 40 ns cycles per 16 bit word transferred.

This burst rate performance corresponds to a cluster having a maximum potential transfer rate of 3.65 Gbytes/s. It also means that a set of eight nodes along a row or column of the cluster will achieve 57 Mbyte/s burst data rate using one set of their 8 available ports. This number is significant because I/O with the external world will be done by logically 'unzipping' an edge of the wrapped cluster and attaching it to the external system bus.

Inter-PME Routing Protocol

The SIMD/MIMD PME comprises interprocessor communication to the external I/O facilities, broadcast control interfaces, and switching features which allow both SIMD/MIMD operation within the same PME. Embedded in the PME is the fully distributed programmable I/O router for processor communication and data transfers between PMEs.

The PMEs have fully distributed interprocessor communication hardware to on-chip PMEs as well as to the external I/O facilities which connect to the interconnected PMEs in the modified hypercube configuration. This hardware is complemented with the flexible programmability of the PME to control the I/O activity via software. The programmable I/O router functions provide for generating data packets and packet addresses. With this information the PME can send the information thru the network of PMEs in a directed method or out multiple paths determined by any fault tolerance requirements.

Distributed fault tolerance algorithms or program algorithms can take advantage of the programmability along with the supported circuit switched modes of the PME. This performance combinational mode enables everything from off-line PMEs or optimal path data structures to be accomplished via the programmable I/O router.

Our study of applications reveals that it is sometimes most efficient to send bare data between PMEs. At other times applications require data and routing information. Further, it is sometimes possible to plan communications so that network conflicts cannot occur; other applications offer the potential for deadlock, unless mechanisms for buffering messages at intermediate nodes are provided. Two examples illustrate the extremes. In the relaxation phase of a PDE solution, each grid point can be allocated to a node. The inner loop process of acquiring data from a neighbor can easily be synchronized over all nodes. Alternatively, image transformations use local data parameters to determine communication target or source identifiers. This results in data moves through multiple PMEs, and each PME becomes involved in the routing task for each packet. Preplanning such traffic is generally not possible.

To enable the network to be efficient for all types of transfer requirements, we partition, between the H/W and S/W, the responsibility for data routing between PMEs. S/W does most of the task sequencing function. We added special features to the hardware (H/W) to do the inner loop transfers and minimize software (S/W) overhead on the outer loops.

I/O programs at dedicated interrupt levels manage the network. For most applications, a PME dedicates four interrupt levels to receiving data from the four neighbors. We open a buffer at each level by loading registers at the level, and executing the IN (it uses buffer address and transfer count but does not await data receipt) and RETURN instruction pair. Hardware then accepts words from the particular input bus and stores them to the buffer. The buffer full condition will then generate the interrupt and restore the program counter to the instruction after the RETURN. This approach to interrupt levels permits I/O programs to be written that do not need to test what caused the interrupt. Programs read data, return, and then continue directly into processing the data they read. Transfer overhead is minimized as most situations require little or no register saving. Where an application uses synchronization on I/O, as in the PDE example, then programs can be used to provide that capability.

Write operations can be started in several ways. For the PDE example, at the point where a result is to be sent to a neighbor, the application level program executes a write call. The call provides buffer location, word count and target address. The write subroutine includes the register loads and OUT instructions needed to initiate the H/W and return to the application. H/W does the actual byte by byte data transfer. More complicated output requirements will use an output service function at the highest interrupt level. Both application and interrupt level tasks access that service via a soft interrupt.

Setting up circuit switched paths builds on these simple read and write operations. We start with all PMEs having open buffers sized to accept packet headers but not the data. A PME needing to send data initiates the transfer by sending an address/data block to a neighboring PME whose address better matches the target. In the neighboring PME address information will be stored; due to buffer full an interrupt will occur. The interrupt S/W tests the target address and will either extend the buffer to accept the data or write the target address to an output port and set the CTL register for transparent data movement. (This allows the PME to overlap its application executions with the circuit switched bridging operation.) The CTL register goes to busy state and remains transparent until reset by the presence of a signal at end of data stream or abnormally by PME programming. Any number of variations on these themes can be implemented.

System I/O and Array Director

Figure 12:
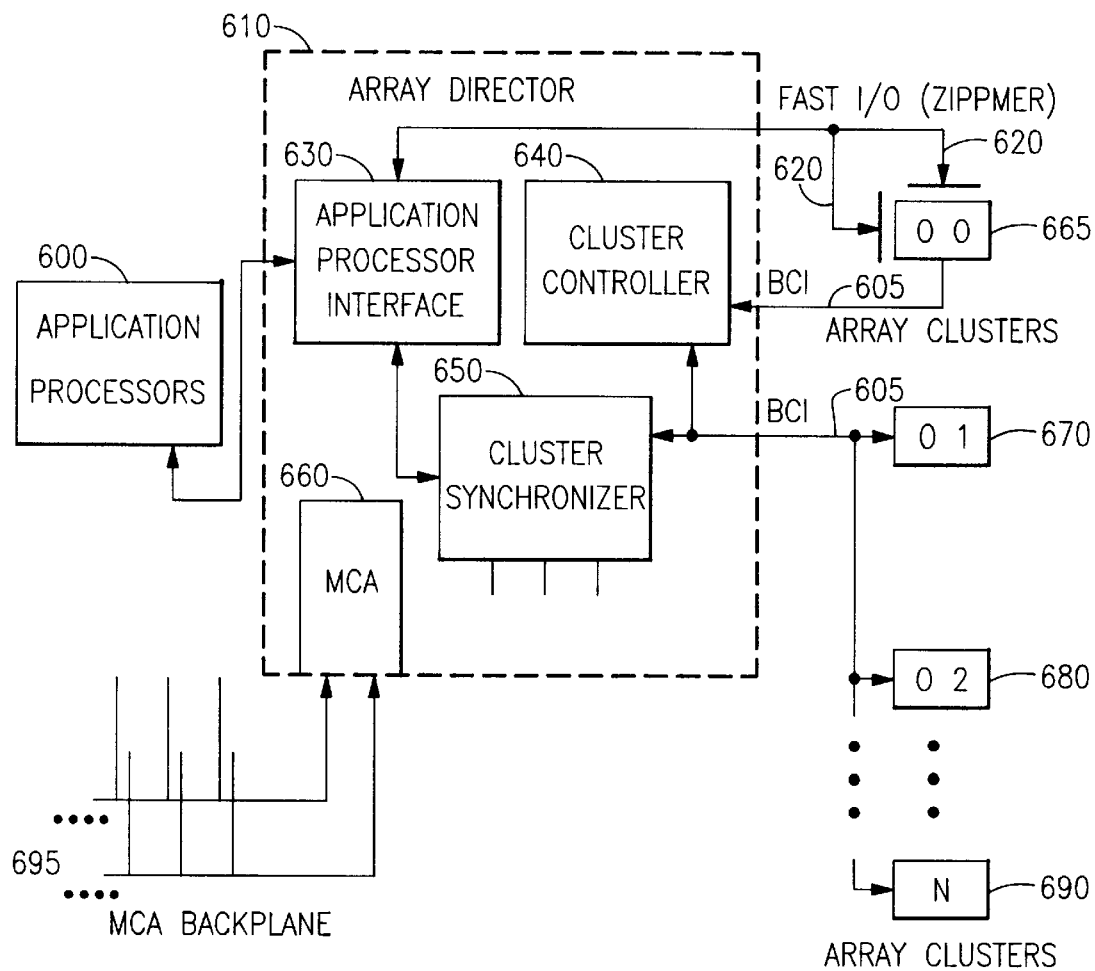
FIG. 12 shows an array director in the preferred embodiment.

FIG. 12 shows an Array Director in the preferred embodiment, which may perform the functions of the controller of FIG. 13 which describes the system bus to array connections. FIG. 13 is composed of two parts, (a) the bus to/from a cluster, and part (b) the communication of information on the bus to/from a PME. Loading or unloading the array is done by connecting the edges of clusters to the system bus. Multiple system buses can be supported with multiple clusters. Each cluster supports 50 to 57 Mbyte/s bandwidth. Loading or unloading the parallel array requires moving data between all or a subset of the PMEs and standard buses (ie MicroChannel, VME-bus, FutureBus, etc). Those buses, part of the host processor or array controller, are assumed to be rigidly specified. The PME Array therefore must be adapted to the buses. The PME Array can be matched to the bandwidth of any bus by interleaving bus data onto n PMEs, with n picked to permit PMEs both I/O and processing time. FIG. 13 shows how we might connect the system buses to the PMEs at two edges of a cluster. Such an approach would permit 114 Mbyte/s to be supported. It also permits data to be loaded at half the peak rate to two edges simultaneously. Although this reduces the bandwidth to 57 Mbyte/s/cluster, it has the advantage of providing orthogonal data movement within the array and ability to pass data between two buses. (We use those advantages to provide fast transpose and matrix multiply operation.)

As shown in part (a) of FIG. 13, the bus "dots to all paths on the edges of the cluster; and, the controller generates a gate signal to each path in the required interleave timing. If required to connect to a system bus with greater than 57 Mbyte/s, the data will be interleaved over multiple clusters. For example, in a system requiring 200 Mbyte/s system buses, groups of 2 or 4 clusters will be used. A large MPP has the capacity to attach 16 or 64 such buses to its xy network paths. By using the w and z paths in addition to the x and y paths, that number could be doubled.

FIG. 13 part (b) shows how the data routes to individual PMEs. The FIGURE shows one particular w,x,y or z path that can be operated at 7.13 Mbyte/s in burst mode. If the data on the system bus occurred in bursts, and if the PME memory could contain the complete burst, then only one PME would be required. We designed the PME I/O structure to require neither of these conditions. Data can be gated into the PMEx0 at the full rate until buffer full occurs. At that instant, PMEx0 will change to transparent and PMEx1 will begin accepting the data. Within PMEx0 processing of the input data buffer can begin. PMEs that have taken data and processed it are limited because they cannot transmit the results while in the transparent mode. The design resolves this by switching the data stream to the opposite end of the path at intervals. FIG. 13(b) shows that under S/W control one might dedicate PMEx0 through PMEx3 to accepting data while PMEx12 through PMEx15 unload results and visa-versa. The controller counts words and adds end of block signals to the data stream, causing the switch in direction. One count applies to all paths supported by the controller so controller workload is reasonable.

SYSTEMS FOR ALTERNATIVE COMPUTERS

Figure 18:
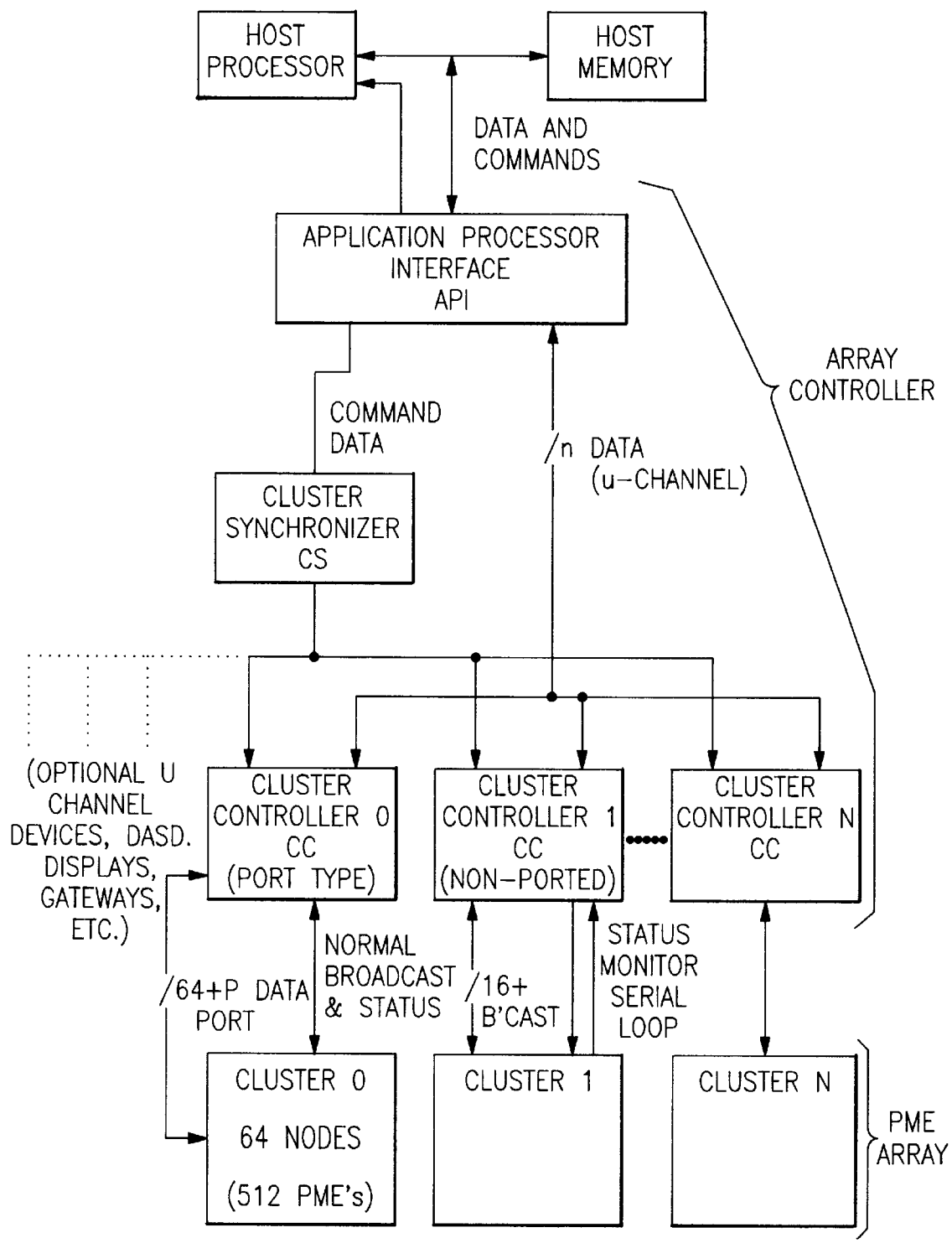
FIG. 18 illustrates a system block diagram for a host attached large system with one application processor interface illustrated. This illustration may also be viewed with the understanding that our invention may be employed in stand alone systems which use multiple application processor interfaces. Such interfaces in a FIG. 18 configuration will support DASD/Graphics on all or many clusters. Workstation accelerators can eliminate the host, application processor interface (API) and cluster synchronizer (CS) illustrated by emulation. The CS is not required in all instances.

FIG. 18 illustrates a system block diagram for a host attached large system with a single application processor interface (API). This illustration may also be viewed with the understanding that our invention may be employed in stand alone system which use multiple application processor interfaces (not shown) This configuration will support DASD/Grahpics on all or many clusters. Workstation accelerators can eliminate the host, application processor interface (API) and cluster synchronizer (CS) illustrated by emulation. The CS not always required. It will depend on the type of processing that is being performed, as well as the physical drive or power provided for a particular application which uses our invention. An application this is doing mostly MIMD processing will not place as high a workload demand on the controller, so here the control bus can see very slow pulse rise times. Conversely, system doing mostly asynchronous A-SIMD operations with many independent groupings may require faster control busing. In this case, a cluster synchronizer will be desirable.

The system block diagram of FIG. 18 illustrates that a system might consist of host, array controller and PME array. The PME array is a set of clusters supported by a set of cluster controllers (CC). Although a CC is shown for each cluster that relationship is not strictly required. The actual ratio of clusters to CCs is flexible. The CC provides redrive to, and accumulation from the 64 BClslclusters. Therefore, physical parameters can be used establish the maximum ratio. Additionally, the CC will provide for controlling multiple independent subsets of the PME array; that service might also become a gating requirement. A study can be made to determine these requirements for any particular application of our invention. Two versions of the CC will be used. A cluster that is to be connected to a system bus requires the CC providing interleave controls (see System I/O and FIG. 18) and tri-state drivers. A more simple version that omits the tri-state busing features can also be employed. In the case of large systems, a second stage of redrive and accumulation is added. This level is the cluster synchronizer (CS). The set of CCs plus CS and the Application Processor Interface (API) make up the Array Controller. Only the API is a programmable unit.

Several variations of this system synthesis scheme will be used. These result in different hardware configurations for various applications, but they do not have a major impact an the supporting software.

For a workstation accelerator, the cluster controllers will be attached directly to the workstation system bus; the function of the API will be performed by the workstation. In the case of a RISC/6000, the system bus is a Micro Channel and the CC units can plug directly into the slots within the workstation. This configuration places the I/O devices (DASD, SCSI and display interfaces) on the same bus that loads/unloads the array. As such the parallel array can be used for I/O intensive tasks like real time image generation or processing. For workstations using other bus systems (VME-bus, FutureBus, etc.), a gateway interface will be used. Such modules are readily available in the commercial marketplace. Note that in these minimal scale systems a single CC can be shared between a determined number of clusters, and neither a CS nor an API is needed.

A MIL avionics application might be similar in size to a workstation, but it needs different interfacing. Consider what may become the normal military situation. An existing platform must be enhanced with additional processing capability, but funding prohibits a complete processing system redesign. For this we would attach to the APAP array a smart memory coprocessor. In this case, a special application program interface API that appears to the host as memory will be provided. Data addressed to the host's memory will then be moved to the array via CC(s). Subsequent writes to memory can be detected and interpreted as commands by the API so that the accelerator appears to be a memory mapped coprocessor.

Large systems can be developed as either host attached or as stand alone configurations. For a host attached system, the configuration shown in FIG. 18 is useful. The host will be responsible for I/O, and the API would serve as a dispatched task manager. However, a large stand alone system is also possible in special situations. For example, a database search system might eliminate the host, attach DASD to the Micro-Channels of every cluster and use multiple APIs as bus masters slaved to the PMEs.

Zipper Array Interface with External I/O

Our zipper provides a fast I/O connection scheme and is accomplished by placing a switch between two nodes of the array. This switch will allow for the parallel communication into and out of the array. The fast I/O will be implemented along one edge of the array rings and acts like a large zipper into the X, Y, W, Z rings. The name "zipper connection" is given to the fast I/O. Allowing data to be transferred into and out of the network while only adding switch delays to transfer the data between processors is a unique loading technique. The switching scheme does not disrupt the ring topology created by the X, Y, W, Z buses and special support hardware allows the zipper operation to occur while the PE is processing or routing data.

The ability to bring data into and out of a massively parallel system rapidly is an important enhancement to the performance of the overall system. We believe that the way we implement our fast I/O without reducing the number of processors or dimension of the array network is unique in the field of massively parallel environments.

The modified hypercube arrangement can be extended to permit a topology which comprises rings within rings. To support the interface to the external I/O any or all of the rings can be logically broken. The two ends of the broken ring can then be connected to external I/O buses. Breaking the rings is a logical operation so as to permit regular inter-PME communication at certain time intervals while permitting I/O at other time intervals. This process of breaking a level of rings within the modified hypercube effectively 'unzips' rings for I/O purposes. The fast I/O "zipper" provides a separate interface into the array. This zipper may exist on 1 to n edges of the modified hypercube and could support either parallel input into multiple dimensions of the array or broadcast to multiple dimensions of the array. Further data transfers into or out of the array could alternate between the two nodes directly attached to the zipper. This I/O approach is unique and it permits developing different zipper sizes to satisfy particular application requirements. For example, in the particular configuration shown in FIG. 6, called the large fine-grained processor 360, the zipper for the Z and W buses will be dotted onto the MCA bus. This approach optimizes the matrix transposition time, satisfying a particular application requirement for the processor. For a more detailed explanation of the "zipper" structure, reference may be had to the APAP I/O ZIPPER application filed filed concurrently herewith. The zipper is here illustrated by FIG. 14.

Figure 14:
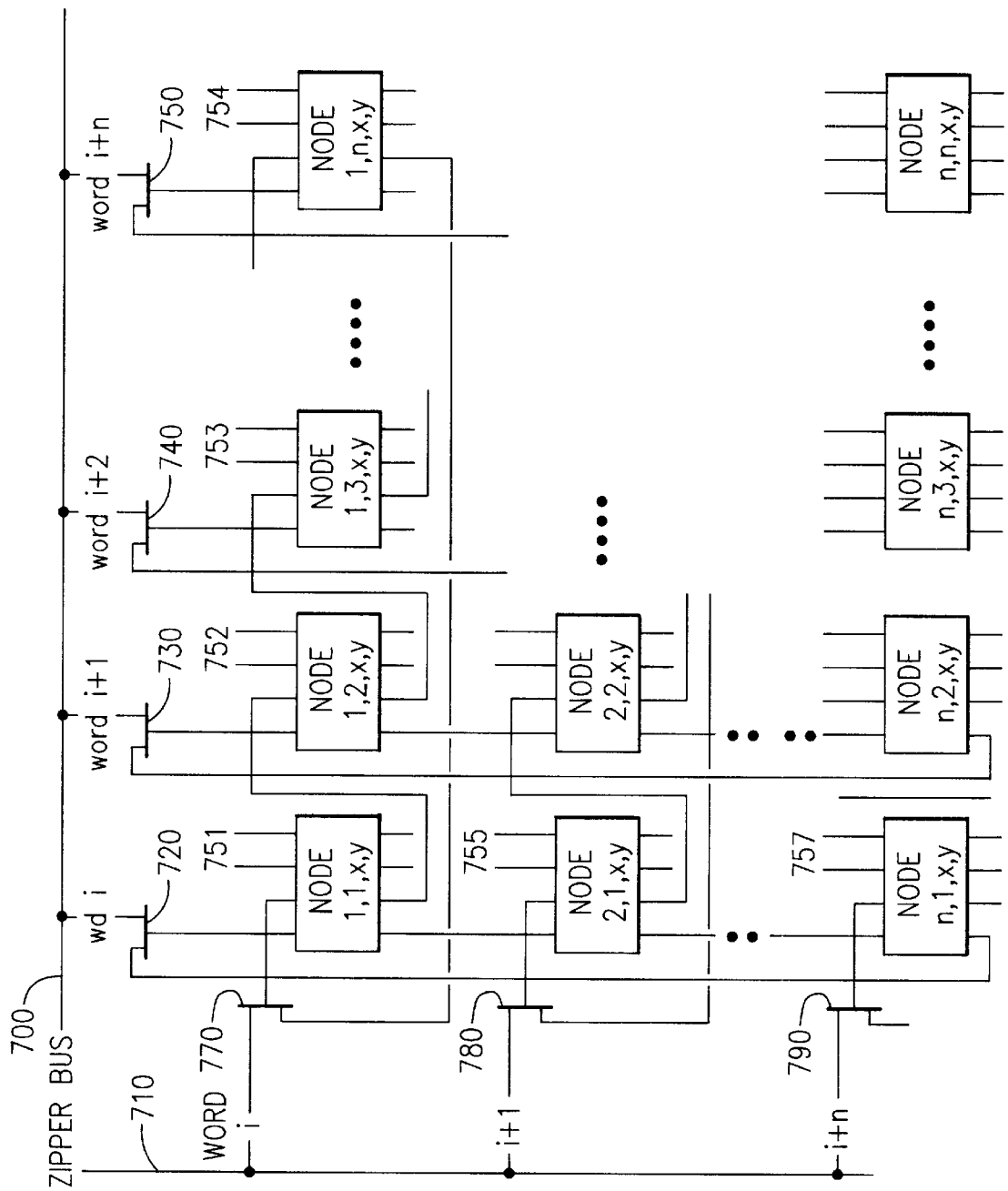
FIG. 14 shows a "zipper" connection for fast I/O connection.

Depending on the configuration and the need of the program to roll data and program into and out of the individual processing elements, the size of the zipper can be varied. The actual speed of the I/O zipper is approximately the number of rings attached times the PME bus width, times the PME clock rate all divided by 2. (The division permits the receiving PME time to move data onward. Since it can send it to any of n places I/O contention is completely absorbed over the Array.) With existing technology, ie., 5 MB/sec PME transfer rate, 64 rings on the zipper, and interleaved to two nodes transfers, 320MB/sec Array transfer rates are possible. (See the typical zipper configuration in FIG. 14). FIG. 14 illustrates the fast I/O or the so-called "zipper connection" 700, 710 which exists as a separate interface into the array. This zipper may exist on one 700 or two edges 700, 710 of the hypercube network by dotting onto the broadcast bus 720, 730, 740, 750, at multiple nodes in the array 751, 752, 753, 754 and in multiple directions 770, 780, 790, 751,755,757.

Today's MCA bus supports 80 to 160 MB per second burst transfer rate and therefore is a good match for a single zipper in simple or non-interleaved mode. The actual transfer rate given channel overhead and efficiency is something less than that. For systems that have even more demanding I/O requirements, multiple zippers and MCA buses can be utilized. These techniques are seen to be important to processors that would support a large external storage associated with nodes or clusters, as might be characteristic of database machines. Such I/O growth capability is completely unique to this machine and has not previously been incorporated in either massively parallel, conventional single processor, or coarse-grained parallel machines.

Array Director Architecture

Our massively parallel system is made up of nodal building blocks of multiprocessor nodes, clusters of nodes, and arrays of PMEs already packaged in clusters. For control of these packaged systems we provide a system array director which with the hardware controllers performs the overall Processing Memory Element (PME) Array Controller functions in the massively parallel processing environment. The Director comprises of three functional areas, the Application Interface, the Cluster Synchronizer, and normally a Cluster Controller. The Array Director will have the overall control of the PME array, using the broadcast bus and our zipper connection to steer data and commands to all of the PMEs. The Array Director functions as a software system interacting with the hardware to perform the role as the shell of the operating system. The Array Director in performing this role receives commands from the application interface and issuing the appropriate array instructions and hardware sequences to accomplish the designated task. The Array Director's main function is to continuously feed the instructions to the PMEs and route data in optimal sequences to keep the traffic at a maximum and collisions to a minimum.

Figure 19:
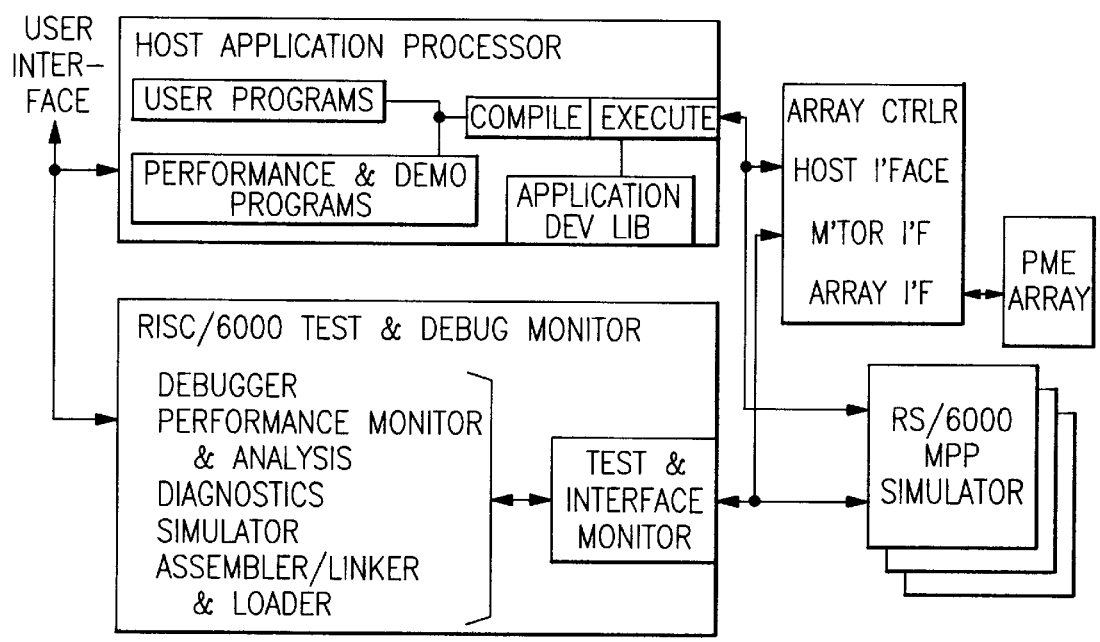
FIG. 19 illustrates the software development environment for our system. Programs can be prepared by and executed from the host application processor. Both program and machine debug is supported by the workstation based console illustrated here and in FIG. 22. Both of these services will support applications operating on a real or a simulated MMP, enabling applications to be developed at a workstation level as well as on a supercomputer formed of the APAP MMP. The common software environment enhances programmability and distributed usage.

The APAP computer system shown in FIG. 6 is illustrated in more detail in the diagram of FIG. 12 which illustrates the Array Director which can function as a controller, or array controller, as illustrated in FIG. 13 and FIGS. 18 and 19. This Array Director 610 illustrated in FIG. 12 is shown in the preferred embodiment of an APAP in a typical configuration of n identical array clusters 665, 670, 680, 690, with an array director 610 for the clusters of 512 PMEs, and an application processor interface 630 for the application processor or processors 600. The synchronizer 650 provides the needed sequences to the array or cluster controller 640 and together they make up the "Array Director" 610. The application processor interface 630 will provide the support for the host processor 600 or processors and test/debug workstations. For APAP units attached to one or more hosts, the Array Director serves as the interface between the user and the array of PMEs. For APAPs functioning as stand alone parallel processing machines, the Array Director becomes the host unit and accordingly becomes involved in unit I/O activities.

The Array Director will consist of the following four functional areas: (see the functional block diagram in FIG. 12)

1. Application Processor Interface (API) 600,
2. Cluster Synchronizer (CS) 650 (8×8 array of clusters),
3. Cluster Controller (CC) 640 (8×1 array of nodes),
4. Fast I/O (zipper Connection) 620.

The Application Processor Interface (API) 630

When operating in attached modes, one API will be used for each host. That API will monitor the incoming data stream to determine what are instructions to the Array clusters 665, 670, 680, 690 and what are data for the Fast I/O (zipper) 620. When in standalone mode, the API serves as the primary user program host.

To support these various requirements, the APIs contain the only processors within the Array Director, plus the dedicated storage for the API program and commands. Instructions received from the host can call for execution of API subroutines, loading of API memory with additional functions, or for loading of CC and PME memory with new S/W. As described in the S/W overview section, these various type requests can be restricted to subset of users via the initial programs loaded into the API. Thus, the operating program loaded will determine the type of support provided which can be tailored to match the performance capability of the API. This further permits the APAP to be adjusted to the needs of multiple users requiring managed and well tested services, or to the individual user wishing to obtain peak performance on a particular application.

The API also provides for managing the path to and from the I/O zipper. Data received from the host system in attached modes, or from devices in standalone modes is forwarded to the Array. Prior to initiating this type of operation the PMEs within the Array which will be managing the I/O are initiated. PMEs operating in MIMD mode can utilize the fast interrupt capability and either standard S/W or special functions for this transfer while those operating in SIMD modes would have to be provided detailed control instructions. Data being sent from the I/O zipper requires somewhat the opposite conditioning. PMEs operating in MIMD modes must signal the API via the high speed serial interface and await a response from the API, while PMEs in SIMD modes are already in synchronization with the API and can therefore immediately output data. The ability to system switch between modes provides a unique ability to adjust the program to the application.

Cluster Synchronizer (CS) 650

The CS 650 provides the bridge between the API 630 and CC 640. It stores API 630 output in FIFO stacks and monitors the status being returned from the CC 650 (both parallel input acknowledges and high speed serial bus data) to provide the CC, in timely fashion, with the desired routines or operations that need to be started. The CS provides the capability to support different CCs and different PMEs within clusters so as to permit dividing the array into subsets. This is done by partitioning the array and then commanding the involved cluster controllers to selectively forward the desired operation. The primary function of the synchronizer is to keep all clusters operating and organized such that overhead time is minimized or buried under the covers of PME execution time. We have described how the use of the cluster synchronizer in A-SIMD configurations is especially desirable.

Cluster Controller (CC) 640

The CC 640 interfaces to the node Broadcast and Control Interface (BCI) 605 for the set of nodes in an array cluster 665. (For a 4d modified hypercube with 8 nodes per ring that means the CC 640 is attached to 64 BCIs 605 in an 8 by 8 array of nodes and is controlling 512 PMEs. Sixty-four such clusters, also in a 8 by 8 array, lead to the full up system with 32768 PMEs.) The CC 640 will send commands and data supplied by the CS 650 to the BCI parallel port and return the acknowledgement data to the CS 650 when operating in MIMD modes. In SIMD mode the interface operates synchronously, and step by step acknowledgments are not required. The CC 640 also manages and monitors the high speed serial port to determine when PMEs within the nodes are requesting services. Such requests are passed upward to the CS 650 while the raw data from the high speed serial interface is made available to the status display interface. The CC 640 provides the CS 650 with an interface to specific nodes within the cluster via the standard speed serial interface.

In SIMD mode the CC will be directed to send instructions or addresses to all the PMEs over the broadcast bus. The CC can dispatch 16 bit instruction to all PMEs every 40 nanoseconds when in SIMD mode. By broadcasting groups of native instructions to the PME, the emulated instruction set is formed.

When in MIMD mode the CC will wait for the endop signal before issuing new instructions to the PMEs. The concept of the MIMD mode is to build strings of microroutines with native instructions resident in the PME. These strings can be grouped together to form the emulated instructions, and these emulated instruction can be combined to produce servicelcanned routines or library functions.

When in SIMD/MIMD (SIMIMD) mode, the CC will issue instruction as if in SIMD mode and check for endop signals from certain PMEs. The PMEs that are in MIMD will not respond to the broadcast instructions and will continue with there designated operation. The unique status indicators will help the CC to manage this operation and determine when and to whom to present the sequential instructions.

Operational Software Levels

This application overviews the operational software S/W levels to provide further explanation of the services performed by various hardware H/W components.

Computer systems generally used have an operating system. Operating system kernels which are relatively complete must be provided in most massive MIMD machines, where workstation class CPU chips run kernels such as Mach. The operating system kernal supports message passing or memory coherency. Other massively parallel systems based upon SIMD models have almost no intelligence in the array. There are no "program counters" out in the array, and thus no programs to execute locally. All instructions are broadcast.

In the systems we have provided with our PME as the basis for cluster arrays, there is not need for an operating system at each chip, a node. We provide a library of key functions for computation and/or communication within each PE (PME) that can be invoked at a high level. SIMD-like instructions are broadcast to the array to set each of a selected set of PMEs. These PMEs can then perform in full MIMD mode one or more of these library routines. In addition, basic interrupt handler and communications routines are resident in each PME allowing the PME to handle communication on a dynamic basis. Unlike existing MIMD machines, the APAP structure need not include an entire program in PME memory. Instead all of that code, which is essentially serial, is the cluster controller. Thus such code, 90% by space and 10% by time (typically) can be broadcast in a SIMD fashion to an array of PMEs. Only the truly parallel inner loops are distributed to the PMEs in a dynamic fashion. These are then initiated into MIMD mode just as other "library" routines are. This enables use of program models which are Single Program Multiple data to be used where the same program is loaded in each PME node, with embedded synchronization code, and executed at the local PME. Design parameters affect bandwidth available on different links, and the system paths are programmatically configurable, allowing high bandwith links on a target network, and allowing dynamic partition of off chip like PME-to-PME links to provide more bandwidth on specific paths as meets the needs of a particular application. The links leaving a chip mate directly with each other, without the need for external logic. There are sufficient links and there is no predesigned constraint as to which other links they can attach to, so that the system can have a diversity of interconnection topologies, with routing performed dynamically and programmatically.

The system allows usage of existing compilers and parsers to create an executable parallel program which could run on a host or workstation based configuration. Sequential source code for a Single Program Multiple Data system would pass through program analysis, for examination of dependency, data and controls, enabling extension of program source to include call graphs, dependency tables, aliases, usage tables and the like. Thereafter, program transformation would occur whereby a modified version of the program would be created that extends the degree of parallelism by combining sequences or recognizing patterns to generate explicit compiler directives. A next step would be a data allocation and partitioning step, with message generation, which would analyze data usage patternsnd allocate so that elements to be combined would share common indexing, addressing pattern, and these would provide embedded program compiler directives and calls to communication services. At this point the program would pass to a level partitioning step. A level partitioning step would separate the program into portions for execution in ARRAY, in ARRAY CONTROLLER (array director or cluster controller), and HOST. Array portions would be interleaved in sections with any required message passing synchronization functions. At this point, level processing could proceed. Host sources would pass to a level compiler (FORTRAN) for assembly compilation. Controller sources would pass to a microprocessor controller compiler, and items that would be needed by a single PME and not available in a library call would pass to a parser (FORTRAN OR C) to an intermediate level language representation which would generate optimized PME code and Array Controller code. PME code would be created at PME machine level, and would include library extensions, which would pass on load into a PME memory. During execution a PME parallel program in the SPMD process of execution could call upon already coded assembly service functions from a runtime library kernel.

Since the APAP can function as either an attached unit that is closely or loosely coupled with its host or as a stand alone processor, some variation in the upper level S/W models exists. However, these variations serve to integrate the various type applications so as to permit a single set of lower level functions to satisfy all three applications. The explanation will address the attached version S/W first and then the modifications required for standalone modes.

In any system, as illustrated by FIG. 18, where the APAP is intended to attach to a host processor the user's primary program would exist within the host and would delegate to the APAP unit tasks and associated data as needed to provide desired load balancing. The choice of interpreting the dispatched task's program within the host or the Array Director is a user option. Host level interpretation permits the Array Director to work at interleaving users which do not exploit close control of the Array, while APAP interpretation leads to minimal latency in control branching but tends to limit the APAP time to perform multi-user management tasks. This leads to the concept that the APAP and host can be tightly or loosely coupled.

Two examples illustrate the extremes:

1. When APAP is attached to 3090 class machines with Floating Point Vector Facilities, user data in compressed form could be stored within the APAP. A host program that called for a vector operation upon two vectors with differing sparseness characteristics would then send instructions to the APAP to realign the data into element by element matching pairs, output the result to the Vector Facility, read answer from the Vector Facility and finally reconfigure data into final sparse data form. Segments of the APAP would be interpreting and building sparse matrix bit maps, while other sections would be calculating how to move data between PMEs such that it would be properly aligned for the zipper.

2. With APAP attached to a small inflight military computer, the APAP could be performing the entire workload associated with Sensor Fusion Processing. The host might initiate the process once, send sensor data as it was received to the APAP and then wait for results. The Array Director would then have to schedule and sequence the PME array through perhaps dozens of processing steps required to perform the process.

The APAP will support three levels of user control:

1. Casual User. S/he works with supplied routines and library function. These routines are maintained at the host or API level and can be evoked by the user via subroutine calls within his program.

2. Customizer User. S/he can write special functions which operate within the API and which directly evoke routines supplied with the API or services supplied with the CC or PME.

3. Development User. S/he generates programs for execution in the CC or PME, depending upon API services for program load and status feedback.

Satisfying these three user levels in either closely of loosely coupled systems leads to the partitioning of H/W control tasks.

API Software Tasks

The application program interface API contains S/W services that can test the leading words of data received and can determine whether that data should be interpreted by the API, loaded to some storage within the Array Director or PME, or passed to the I/O zipper.

For data that is to be interpreted, the API determines the required operation and invokes the function. The most common type operation would call for the Array to perform some function which would be executed as a result of API writes to the CS (and indirectly to the CC). The actual data written to the CS/CC would in general be constructed by the API operational routine based upon the parameters passed to the API from the host. Data sent to the CS/CC would in turn be forwarded to the PMEs via the node BCI.

Data could be loaded to either API storage, CC storage, or PME memory. Further, data to be loaded to PME memory could be loaded via either the I/O zipper or via the node BCI. For data to be put into the API memory, the incoming bus would be read then written to storage. Data targeted to the CC memory would be similarly read and then be written to the CC memory. Finally, data for the PME memory (in this case normally new or additional MIMD programs) could be sent to all or selected PMEs via the CS/CC/Node BCI or to a subset of PMEs for selective redistribution via the I/O zipper.

When data is to be sent to the I/O zipper, it could be preceded by inline commands that permit the PME MIMD programs to determine its ultimate target; or, it could be preceded by calls to the API service functions to perform either MIMD initiation or SIMD transmission.

In addition to responding to requests for service received via the host interface, the API program will respond to request from the PMEs. Such requests will be generated on the high speed serial port and will be routed through the CC/CS combination. Requests of this sort can result in the API program's directly servicing the PMEs or accessing the PMEs via the standard speed serial port to determine further qualifying data relative to the service request.

PME Software

The software plan includes:

Generation of PME resident service routines (that is, 'an extended ISA') for complex operations and I/O management.

Definition and development of controller executed subroutines that produce and pass control and parameter data to the PMEs via the BCI bus. These subroutines:
1. cause a set of PMEs to do mathematical operations on distributed objects,
2. provide I/O data management and synchronization services for PME Array and System Bus interactions,
3. provide startup program load, program overlay and program task management for PMEs.

Development of data allocation support services for host level programs, and

Development of a programming support system including assembler, simulator, and H/W monitor and debug workstation.

Based upon studies of military sensor fusion, optimization, image transformation, US Post Office optical character recognition and FBI fingerprint matching applications, we have concluded that a parallel processor programmed with vector and array commands (like BLAS calls) would be effective. The underlying programming model must match the PME array characteristics feasible with today's technology. Specifically:

PMEs can be independent stored program processors,

The array can have thousands of PMEs, and be suitable for fine grained parallelism, Inter-PME networks will have very high aggregate bandwidth and a small 'logical diameter', But, by network connected microprocessor MIMD standards, each PME is memory limited.

Prior programming on MIMD parallel processors has used task dispatching methodology. Such approaches lead to each PME needing access to an portion of a large program. This characteristic, in combination with the non-shared memory characteristic of the H/W, would exhaust PME memory on any significant problem. We therefore target what we believe is a new programming model, called 'asynchronous SIMD' (A-SIMD) type processing. In this connection see U.S. Ser. No. 798,788, filed Nov. 27, 1991 of P. Kogge, which is incorporated herein.

A-SIMD programming in our APAP design means that a group of PMEs will be directed by commands broadcast to them as in SIMD models. The broadcast command will initiate execution of a MIMD function within each PME. That execution can involve data dependent branching and addressing within PMEs, and I/O based synchronization with either other PMEs or the BCI. Normally, PMEs will complete the processing and synchronize by reading the next command from the BCI.

The A-SIMD approach includes both MIMD and SIMD operating modes. Since the approach imposes no actual time limits on the command execution period, a PME operation that synchronizes on data transfers and executes indefinitely can be initiated. Such functions are very effective in data filtering, DSP, and systolic operations. (They can be ended by either BCI interrupts or by commands over the serial control buses.) SIMD operation results from any A-SIMD control stream that does not include MIMD Mode Commands. Such a control stream can include any of the PMEs native instructions. These instructions are routed directly to the instruction decode logic of the PME. Eliminating the PME instruction fetch provides a higher performance mode for tasks that do not involve data dependent branching.

This programming model (supported by H/W features) extends to permitting the array of PMEs to be divided into independent sections. A separate A-SIMD command stream controls each section. Our application studies show that programs of interest divide into separate phases (ie. input, input buffering, several processing steps, and output formatting, etc.), suitable for pipeline data processing. Fine-grained parallelism results from applying the n PMEs in a section to a program phase. Applying coarse-grained partitioning to applications often results in discovering small repetitive tasks suitable for MIMD or memory bandwidth limited tasks suitable for SIMD processing. We program the MIMD portions using conventional techniques and program the remaining phases as A-SIMD sections, coded with vectorized commands, sequenced by the array controller. This makes the large controller memory the program store. Varying the number of PMEs per section permits balancing the workload. Varying the dispatched task size permits balancing the BCI bus bandwidth to the control requirements.

The programming model also considers allocating data elements to PMEs. The approach is to distribute data elements evenly over PMEs. In early versions of S/W, this will be done by the programmer or by S/W. We recognize that the IBM parallelizing compiler technologies apply to this problem and we expect to investigate their usage. However, the inter-PME bandwidth provided does tend to reduce the importantly of this approach. This links data allocation and I/O mechanism performance.

The H/W requires that the PME initiate data transfers out of its memory, and it supports a controlled write into PME memory without PME program involvement. Input control occurs in the receiving PME by providing an input buffer address and a maximum length. When I/O to a PME results in buffer overflow, H/W will interrupt the receiving PME. The low level I/O functions that will be developed for PMEs build on this service. We will support either movement of raw data between adjacent PMEs or movement of addressed data between any PMEs. The last capability depends upon the circuit switched and store and forward mechanisms. The interpret address and forward operation is important for performance. We have optimized the H/W and S/W to support the operation. Using one word buffers results in an interrupt upon receipt of address header. Comparing target id with local id permits output path selection. Transfer of the subsequent data words occurs in circuit switched mode. A slight variation on this process using larger buffers results in a store and forward mechanism.

Because of the high performance inter-PME bandwidth, it is not always necessary or desirable to place data elements within the PME Array carefully. Consider shifting a vector data element distributed across PMEs. Our architecture can send data without an address header, thus, providing for very fast I/O. However, we have found, in many applications, that optimizing a data structure for movement in one direction, penalizes data movement in an orthogonal direction. The penalty in such situations approximates the average cost of randomly routing data in the network. This leads to applications where placing data sequentially or randomly (as opposed to arranging data) results in shorter average process times.

Many applications can be synchronized to take advantage of average access time. (For example, PDE relaxation processes acquire data from a neighborhood and thus, can average access over at least four I/O operations.) We believe that after considering the factors applicable to vector and array processes, like scatter/gather or row/column arithmetic, many users will find brute force data allocation to be suitable for the application. However, we know of examples that illustrate application characteristics (like required synchronization or biased utilization of shift directions[1]) that tend to force particular data allocation patterns. This characteristic requires that the tools and techniques developed support either manual tuning of the data placement, or simple and non-optimum data allocation. (We will support the non-optimum data allocation strategy with host level macros to provide near transparent port of vectorized host programs to the MPP. The HIW Monitor workstation will permit the user to investigate the resultant performance.)

[1] Gaussian Elimination with normal pivoting requires shifting rows but not columns. More than 2:1 performance difference would result from arranging the data such that columns were on the fast shift direction. Even with that there is not an advantage to arranging rows in any particular relationship to the buses.

FIG. 19 shows the general S/W development and usage environment. The Host Application Processor is optional in that program execution can be controlled from either the Host or the Monitor. Further, the Monitor will effectively replace the Array Controller is some situations. The environment will support program execution on real or simulated MPP hardware. The Monitor is scenario driven so that the developer doing test and debug operations can create procedures to permit effective operation at any level of abstraction.

Figure 20:
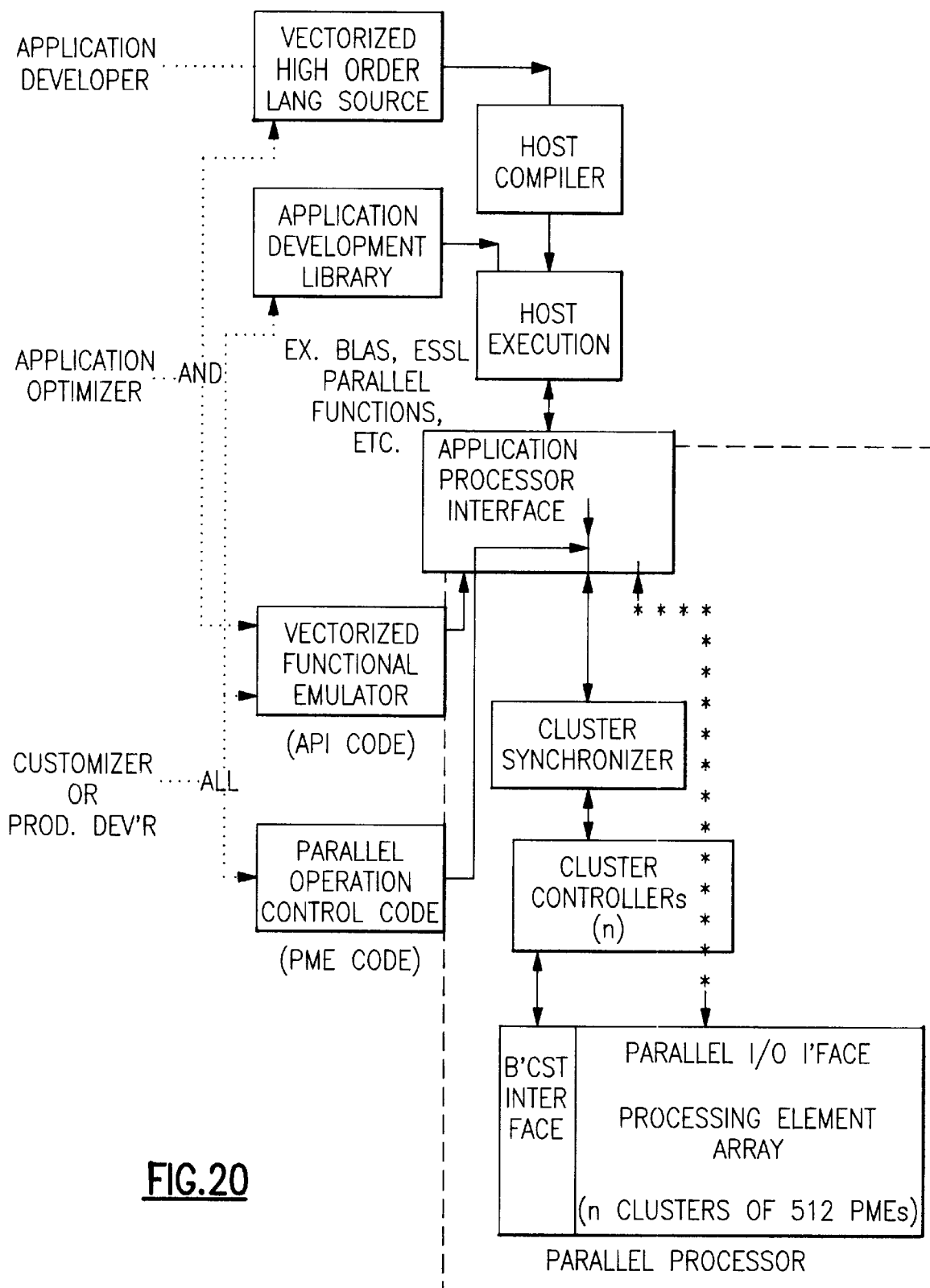
FIG. 20 illustrates the programming levels which are permitted by the new systems. As different users require more or less detailed knowledge, the software system is developed to support this variation. At the highest level the user does not need to know the architecture is indeed an MMP. The system can be used with existing language systems for partitioning of programs, such as parallel Fortran.

FIG. 20 illustrates the levels of H/W supported within the MPP and the user interfaces to these levels.

We see two potential application programming techniques for the MPP. In the least programmer intensive approach, applications would be written in a vectorized high order language. If the user did not feel that the problem warranted tuning data placement then he would use compile time services to allocate data to the PME Array. The application would use vector calls like BLAS that would be passed to the controller for interpretation and execution on the PME Array. Unique calls would be used to move data between host and PME Array. In summary, the user would not need to be aware of how the MPP organized or processed the data. Two optimization techniques will be supported for this type application:

1. Altering the data allocation by constructing the data allocation table will permit programs to force data placements.
2. Generation of additional vector commands for execution by the array controller will permit tuned subfunctions (ie. calling the Gaussian Elimination as a single operation.)

We also see that the processor can be applied to specialized applications as in those referenced in the beginning of this section. In such cases, code tuned to the application would be used. However, even in such applications the degree of tuning will depend upon how important a particular task is to the application. It is in this situation that we see the need for tasks individually suited to SIMD, MIMD or A-SIMD modes. These programs will use a combination of:

1. Sequences of PME native instructions passed to an emulator function within the array controller. The emulator will broadcast the instruction and its' parameters to the PME set. The PMEs in this SIMD mode will pass the instruction to the decode function, simulating a memory fetch operation.
2. Tight inner loops that can be I/O synchronized will use PME native ISA programs. After initiation from a SIMD mode change, they would run continuously in MIMD mode. (The option to return to SIMD mode via a 'RETURN' instruction exists.)
3. More complicated programs, as would be written in a vectorizing command set, would execute subroutines in the array controller that invoked PME native functions. For example a simplified array controller program to do a BLAS 'SAXPY' command on vectors loaded sequentially across PMEs would start sequences within the PMEs that:
   a. Enable PMEs with required x elements via comparison of PME id with broadcast 'incx' and 'X_addr' values,
   b. Compress the x values via a write to consecutive PMEs,
   c. Calculate the address of PMEs with y elements from broadcast data,
   d. Transmit the compressed x data to the y PMEs,
   e. Do a single precision floating point operation in PMEs receiving x values to complete the operation.

Finally, the SAXPY example illustrates one additional aspect of executing vectorized application programs. The major steps execute in the API and could be programmed by either an optimizer or product developer. Normally, the vectorized application would call rather than include this level o code. These steps would be written as C or Fortran code and will use memory mapped read or writes to control the PME array via the BCI bus. Such a program operates the PME array as a series of MIMD steps synchronized by returns to the API program. Minor steps such as the single precision floating point routines would be developed by the Customizer or Product Developer. These operations will be coded using the native PME ISA and will be tuned to the machine characteristics. In general, this would be the domain of the Product Developer since coding, test and optimization at this level require usage of the complete product development tool set.

Figure 21:
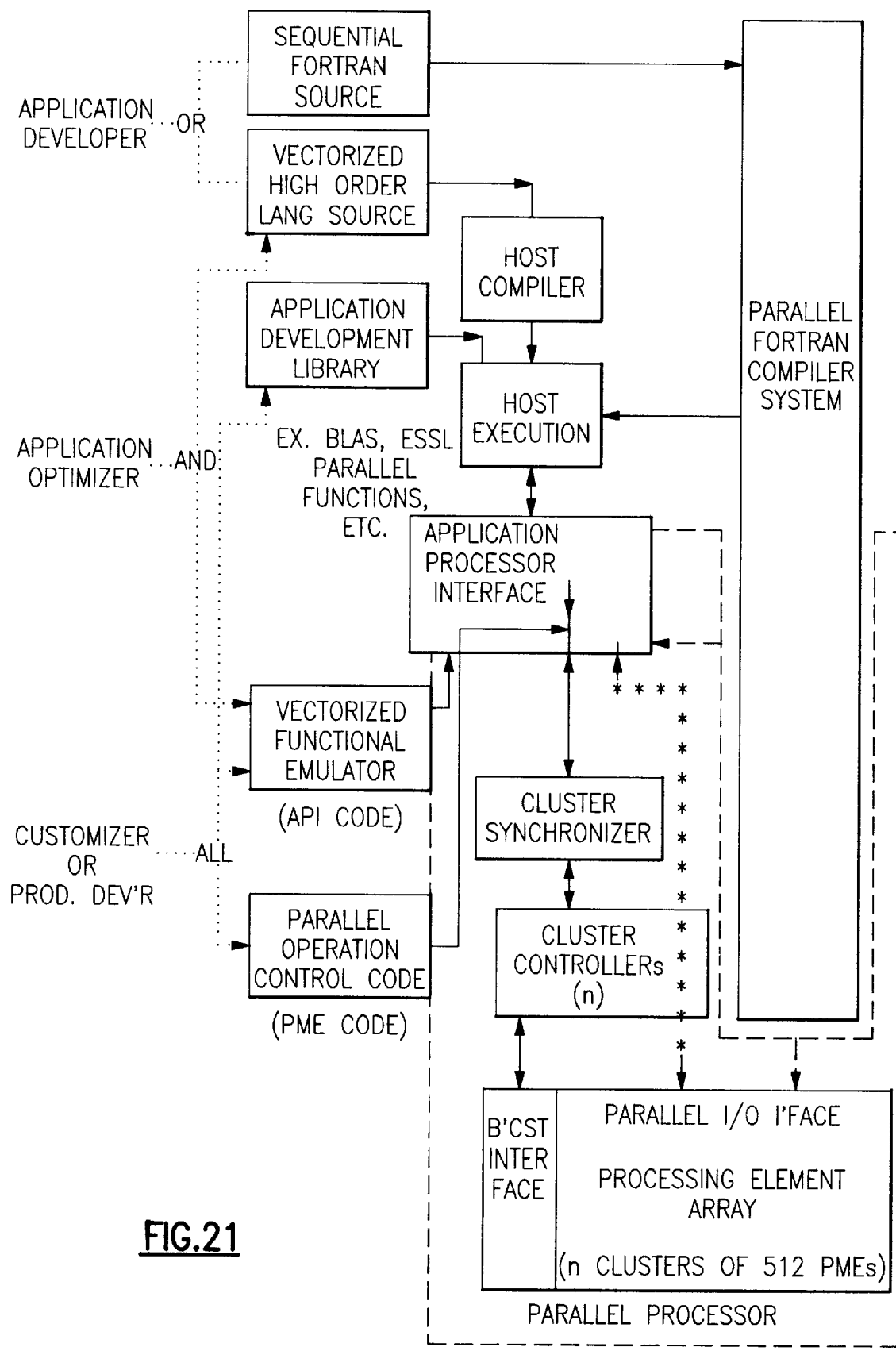
FIG. 21 illustrates the parallel Fortran complier system for the MMP provided by the APAP configurations described. A sequential to parallel compiler system uses a combination of existing compiler capability with new data allocation functions and enables use of a partitioning program like FortranD.

The APAP can have applications written in sequential Fortran. The path is quite different. FIG. 21 outlines a Fortran compiler which can be used. In the first step, it uses a portion of the existing parallelizing compiler to develop program dependencies. The source plus these tables become an input to a process that uses a characterization of the APAP MMP and the source to enhance parallelism.

This MMP is a non-shared memory machine and as such allocates data between the PMEs for local and global memory. The very fast data transfer times and the high network bandwidth reduce the time affect of data allocation, but it still is addressed. Our approach treats part of memory as global and uses a S/W service function. It is also possible to use the dependency information to perform the data allocation in a second alternative. The final step in converting the source to multiple sequential programs is performed by the Level Partitioning step. This partitioning step is analogous to the Fortran$^3$ work being conducted with DARPA funding. The last process in the compilation is generation of the executable code at all individual functional levels. For the PME this will be done by programming the code generator on an existing compiler system. The Host and API code compilers generate the code targeted to those machines.

The PME can execute MIMD software from its own memory. In general, the multiple PMEs would not be executing totally different programs but rather would be executing the same small program in an asynchronous manner. Three basic types of S/W can be considered although the design approach does not limit the APAP to just these approaches:

1. Specialized emulation functions would make the PME Array emulate the set of services provide by standard user libraries like LINPACK or VPSS. In such an emulation package, the PME Array could be using its multiple set of devices to perform one of the operations required in a normal vector call. This type of emulation, when attached to a vector processing unit, could utilize the vector unit for some operations while performing others internally.
2. The parallelism of the PME Array could be exploited by operating a set of software that provides a new set of mathematical and service functions in the PMEs. This set of primitives would be the codes exploited by a customizing user to construct his application. The prior example of performing sensor fusion on a APAP attached to a military platform would use such an approach. The customizer would write routines to perform Kalman Filters, Track Optimum Assignment and Threat Assessment using the supplied set of function names. This application would be a series of API call statements, and each call would result in initiating the PME set to perform some basic operation like 'matrix multiply'on data stored within the PME Array.
3. In cases where no effective method, considering performance objectives, or application needs exists then custom S/W could be developed and executed within the PME. A specific example is 'Sort'. Many methods to sort data exist and the objective in all cases is to tune the process and the program to the machine architecture. The modified hypercube is well suited to a Batcher Sort; however, that sort requires extensive calculations to determine particular elements to compare versus very short comparison cycles. The computer program in FIG. 17 shows a simple example of a PME program 1100 to perform the Batcher Sort 1000 with one element per PME. Each line of the program description would be expanded to 3 to 6 PME machine level instructions, and all PMEs would then execute the program in MIMD mode. Program synchronization is managed via the I/O statements. The program extends to more data elements per PME and to very large parallel sorts in a quite straight forward manner.

CC Storage Contents

Data from the CC storage is used by the PME Array in one of two manners. When the PMEs are operating in SIMD, a series of instructions can be fetched by the CC and passed to the node BCI, thus, reducing load on both the API and CS. Alternatively, functions that are not frequently required, such as PME Fault Reconfiguration S/W, PME Diagnostics, and perhaps conversion routines can be stored in the CC memory. Such functions can then be requested by operating PME MIMD programs or moved to the PMEs at the request of API program directives.

Packaging of the 8-Way Modified Hypercube

Our packaging techniques take advantage of the eight PMEs packaged in a single chip and arranged in a N-dimensional modified hypercube configuration. This chip level package or node of the array is the smallest building block in the APAP design. These nodes are then packaged in an 8×8 array where the +-X and +-Y makes rings within the array or cluster and the +-W, and +-Z are brought out to the neighboring clusters. A grouping of clusters make up an array. This step significantly cuts down wire count for data and control for the array. The W and Z buses will connect to the adjacent clusters and form W and Z rings to provide total connectivity around the completed array of various size. The massively parallel system will be comprised of these cluster building blocks to form the massive array of PMEs. The APAP will consist of an 8×8 array of clusters, each cluster will have its own controller and all the controllers will be synchronized by our Array Director.

Many trade-offs of wireability and topology have been considered, yet with these considerations we prefer the configuration which we illustrate with this connection. The concept disclosed has the advantage of keeping the X and Y dimensions within a cluster level of packaging, and distributing the W and Z bus connections to all the neighboring clusters. After implementing the techniques described, the product will be wireable, and manufacturable while maintaining the inherent characteristics of the topology defined.

The concept used here is to mix, match, and modify topologies at different packaging levels to obtain the desired results in terms of wire count.

For the method to define the actual degree of modification of the hypercube, refer to the Rolfe modified hypercube patent application referenced above. For the purpose of this preferred embodiment, we will describe two packaging levels to simplify our description. It can be expanded.

The first is the chip design or chip package illustrated by FIG. 3 and FIG. 11. There are eight of the processing elements with their associated memory and communication logic encompassed into a single chip which is defined as a node. The internal configuration is classified as a binary hypercube or a 2-degree hypercube where every PME is connected to two neighbors. See the PME-PME communication diagram in FIG. 9, especially 500, 510, 520, 530, 540, 550, 560, 570.

The second step is that the nodes are configured as an 8×8 array to make up a cluster. The fully populated machine is built up of an array of 8×8 clusters to provide the maximum capacity of 32768 PMEs. These 4096 nodes are connected in an 8 degree modified hypercube network where the communication between nodes is programmable. This ability to program different routing paths adds flexibility to transmit different length messages. In addition to message length differences, there are algorithm optimizations that can be addressed with these programmability features.

The packaging concept is intended to significantly reduce the off page wire count for each of the clusters. This concept takes a cluster which is defined as a 8×8 array of nodes 820, each node 825 having 8 processing elements for a total of 512 PMEs, then to limit the X and Y ring within the cluster and, finally, to bring out the W and Z buses to all clusters. The physical picture could be envisioned as a sphere configuration 800, 810 of 64 smaller spheres 830. See FIG. 15 for a future packaging picture which illustrates the full up packaging technique, limiting the X and Y rings 800 within the cluster and extending out the W and Z buses to all clusters 810. The physical picture could be envisioned as a sphere configuration of 64 smaller spheres 830.

The actual connection of a single node to the adjacent X and Y neighbors 975 exists within the same cluster. The wiring savings occurs when the Z and W buses are extended to the adjacent neighboring clusters as illustrated in FIG. 16. Also illustrated in FIG. 16 is the set of the chips or nodes that can be configured as a sparsely connected 4dimensional hypercube or torus 900, 905, 910, 915. Consider each of the 8 external ports to be labeled as +X, +Y, +Z, +W, −X, −Y, −Z, −W 950, 975. Then, using m chips, a ring can be constructed by connecting the +X to −X ports. Again m such rings can be interconnected into a ring of rings by interconnecting the matching +Y to −Y ports. This level of structure will be called a cluster. It provides for 512 PMEs and will be the building block for several size systems. Two such connections (950, 975) are shown in the diagram illustrated in FIG. 16.

Applications for Deskside MPP

The deskside MPP in a workstation can be effectively applied in several application areas including:

1. Small production tasks that depend upon compute intensive processes. The US Postal Service requires a processor that can accept a fax image of a machine printed envelope and then find and read the zip code. The process is needed at all regional sort facilities and is an example of a very repetitive but still compute intensive process. We have implemented APL language versions of a sample of the required programs. These models emulate the vector and array processes that will be used to do the work on the MPP. Based upon this test, we know that the task is an excellent match to the processing architecture.
2. Tasks in which an analyst, as a result of prior output, or expected needs requests sequences of data transformations. In an example taken from the Defense Mapping Agency, satellite images are to be transformed and smoothed pixel by pixel into some other coordinate system. In such a situation, the transformation parameters for the image vary across localities as a result of ground elevation and slope. The analyst must therefore add fixed control points and reprocess transformations. A similar need occurs in the utilization of scientific simulation results when users require almost real time rotation or perspective changes.
3. Program development for production versions of the MPP will use workstation size MPPs. Consider a tuning process that requires analysis of processor versus network performance. Such a task is machine and analyst interactive. It can require hours when the machine is idle and the analyst is working. When performed on a supercomputer it would be very costly. However, providing an affordable workstation MPP with the same (but scaled) characteristics as the supercomputer MPP eliminates costs and eases the test and debug process by eliminating the programmer inefficiencies related to accessing remote processors.

Figure 22:
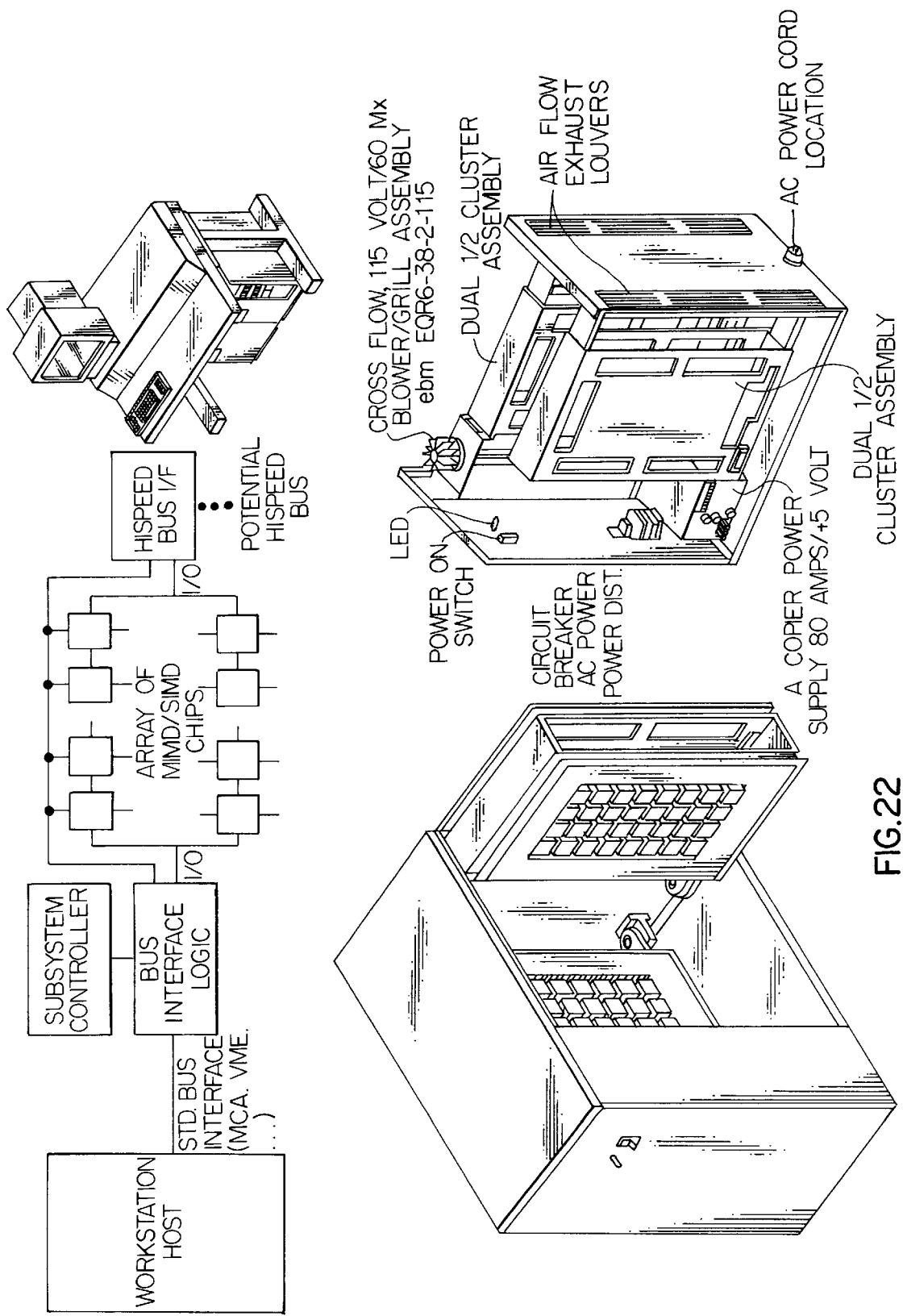
FIG. 22 illustrates the workstation application of the APAP, where the APAP becomes a workstation accelerator. Note that the unit has the same physical size as a RISC/6000 Model 530, but this model now contains an MMP which is attached to the workstation via a bus extension module illustrated.

FIG. 22 is a drawing of the workstation accelerator. It uses the same size enclosure as the RISC/6000 model 530. Two swing out gates, each containing a full cluster are shown. The combined two clusters provide 5 GOPS of fixed point performance and 530 MflopS of processing power and about 100 Mbyte/s of I/O bandwidth to the array. The unit would be suitable for any of the prior applications. With quantity production and including a host RISC/6000, it would be price comparable with high performance workstations, not at the price of comparable machines employing old technology.

Description of the AWACS Sensor Fusion

The military environment provides a series of examples showing the need for a hardened compute intensive processor.

Communication in the targeted noisy environments implies the need for digitally encoded communications, as is used in ICNIA systems. The process of encoding the data for transmission and recovering information after receipt is a compute intensive process. The task can be done with specialized signal processing modules, but for situations where communication encoding represents bursts of activity, specialized modules are mostly idle. Using the MPP permits several such tasks to be allocated to a single module and saves weight, power, volume and cost.

Sensor data fusion presents a particularly clear example of enhancing an existing platform with the compute power gained from the addition of MPP. On the Air Force E3 AWACS there are more than four sensors on the platform, but there is currently no way to generate tracks resulting from the integration of all available data. Further, the existing generated tracks have quite poor quality due to sampling characteristics. Therefore, there is motivation to use fusion to provide an effective higher sample rate.

Figure 23:
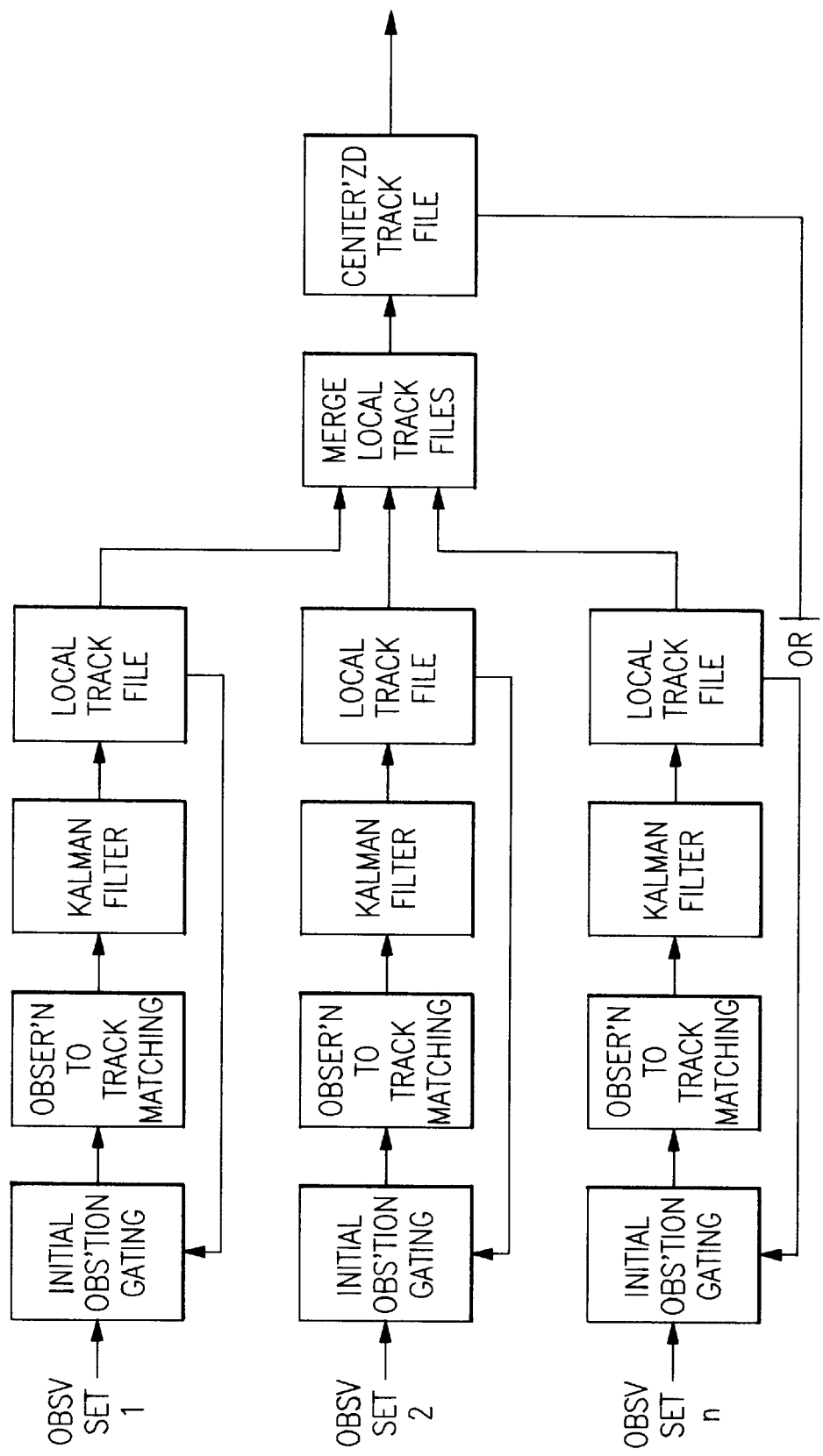
FIG. 23 illustrates an application for an APAP MMP module for an AWACS military or commercial application. This is a way of handling efficiently the classical distributed sensor fusion problem shown in FIG. 23, where the observation to track matching is classically done with well know algorithms like nearest neighbor, 2 dimensional linear assignment (Munkes.), probabilistic data association or multiple hypothesis testing, but these can now be done in an improved manner as illustrated by FIGS. 24 and 25.
Figure 24:
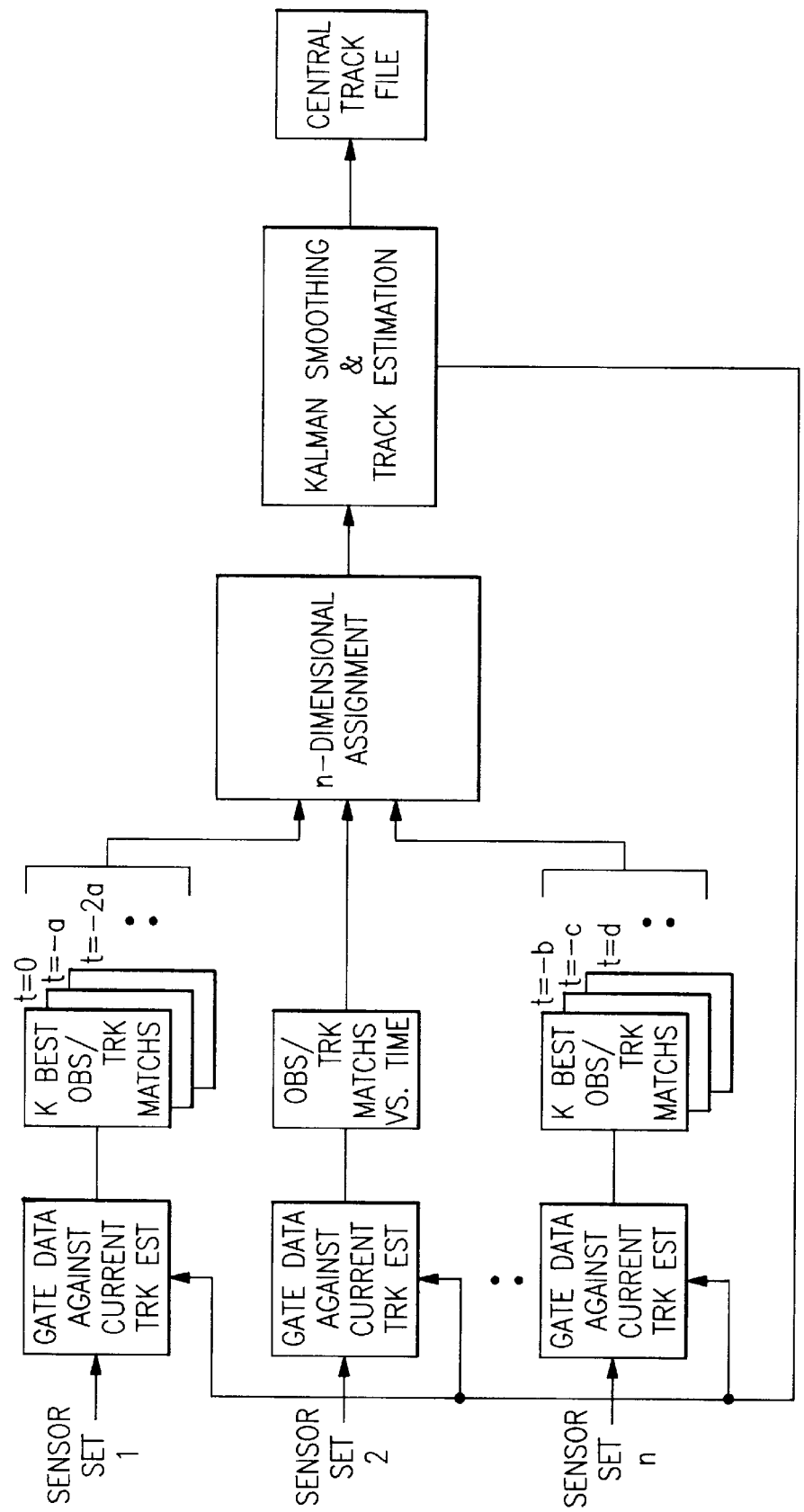
FIG. 24 illustrates how the system provides the ability to handle n-dimensional assignment problems in real time.
Figure 25:
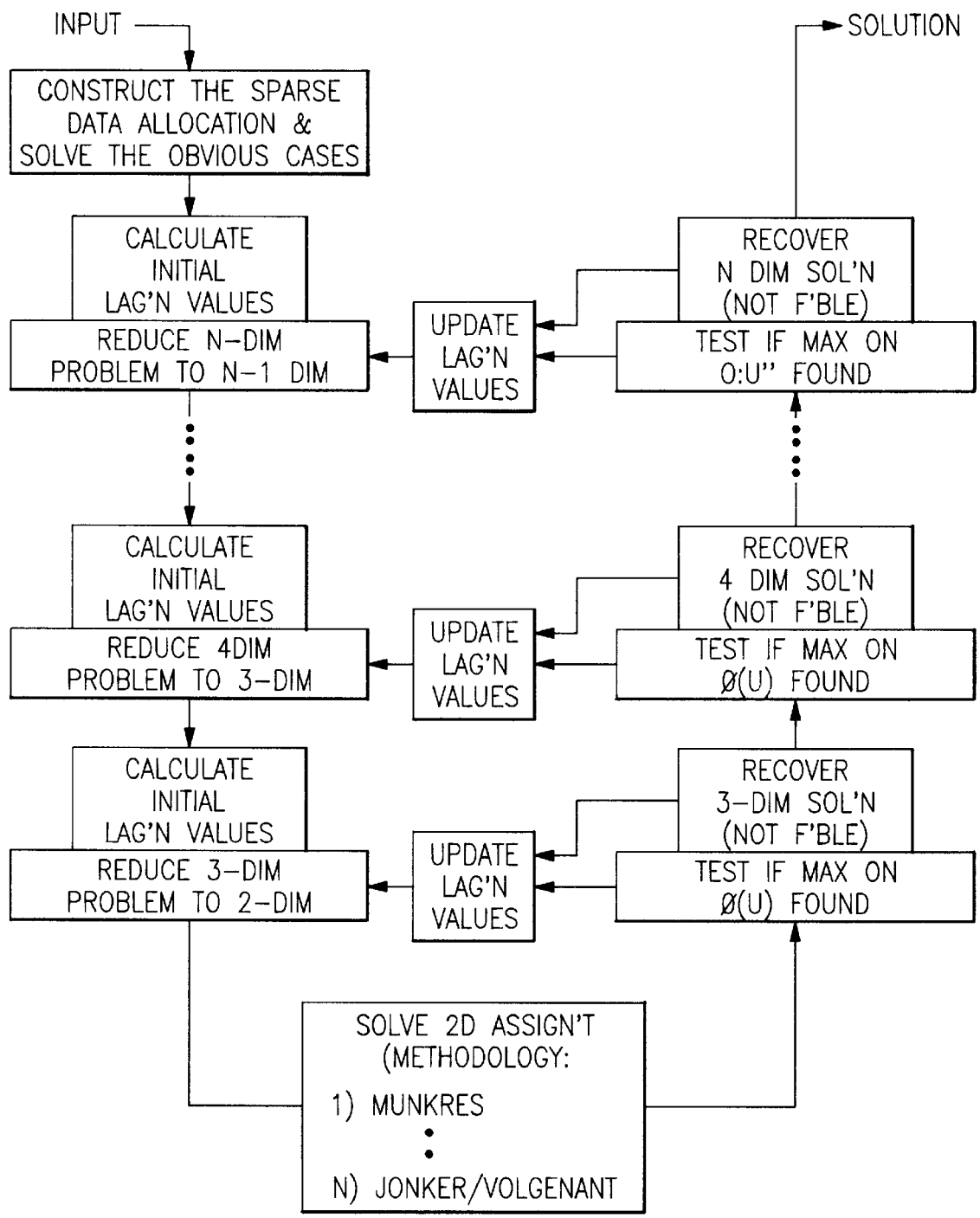
FIG. 25 illustrates processing flow for an n-dimensional assignment problem utilizing an APAP.

We have studied this sensor fusion problem in detail and can propose a verifiable and effective solution, but that solution would overwhelm the compute power available in an AWACS data processor. FIG. 23 shows the traditional track fusion process. The process is faulty because each of the individual processes tends to make some errors and the final merge tends to collect them instead of eliminating them. The process is also characterized by high time latency in that merging does not complete until the slowest sensor completes. FIG. 24 presents an improvement and the resulting compute intensive problem with the approach. Although we cannot solve a NP-Hard problem, we have developed a good method to approximate the solution. While the details of that application are being described by the inventors elsewhere, as it can be employed on a variety of machines like an Intel Touchstone with 512 i860 (80860) processors, and IBM's Scientific Visualization System, it can be used as an application suitable for the MMP using the APAP design described here with say 128,000 PMEs, substantially out-performing these other systems. Application experiments show the approximation quality is below the level of sensor noise and as such the answer is applicable to applications like AWACS. FIG. 25 shows the processing loop involved in the proposed Lagrangean Reduction n-dimensional Assignment algorithm. The problem uses very controlled repetitions of the well known 2-dimensional assignment problem, the same algorithm that classical sensor fusion processing uses.

Suppose for example that the n-dimensional algorithm was to be applied to the seven sets of observations illustrated in FIG. 24 and further, suppose that each pass through a reduction process required four iterations through a 2d Assignment process. Then the new 8d Assignment Problem would require 4000 iterations of the 2d Assignment Problem. The AWACS' workload is now about 90% of machine capacity. Fusion perhaps requires 10% of the total effort, but even that small effort when scaled up 4000 times results in total utilization being 370 times the capacity of an AWACS. Not only does this workload overwhelm the existing processor, but it would be marginal in any new MIL environment suited, coarse-grained, parallel processing system currently existing or anticipated in the next few years. If the algorithm required an average of 5 rather than 4 iterations per step, then it would overwhelm even the hypothesized systems. Conversely, the MPP solution can provide the compute power and can do so even at the 5 iteration level.

Mechanical Packaging

As illustrated in FIG. 3, and other FIGURES, our preferred chip is configured in a quadflatpack form. As such it can be brickwalled into into various 2 D and 3 D configurations in a package. One chip of eight or more processor memory elements is a first level package module, the same as a single DRAM memory chip is to a foundry which packages the chip. However, it is in a quadflatpack form, allowing connections to one another in four directions. Each connection is point to point. (One chip in its first level package is a module to the foundry.) We are able to construct PE arrays of sufficient magnitude to hit our performance goals due to this feature. The reality is that you can connect these chips across 3, 4 or even five feet, point-to-point, i.e. multi-processor node to node, and still have proper control without the need of fiber optics.

This has an advantage for the drive/receive circuits that are required on the modules. One can achieve high performance and keep the power dissipation down because we do not have bus systems that daisy chain from module to module. We broadcast from node to node, but this need not be a high performance path. Most data operations can be conducted in a node, so data path requirements are reduced. Our broadcast path is essentially primarily used as a controller routing tool. The data stream attaches to and runs in, the ZWXY communication path system.

Our power dissipation is 2.2 watts per node module for our commercial workstation. This allows us to use air cooled packaging. The power system requirements for our system are also reasonable because of this fact. Our power system illustrated multiplies the number of modules supported by about 2.5 watts per module, and such a five volt power supply is very cost effective. Those concerned with the amount of electricity consumed would be astonished that 32 microcomputers could operate with less than the wattage consumed by a reading light.

Our thermal design is enhanced because of the packaging. We avoid hot spots due to high dissipating parts mixed with low dissipating ones. This reflects directly on the cost of the assemblies.

The cost of our system is very attractive compared to the approaches that put a superscalar processor on a card. Our performance level per assembly per watt per connector per part type per dollar is excellent.

Furthermore, we do not need the same number of packaging levels that the other technology does. We do not need module/card/backplane and cable. We can skip the card level if we want to. As illustrated in our workstation modules, we have skipped the card level with our brickwalled approach.

Furthermore, as we illustrated in our layout, each node housing which is brickwalled in the workstation modules, can as illustrated in FIG. 3 comprise multiple replicated dies, even within the same chip housing. While normally we would place one die within an air cooled package, it is possible to place 8 die on a substrate using a multiple chip module approach. Thus, the envisioned watch with 32 or more processors, is possible, as well as many other applications. The packaging and power and flexibility make applications which are endless. A house could have its controllable instruments all watched, and coordinated with a very small part. Those many chips that are spread around an automobile for engine watching, brake adjustment, and so on could all have a monitor within a housing. In addition, one the same substrate with hybrid technology, one could mount a 386 microprocessor chip with full programmable capability and memory (all in one chip) and use it as the array controller for the substrate package.

We have shown many configurations of systems, from control systems, FIG. 3, to larger and larger systems. The ability to package a chip with multiple processor memory element of eight or more on a chip in a dip, with pinouts fitting in a standard DRAM memory module, such as in a SIM module make possible countless additional applications ranging from controls to wall size video displays which can have a repetition rate, not a the 15 or so frames that press the existing technology today, but at 30 frames, with a processor assigned to monitor a pixel, or a node only a few pixels. Our brickwall quadflatpack makes it easy to replicate the same part time over and over again. Furthermore, the replicated processor is really memory with processor interchange. Part of the memory can be assigned to a specific monitoring task, and another part (with a size programmatically defined) can be a massive global memory, addressed point-to-point, with broadcast to all capability.

Our basic workstation, our supercomputer, our controller, our AWACS, all are examples of packages that can employ our new technology. An array of memory, with inbuilt CPU chips and I/O, functions as a PME of massively parallel applications, and even more limited applications. The flexibility of packaging and programming makes imaginations expand and our technology allows one part to be assigned to many ideas and images.

Military Avionics Applications

Figure 26:
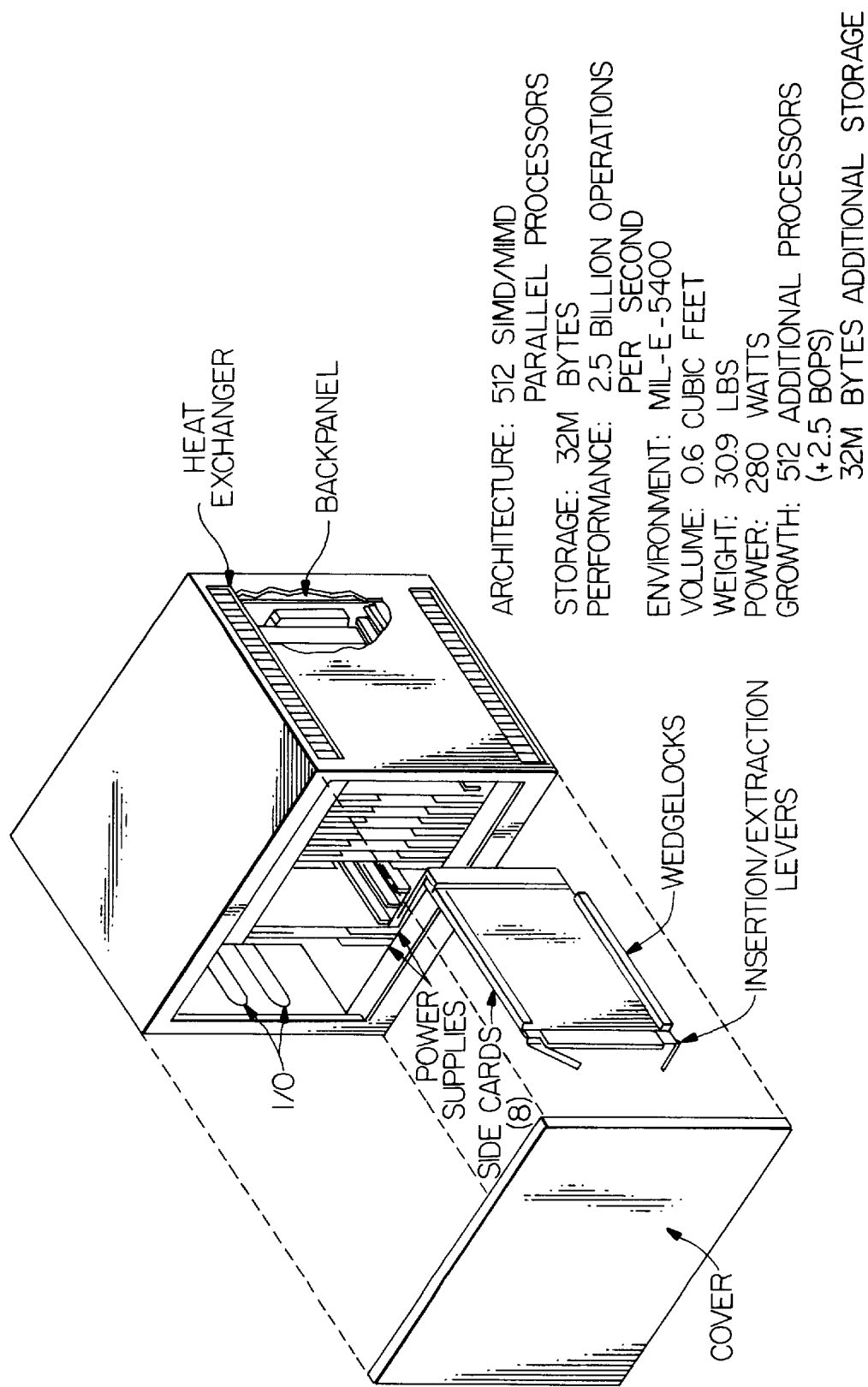
FIG. 26 illustrates the expansion unit provided by the system enclosure described showing how a unit can provide 424 MflopS or 5120 MIPS using only 8 to 10 extended SEM-E modules, providing the performance comparable to that of specialized signal processor module in only 0.6 cubic feet. This system can become a SIMD massive machine with 1024 parallel processors performing two billion operations per second (GOPS) and can grow by adding 1024 additional processors and 32MB additional storage.

The cost advantage of constructing a MIL MPP is particularly well illustrated by the AWACS. It is a 20 year old enclosure that has grown empty space as new technology memory modules have replaced the original core memories. FIG. 26 shows a MIL qualifiable two cluster system that would fit directly into the rack's empty space and would use the existing memory bus system for interconnection.

Although the AWACS example is very advantageous due to the existence of empty space, in other systems it is possible to create space. Replacing existing memory with a small MPP or gateway to an an isolated MPP is normally quite viable. In such cases, a quarter cluster and a adapter module would result in a 8 Megabyte memory plus 640 MIPs and use perhaps two slots.

Supercomputer Application

Figure 27:
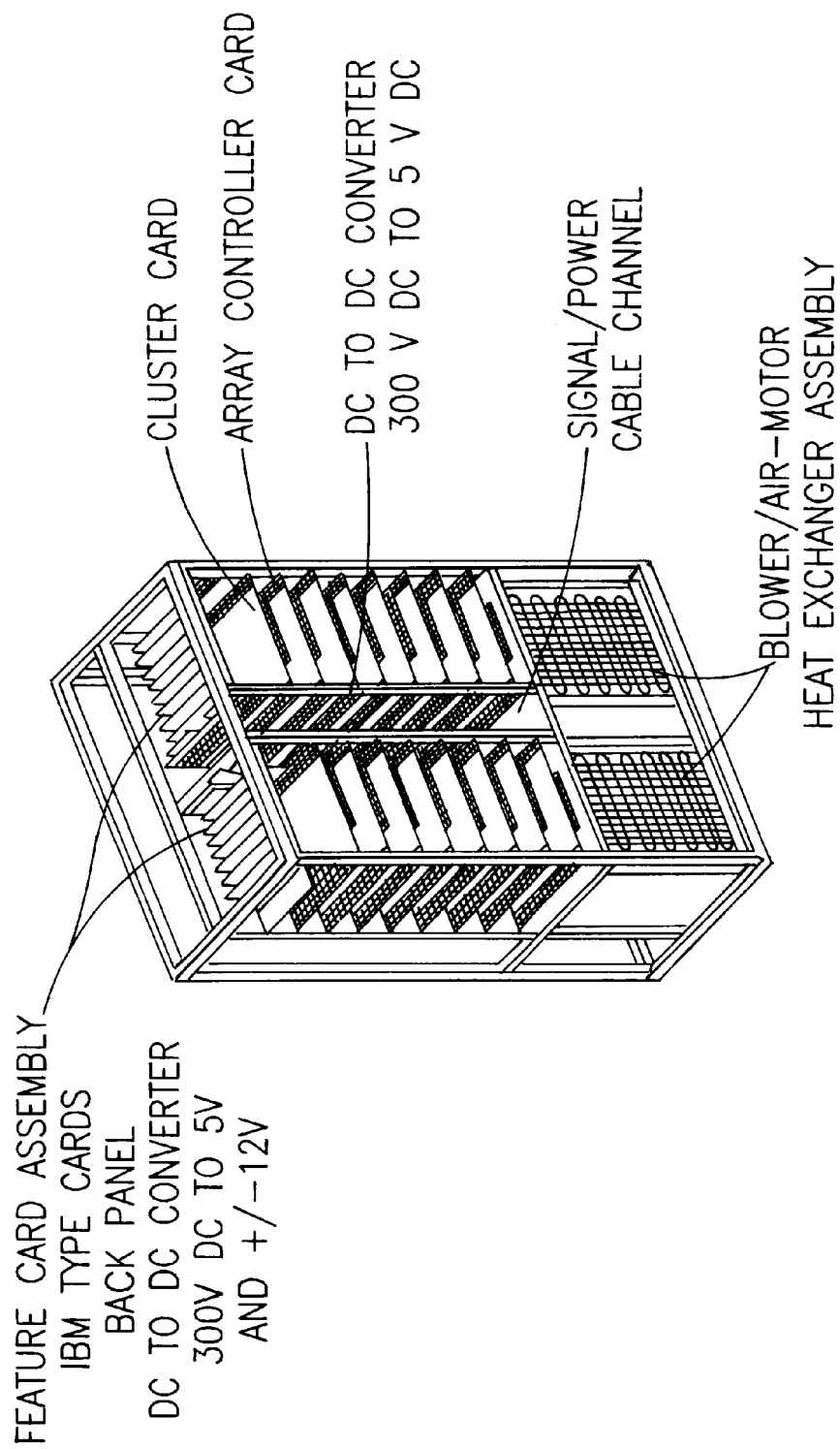
FIG. 27 illustrates the APAP packaging for a supercomputer. Here is a large system of comparable performance but much smaller footprint than other systems. It can be built by replicating the APAP cluster within an enclosure like those used for smaller machines.

A 64 cluster MPP is a 13.6 Gflop supercomputer. It can be configured in a system described in FIG. 27. The system we describe allows node chips to be brick walled on cluster cards as illustrated in FIG. 27 to build up systems with some significant cost and size advantages. There is no need to include extra chips such as a network switch in such a system because it would increase costs.

Our interconnection system with "brickwalled" chips allows systems to be built like massive DRAM memory is packaged and will have a defined bus adapter conforming to the rigid bus specifications, for instance a microchannel bus adaptor. Each system will have a smaller power supply system and cooling design than other systems based upon many modern microprocessors.

Unlike most supercomputers our current preferred APAP with floating point emulation is much faster in integer arithmetic (164 GIPS) than it is when doing floating point arithmetic. As such, the processor would be most effective when used in applications that are very character or integer intensive. We have considered three program challenges which in addition to the other applications discussed herein are needful of solution. The applications which may be more important than some of the "grand challenges" to day to day life include:

1. 3090 Vector Processors contain a very high performance floating point arithmetic unit. That unit, as do most vectorized floating point units, requires pipeline operations on dense vectors. Applications that make extensive use of non-regular sparse matrices (i.e. matrices described by bit maps rather than diagonals) waste the performance capability of the floating point unit. The MPP solves this problem by providing the storage for the data and using its compute power and network bandwidth, not to do the calculation but rather to construct dense vectors, and to decompress dense results. The Vector Processing Unit is kept busy by a continual flow of operations on dense vectors being supplied to it by the MPP. By sizing the MPP so that it can effectively compress and decompress at the same rate the Vector Facility processes, one could keep both units fully busy.

2. Another host attached system we considered is a solution to the FBI fingerprint matching problem. Here, a machine with more than 64 clusters was considered. The problem was to match about 6000 fingerprints per hour against the entire database of fingerprint history. Using massive DASD and the full bandwidth of the MPP to host attachment, one can roll the complete data base across the incoming prints in about 20 minutes. Operating about 75% of the MPP in a SIMD mode coarse matching operation, balances processing to required throughput rate. We estimate that 15% of the machine in A-SIMD processing mode would then complete the matching by doing the detailed verification of unknown print versus file print for cases passing the coarse filter operation. The remaining portions of the machine were in MIMD mode and allocated to reserve capacity, work queue management and output formatting.

3. Application of the MPP to database operations has been considered.

Although the work is very preliminary, it does seem to be a good match. Two aspects of the MPP support this premise:

a. The connection between a cluster Controller and the Application Processor Interface is a MicroChannel. As such, it could be populated with DASD dedicated to the cluster and accessed directly from the cluster. A 64 cluster system with six 640 Mbyte hard drives attached per cluster would provide 246 Gbyte storage. Further, that entire database could be searched sequentially in 10 to 20 seconds.

b. Databases are generally not searched sequentially. Instead they use many levels of pointers. Indexing of databases can be done within the cluster. Each bank of DASD would be supported by 2.5 GIPS of processing power and 32 Mbyte of storage. That is sufficient for both searching and storing the indices. Since indices are now frequently stored within the DASD, significant performance gains would occur. Using such an approach and dispersing DASD on SCSI interfaces attached to the cluster MicroChannel permits effectively unlimited size data bases.

FIG. 27 is an illustration of the APAP when used to build the system into a supercomputer scaled MPP. The approach reverts to replicating units, but here it is enclosures containing 16 clusters that are replicated. The particular advantage of this replication approach is that the system can be scaled to suit the user's needs.

System Architecture

An advantage of the system architecture which is employed in the current preferred embodiment is the ISA system which will be understood by many who will form a pool for programming the APAP. The PME ISA consists of the following Data and Instruction Formats illustrated in the Tables.

Data Formats

The basic (operand) size is the 16 bit word. In PME storage, operands are located on integral word boundaries. In addition to the word operand size, other operand sizes are available in multiples of 16 bits to support additional functions.

Within any of the operand lengths, the bit positions of the operand are consecutively numbered from left to right starting with the number 0. Reference to high-order or most-significant bits always refer to the left-most bit positions. Reference to the low-order or least-significant bits always refer to the right-most bit positions.

Instruction Formats

The length of an instruction format may either be 16 bits or 32 bits. In PME storage, instructions must be located on a 16 bit boundary.

The following general instruction formats are used. Normally, the first four bits of an instruction define the operation code and are referred to as the OP bits. In some cases, additional bits are required to extend the definition of the operation or to define unique conditions which apply to the instruction. These bits are referred to as OPX bits.

| Format Code | Operation |
|---|---|
| RR | Register to Register |
| DA | Direct Address |
| RS | Register Storage |
| RI | Register Immediate |

-continued

| Format Code | Operation |
| --- | --- |
| SS | Storage to Storage |
| SPC | Special |

All formats have one field in common. This field and its interpretation is:

Bits 0–3

Operation Code—This field, sometimes in conjunction with an operation code extension field, defines the operation to be performed.

Detailed figures of the individual formats along with interpretations of their fields are provided in the following subsections. For some instructions, two formats may be combined to form variations on the instruction. These primarily involve the addressing mode for the instruction. As an example a storage to storage instruction may have a form which involves direct addressing or register addressing.

RR Format

The Register-Register (RR) format provides two general register addresses and is 16 bits in length as shown.

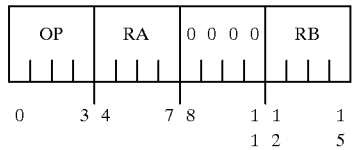

In addition to an Operation Code field, the RR format contains:

Bits 4–7

Register Address 1—The RA field is used to specify which of the 16 general registers is to be used as an operand and/or destination.

Bits 8–11

Zeros—Bit 8 being a zero defines the format to be a RR or DA format and bits 9–11 equal to zero define the operation to be a register to register operation (a special case of the Direct Address format).

Bits 12–15

Register Address 2—The RB field is used to specify which of the 16 general registers is to be used as an operand.

DA Format

The Direct Address (DA) format provides one general register address and one direct storage address as shown.

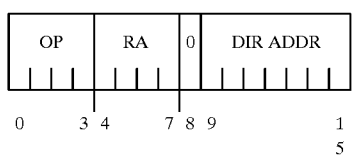

In addition to an Operation Code field, the DA format contains:

Bits 4–7

Register Address 1—The RA field is used to specify which of the 16 general registers is to be used as an operand and/or destination.

Bit 8

Zero—This bit being zero defines the operation to be a direct address operation or a register to register operation.

Bits 9–15

Direct Storage Address—The Direct Storage Address field is used as an address into the level unique storage block or the common storage block. Bits 9–11 of the direct address field must be non-zero to define the direct address form.

RS Format

The Register Storage (RS) format provides one general register addresses and an indirect storage address.

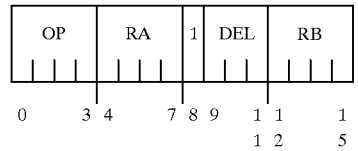

In addition to an Operation Code field, the RS format contains:

Bits 4–7

Register Address 1—The RA field is used to specify which of the 16 general registers is to be used as an operand and/or destination.

Bit 8

One—This bit being one defines the operation to be a register storage operation.

Bits 9–11

Register Data—These bits are considered a signed value which is used to modify the contents of register specified by the RB field.

Bits 12–15

Register Address 2—The RB field is used to specify which of the 16 general registers is to be used as an storage address for an operand.

RI Format

The Register-immediate (RI) format provides one general register address and 16 bits of immediate data. The RI format is 32 bits of length as shown:

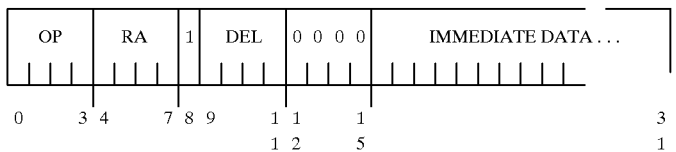

In addition to an Operation Code field, the RI format contains:

Bits 4–7
Register Address 1—The RA field is used to specify which of the 16 general registers is to be used as an operand and/or destination.

Bit 8
One—This bit being one defines the operation to be a register storage operation.

Bits 9–11
Register Data—These bits are considered a signed value which is used to modify the contents of the program counter. Normally, this field would have a value of one for the register immediate format.

Bits 12–15
Zeroes—The field being zero is used to specify that the updated program counter, which points to the immediate data field, is to be used as an storage address for an operand.

Bits 16–31
Immediate Data—This field serves as a 16 bit immediate data operand for Register Immediate instructions.

SS Format

The Storage to Storage (SS) format provides two storage addresses, one explicit; and the second implicit. The implied storage address is contained in General Register 1. Register 1 is modified during execution of the instruction. There are two forms of a SS instruction, a direct address form and a storage address form.

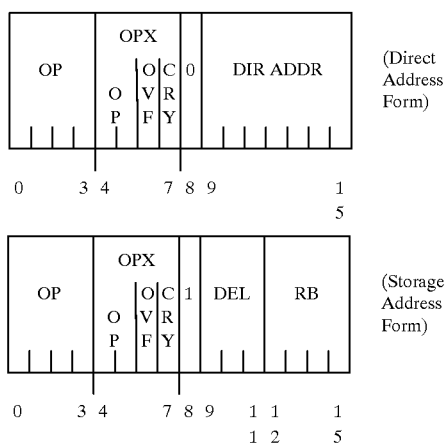

In addition to an Operation Code field, the SS format contains:

Bits 4–7
Operation Extension Code—The OPX field, together with the Operation Code, defines the operation to be performed. Bits 4–5 define the operation type such as ADD or SUBTRACT. Bits 6–7 control the carry, overflow, and how the condition code will be set. Bit 6=0 ignores overflow, bit 6=1 allows overflow. Bit 7=0 ignore the carry stat during the operation; bit 7=1 includes the carry stat during the operation.

Bit 8
Zero—Defines the form to be a direct address form.
One—Defines the form to be a storage address form.

Bits 9–15
Direct Address (Direct Address Form)—The Direct Storage Address field is used as an address into the level unique storage block or the common storage block. Bits 9–11 of the direct address field must be non-zero to define the direct address form.

Bits 9–11
Register Delta (Storage Address Form)—These bits are considered a signed value which is used to modify the contents of register specified by the RB field.

Bits 12–15
Register Address 2 (Storage Address Form)—The RB field is used to specify which of the 16 general registers is to be used as a storage address for an operand.

SPC Format 1

The Special (SPC1) format provides one general register storage operand address.

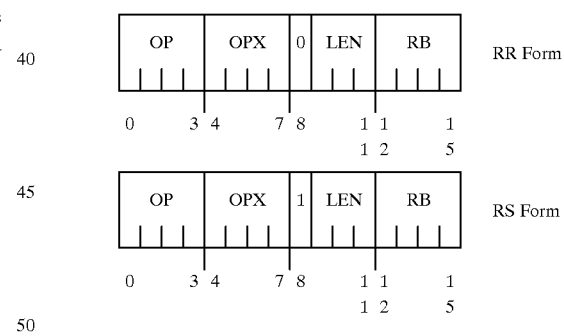

In addition to an Operation Code field, the SPC1 format contains:

Bits 4–7
OP Extension—The OPX field is used to extend the operation code.

Bit 8
Zero or One—This bit being zero defines the operation to be a register operation. This bit being one defines the operation to be a register storage operation.

Bits 9–11
Operation Length—These bits are considered an unsigned value which is used to specify the length of the operand in 16 bit words. A value of zero corresponds to a length of one, and a value of B'111' corresponds to a length of eight.

Bits 12–15

Register Address 2—The RB field is used to specify which of the 16 general registers is to be used as a storage address for the operand.

SPC Format 2

The Special (SPC2) format provides one general register storage operand address.

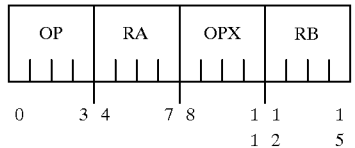

In addition to an Operation Code field, the SPC2 format contains:

Bits 4–7

Register Address 1—The RA field is used to specify which of the 16 general registers is to be used as an operand and/or destination.

Bits 8–11

OP Extension—The OPX field is used to extend the operation code.

Bits 12–15

Register Address 2—The RB field is used to specify which of the 16 general registers is to be used as a storage address for the operand.

THE INSTRUCTION LIST OF THE ISA
INCLUDES THE FOLLOWING:

TABLE 1

Fixed-Point Arithmetic Instructions

| NAME | MNE-MONIC | TYPME |
|---|---|---|
| ADD DIRECT | ada | DA |
| ADD FROM STORAGE | a | RS |
| (WITH DELTA) | awd | RS |
| ADD IMMEDIATE | ai | RI |
| (WITH DELTA) | aiwd | RI |
| ADD REGISTER | ar | RR |
| COMPARE DIRECT ADDRESS | cda | DA |
| COMPARE IMMEDIATE | ci | RI |
| (WITH DELTA) | ciwd | RI |
| COMPARE FROM STORAGE | c | RS |
| (WITH DELTA) | cwd | RS |
| COMPARE REGISTER | cr | RR |
| COPY | cpy | RS |
| (WITH DELTA) | cpywd | RS |
| COPY WITH BOTH IMMEDIATE | cpybi | RI |
| (WITH DELTA) | cpybiwd | RI |
| COPY IMMEDIATE | cpyi | RI |
| (WITH DELTA) | cpyiwd | RI |
| COPY DIRECT | cpyda | DA |
| COPY DIRECT IMMEDIATE | cpydai | DA |
| INCREMENT | inc | RS |
| (WITH DELTA) | incwd | RS |
| LOAD DIRECT | lda | DA |
| LOAD FROM STORAGE | l | RS |
| (WITH DELTA) | lwd | RS |
| LOAD IMMEDIATE | li | RI |
| (WITH DELTA) | liwd | RI |
| LOAD REGISTER | lr | RR |
| MULTIPLY SIGNED | mpy | SPC |
| MULTIPLY SIGNED EXTENDED | mpyx | SPC |
| MULTIPLY SIGNED EXTENDED IMMEDIATE | mpyxi | SPC |

TABLE 1-continued

Fixed-Point Arithmetic Instructions

| NAME | MNE-MONIC | TYPME |
|---|---|---|
| MULTIPLY SIGNED IMMEDIATE | mpyi | SPC |
| MULTIPLY UNSIGNED | mpyu | SPC |
| MULTIPLY UNSIGNED EXTENDED | mpyux | SPC |
| MULTIPLY UNSIGNED EXTENDED IMMEDIATE | mpyuxi | SPC |
| MULTIPLY UNSIGNED IMMEDIATE | mpyui | SPC |
| STORE DIRECT | stda | DA |
| STORE | st | RS |
| (WITH DELTA) | stwd | RS |
| STORE IMMEDIATE | sti | RI |
| (WITH DELTA) | stiwd | RI |
| SUBTRACT DIRECT | sda | DA |
| SUBTRACT FROM STORAGE | s | RS |
| (WITH DELTA) | swd | RS |
| SUBTRACT IMMEDIATE | si | RI |
| (WITH DELTA) | siwd | RI |
| SUBTRACT REGISTER | sr | RR |
| SWAP AND EXCLUSIVE OR WITH STORAGE | swapx | RR |

TABLE 2

Storage to Storage Instructions

| NAME | MNE-MONIC | TYPME |
|---|---|---|
| ADD STORAGE TO STORAGE | sa | SS |
| (WITH DELTA) | sawd | SS |
| ADD STORAGE TO STORAGE DIRECT | sada | SS |
| ADD STORAGE TO STORAGE FINAL | saf | SS |
| (WITH DELTA) | safwd | SS |
| ADD STORAGE TO STORAGE FINAL DIRECT | safda | SS |
| ADD STORAGE TO STORAGE INTERMEDIATE | sai | SS |
| (WITH DELTA) | saiwd | SS |
| ADD STORAGE TO STORAGE INTERMEDIATE DIRECT | saida | SS |
| ADD STORAGE TO STORAGE LOGICAL | sal | SS |
| (WITH DELTA) | salwd | SS |
| ADD STORAGE TO STORAGE LOGICAL DIRECT | salda | SS |
| COMPARE STORAGE TO STORAGE | sc | SS |
| (WITH DELTA) | scwd | SS |
| COMPARE STORAGE TO STORAGE DIRECT | scda | SS |
| COMPARE STORAGE TO STORAGE FINAL | scf | SS |
| (WITH DELTA) | scfwd | SS |
| COMPARE STORAGE TO STORAGE FINAL DIRECT | scfda | SS |
| COMPARE STORAGE TO STORAGE INTERMEDIATE | sci | SS |
| (WITH DELTA) | sciwd | SS |
| COMPARE STORAGE TO STORAGE INTERMEDIATE DIRECT | scida | SS |
| COMPARE STORAGE TO STORAGE LOGICAL | scl | SS |
| (WITH DELTA) | sclwd | SS |
| COMPARE STORAGE TO STORAGE LOGICAL DIRECT | sclda | SS |
| MOVE STORAGE TO STORAGE | smov | SS |
| (WITH DELTA) | smovwd | SS |
| MOVE STORAGE TO STORAGE DIRECT | smovda | SS |
| SUBTRACT STORAGE TO STORAGE | ss | SS |
| (WITH DELTA) | sswd | SS |
| SUBTRACT STORAGE TO STORAGE DIRECT | ssda | SS |
| SUBTRACT STORAGE TO STORAGE FINAL | ssf | SS |
| (WITH DELTA) | ssfwd | SS |
| SUBTRACT STORAGE TO STORAGE FINAL DIRECT | ssfda | SS |
| SUBTRACT STORAGE TO STORAGE INTERMEDIATE | ssi | SS |
| (WITH DELTA) | ssiwd | SS |
| SUBTRACT STORAGE TO STORAGE INTERMEDIATE DIRECT | saida | SS |

TABLE 2-continued

Storage to Storage Instructions

| NAME | MNEMONIC | TYPME |
|---|---|---|
| SUBTRACT STORAGE TO STORAGE LOGICAL | ssl | SS |
| (WITH DELTA) | sslwd | SS |
| SUBTRACT STORAGE TO STORAGE LOGICAL DIRECT | sslda | SS |

TABLE 3

Logical Instructions

| NAME | MNEMONIC | TYPME |
|---|---|---|
| AND DIRECT ADDRESS | nda | DA |
| AND FROM STORAGE | n | RS |
| (WITH DELTA) | nwd | RS |
| AND IMMEDIATE | ni | RI |
| (WITH DELTA) | niwd | RI |
| AND REGISTER | nr | RR |
| OR DIRECT ADDRESS | oda | DA |
| OR FROM STORAGE | o | RS |
| (WITH DELTA) | owd | RS |
| OR IMMEDIATE | oi | RI |
| (WITH DELTA) | oiwd | RI |
| OR REGISTER | or | RR |
| XOR DIRECT ADDRESS | xda | DA |
| XOR FROM STORAGE | x | RS |
| (WITH DELTA) | xwd | RS |
| XOR IMMEDIATE | xi | RI |
| (WITH DELTA) | xiwd | RI |
| XOR REGISTER | xr | RR |

TABLE 4

Shift Instructions

| NAME | MNEMONIC | TYPME |
|---|---|---|
| SCALE BINARY | scale | SPC |
| SCALE BINARY IMMEDIATE | scalei | SPC |
| SCALE BINARY REGISTER | scaler | SPC |
| SCALE HEXADECIMAL | scaleh | SPC |
| SCALE HEXADECIMAL IMMEDIATE | scalehi | SPC |
| SCALE HEXADECIMAL REGISTER | scalehr | SPC |
| SHIFT LEFT ARITHMETIC BINARY | sla | SPC |
| SHIFT LEFT ARITHMETIC BINARY IMMEDIATE | slai | SPC |
| SHIFT LEFT ARITHMETIC BINARY REGISTER | slar | SPC |
| SHIFT LEFT ARITHMETIC HEXADECIMAL | slah | SPC |
| SHIFT LEFT ARITHMETIC HEXADECIMAL IMMEDIATE | slahi | SPC |
| SHIFT LEFT ARITHMETIC HEXADECIMAL REGISTER | slahr | SPC |
| SHIFT LEFT LOGICAL BINARY | sll | SPC |
| SHIFT LEFT LOGICAL BINARY IMMEDIATE | slli | SPC |
| SHIFT LEFT LOGICAL BINARY REGISTER | sllr | SPC |
| SHIFT LEFT LOGICAL HEXADECIMAL | sllh | SPC |
| SHIFT LEFT LOGICAL HEXADECIMAL IMMEDIATE | sllhi | SPC |
| SHIFT LEFT LOGICAL HEXADECIMAL REGISTER | sllhr | SPC |
| SHIFT RIGHT ARITHMETIC BINARY | sra | SPC |
| SHIFT RIGHT ARITHMETIC BINARY IMMEDIATE | srai | SPC |
| SHIFT RIGHT ARITHMETIC BINARY REGISTER | srar | SPC |
| SHIFT RIGHT ARITHMETIC HEXADECIMAL | srah | SPC |
| SHIFT RIGHT ARITHMETIC HEXADECIMAL IMMEDIATE | srahi | SPC |
| SHIFT RIGHT ARITHMETIC HEXADECIMAL REGISTER | srahr | SPC |

TABLE 4-continued

Shift Instructions

| NAME | MNEMONIC | TYPME |
|---|---|---|
| SHIFT RIGHT LOGICAL BINARY | srl | SPC |
| SHIFT RIGHT LOGICAL BINARY IMMEDIATE | srli | SPC |
| SHIFT RIGHT LOGICAL BINARY REGISTER | srlr | SPC |
| SHIFT RIGHT LOGICAL HEXADECIMAL | srlh | SPC |
| SHIFT RIGHT LOGICAL HEXADECIMAL IMMEDIATE | srlhi | SPC |
| SHIFT RIGHT LOGICAL HEXADECIMAL REGISTER | srlhr | SPC |

TABLE 5

Branch Instructions

| NAME | MNEMONIC | TYPME |
|---|---|---|
| BRANCH | b | RS |
| (WITH DELTA) | bwd | RS |
| BRANCH DIRECT | bda | DA |
| BRANCH IMMEDIATE | bi | RI |
| (WITH DELTA) | biwd | RI |
| BRANCH REGISTER | br | RS |
| BRANCH AND LINK | bal | RS |
| BRANCH AND LINK DIRECT | balda | DA |
| BRANCH AND LINK IMMEDIATE | bali | RI |
| (WITH DELTA) | baliwd | RI |
| BRANCH AND LINK REGISTER | balr | RS |
| BRANCH BACKWARD | bb | RS |
| (WITH DELTA) | bbwd | RS |
| BRANCH BACKWARD DIRECT | bbda | DA |
| BRANCH BACKWARD IMMEDIATE | bbi | RI |
| (WITH DELTA) | bbiwd | RI |
| BRANCH BACKWARD REGISTER | bbr | RS |
| BRANCH FORWARD | bf | RS |
| (WITH DELTA) | bfwd | RS |
| BRANCH FORWARD DIRECT | bfda | DA |
| BRANCH FORWARD IMMEDIATE | bfi | RI |
| (WITH DELTA) | bfiwd | RI |
| BRANCH FORWARD REGISTER | bfr | RS |
| BRANCH ON CONDITION | bc | RS |
| (WITH DELTA) | bcwd | RS |
| BRANCH ON CONDITION DIRECT | bcda | RS |
| BRANCH ON CONDITION IMMEDIATE | bci | RI |
| (WITH DELTA) | bciwd | RI |
| BRANCH ON CONDITION REGISTER | bcr | RS |
| BRANCH RELATIVE | brel | RI |
| (WITH DELTA) | brelwd | RS |
| NULL OPMERATION | noop | RR |

TABLE 6

Status Switching Instructions

| NAME | MNEMONIC | TYPME |
|---|---|---|
| RETURN | ret | SPC |

TABLE 7

Input/Output Instructions

| NAME | MNE-MONIC | TYPME |
| --- | --- | --- |
| IN | IN | SPC |
| OUT | OUT | SPC |
| INTERNAL DIOR/DIOW | INTR | SPC |

SOME SUMMARY FEATURES

The APAP Machine in Perspective

We have described in accordance with our invention could be thought of in its more detailed aspects to be positioned in the technology somewhere between the CM-1 and N-cube. Like our APAP, the CM-1 uses a point design for the processing element and combines processing elements with memory on the basic chip. The CM-1, however uses a 1 bit wide serial processor, while the APAP series will use a 16 bit wide processor. The CM series of machines started with 4K bits of memory per processor and has grown to 8 or 16K bits versus the 32K by 16 bits we have provided for the first APAP chip. The CM-1 and its follow-ons are strictly SIMD machines while the CM-5 is a hybrid. Instead of this, our APAP will effectively use MIMD operating modes in conjunction with SIMD modes when useful. While our parallel 16 bit wide PMEs might be viewed as a step toward the N-cube, this step is not warranted. The APAP does not separate memory and routing from the processing element as does the N-cube kind of machine. Also, the APAP provides for up to 32K 16 bit PMEs while the N-cube only provides for 4K 32 bit processors.

Even with the superficial similarities presented above, the APAP concept completely differs from the CM and N-cube series by:

1. The modified hypercube incorporated in our APAP is a new invention providing a significant packaging and addressing advantage when compared with hypercube topologies. For instance, consider that the 32K PME APAP in its first preferred embodiment has a network diameter of 19 logical steps and, with transparency, this can be reduced to an effective 16 logical steps. Further, by comparison, if a pure hypercube were used, and if all PMEs were sending data through an 8 step path, then on average 2 of every 8 PMEs would be active while the remainder would be delayed due to blockage.

Alternatively, consider the 64K hypercube that would be needed if CM-1 was a pure hypercube. In that case, each PME would require ports to 16 other PMEs, and data could be routed between the two farthest separated PMEs in 15 logical steps. If all PMEs tried to transfer an average distance of 7 steps, the 2 of every 7 would be active. However, CM-1 does not utilize a 16d hypercube. It interconnects the 16 nodes on a chip with a NEWS network; then it provides one router function within the chip. The 4096 routers are connected into a 12d hypercube With no collisions the hybrid still has a logical diameter of 15, but since 16 PMEs could be contending for the link its effective diameter is much greater. That is, with 8 step moves only 2 of 16 PMEs could be active, which means that 8 complete cycles rather than 4 cycles are needed to complete all data moves.

The N-cube actually utilizes a pure hypercube, but currently only provides for a 4096 PMEs and thus, utilizes a 12d (13d for 8192 PMEs) hypercube. For the N-cube to grow to 16K processors, at which point it would have the same processing data width as the APAP, it would have to add four times as much hardware and would have to increase the connection ports to each PME router by 25%. Although no hard data exists to support this conclusion, it would appear that the N-cube architecture runs out of connector pins prior to reaching a 16K PME machine.

2. The completely integrated and distributed nature of major tasks within the APAP machine is a decided advantage. As was noted for the CM and N-cube series of machines, each had to have separate units for message routing as well as separate units for floating point coprocessors. The APAP system combines the integer, floating point processing, message routing and I/O control into the single point design PME. That design is then replicated 8 times on a chip, and the chip is then replicated 4K times to produce the array. This provides several advantages:
   a. Using one chip means maximum size production runs and minimal system factor costs.
   b. Regular architecture produces the most effective programming systems.
   c. Almost all chip pins can be dedicated to the generic problem of interprocessor communication, maximizing the inter-chip I/O bandwidth which tends to be a important limiting factor in MPP designs.

3. The APAP has the unique design ability to take advantage of chip technology gains and capital investment in custom chip designs.

Consider the question of floating point performance. It is anticipated that APAP PME performance on DAXPY will be about 125 cycles per flop. In contrast, the '387 Coprocessor would be about 14 cycles while the Weitec Coprocessor in the CM-1 would be about 6 cycles. However, in the CM case there is only one floating point unit for every 16 PMEs while in the N-cube case there is probably one '387 type chip associated with each of the '386 processors. Our APAP has 16 times as many PMEs and therefore can almost completely make up for the single unit performance delta.

More significantly, the 8 APAP PMEs within a chip are constructed from 50K gates currently available in the technology. As memory macros shrink and the number of gates available to the logic increases. Spending that increase on enhanced floating point normalization should permit APAP floating point performance to far exceed the other units. Alternatively, effort could be spent to generate a PME or PME subsection design using custom design approaches, enhancing total performance while in no way affecting any S/W developed for the machine.

We believe our design for our APAP has characteristics poised to take advantage of the future process technology growth. In contrast, the nearest similar machines CM-x and N-cube which employ a system like that described in FIG. 1 seem well poised to take advantage of yesterday's technology which we feel is dead ended.

An advantage of the APAP concept is the ability to use DASD associated with groups of PMEs. This APAP capability, as well as the ability to connect displays and auxiliary storage, is a by-product of picking MC bus structures as the interface to the external I/O ports of the PME Array. Thus, APAP systems will be configurable and can include card mounted hard drives selected from one of the set of units that are compatible with PS/2 or RISC/6000 units. Further, that capability should be available without designing any additional part number modules although it does require utilizing more replications of the backpanel and base enclosure than does the APAP.

Picket and APAP Multi-PME MIMD/SIMD Features

Our Picket processor is quite compact, and we expect that its usefulness in its ability to put 1000 processors on 2–8 cards for military use Will be especially advantageous. However concepts within the system are applicable to processors which use some less advanced technology, which we expect to replace with processor memory chips. For instance, some of our original concepts could be implemented in a machine which has a workstation RISC microprocessor, even one which has only one processor per card. Each processing unit is an element of an array. Each processing unit is provided with memory, its own instruction stream, and it can and does run completely autonomously on its own code stream with an MIMD implementation. If several elements are executing a copy of the same instruction stream, and they are synchronized such that they run more or less synchronously, then an APAP or other such machine could emulate our picket SIMD architecture. Our APAP machine is structured to function an MIMD element which can emulate SIMD. In comparison, our Picket Processor is preferably configured to be based on a a SIMD architecture where a number of data elements are controlled by a single instruction interpretation element. The Picket machine, emulates MIMD by having the single instruction interpretation element command all of the data elements to read data from their memory and interpret it as an element instruction. Each element can also keep track of its own next instruction address. In this way, a Picket Processor provides MIMD operations.

The APAP machine is a flexible machine, which can implement an SIMD architecture and implement features like those we developed for our picket machine, for both the commercial and the military environment. It can implement a control structure that emulates SIMD with elements having individual instruction streams. Our APAP has several small processor processors on one chip. Each has performance in the range of the Picket machine. In some respects the VLSI design of the APAP (and PICKET version) can achieve the function of more coarse grained processors, but it can also and does provide a much finer grained array design.

Our Picket machine provides the capability for a control network and associated processing needed when a program needs a the control network to carry out "reduction" and related operations.

Some of our features which are advances in the art at the time we developed the picket machine include the SIMIMD function. Our SIMIMD function provides that a picket memory is loaded with small amounts of program code which is executed which is executed by each picket. Control is retained by the controller, after which additional small amounts of code may be loaded and executed. The processing unit in MIMD mode provides the ability to do independent things in each picket processing unit. It is now not necessary to transfer an entire program to an array processor. An entire program would not normally be transferred to the Pickets.

For example, a partition manage could load identical code onto every processing node in a partition. Data would be distributed across nodes. Given an array of m values and a partition of n nodes, each node would then handle m/n values. As each node can execute the portion of its program in its MIMD mode independently, branching according to its own data values, as long as computation remains local, no synchronization or communication is needed. When data needs to be transferred among processors, for example when processors must each contribute values to a global sum, the communication networks carry the data and enforce the necessary synchronization. For global combining operations such as sum, the controller functions to organize the controlled network to perform the reduction.

Another feature of our picket machine is our slide bus. A slide bus can be used to broadcast data from the array controller to the array of pickets, or from a single picket to the array controller for use by the controller, or for rebroadcast to the array. By implementing our slide bus many machines could be enhanced. Augmenting data transfer with picket processing activity can cause more powerful functions to be performed on the slide bus. Several functions which can be performed by a system having a slide bus are:

HORIZONTAL SUM—This process creates the sum of the numbers presented to the process by each active picket. This is but one example of a type of command that creates one value from an array of numbers for which a slide bus is especially useful.

ACCUMULATE LEFT—In this process, each picket ends up containing the sum of all of the number to the pickets "right".

Two implementations illustrate this power.

A. One simply shifts numbers right (with zero fill) and each picket simply adds to its sum.

B. A second implementation does the process in a more parallel fashion, requiring only four steps to do sixteen numbers.

FIND VALUE—The picket containing a given value of a parameter is identified.

FIND MAX—The picket containing the maximum value of a parameter is identified.

More examples, a system can be divide the parallel processing nodes into groups, which can be considered as a partition. A controller can manage each partition. A user process can execute on a single partition.

Interprocessor communication can be by replication which copies data values. A single value, for example, may be broadcast to all processors for use in a computation. A vector may be copied into each column of a matrix, or into each row. This is called spreading. A less regular patter is the divisor of a collection into arbitrary subsets of varying size. One can broadcast a different value within each subset. If the subsets are ordered and not interleaved, one may regard them as a collection of vectors of various sizes. This common case can be implemented as well as a general case.

Reduction can also be used with interprocessor communication. Reduction takes data values and makes a smaller number of data values by combining them. A single value, for example, may be produced by computing the sum of a set of values; here the combining operation is addition. Reduction operations include taking largest or smallest values, logical AND, and logical OR. All of these start with a large collection of values and reduce them to a single result.

Permutation can be used with interprocessor communication. Permutation rearranges its inputs to produce the same number of results. Every data value comes from one place and goes to one place transposing a matrix, reversing a vector, shifting a multi-dimensional grid, and FFT butterfly patterns are examples.

Global functions include broadcasting data or instruction from a host to a node, reducing data from a node to a host, reducing data to all nodes, performing scans across a node, performing segmented parallel prefix operations, concatenation of elements into a buffer on all nodes or concatenation of elements from the nodes to a buffer on the host. Reduce and parallel prefix operations can perform summation, find a maximum or minimum value, or perform bitwise AND, OR, or XOR. Note that in our Picket and APAP machines, these operations can be performed at a node level or at an individual processor memory element level. An individual processor memory element functions as would a node of machines which provide only one processor with memory to a card.

A controller contains integer and logical arithmetic hardware. The controller can computer parallel prefix operations and segment the parallel operations. All processors can be placed in synchronous modes, and when ready can tell the controller that they are ready for SIMD operation. However, processors can operate in MIMD mode. They can overlap unrelated processing within waiting times. Programs can be used for SIMD like operations where thousands of processor perform SIMD operations without requiring that all be exactly synchronized.

Global operations can be performed, including global reduction. Integer summation, finding an integer max, logical OR, logical exclusive OR, and floating point operations all can be carried out by a node. Matrix operations can be performed.

Our controller and controlled network functions include synchronization of processing nodes (and processing elements within a node), combining a value from every processing element to produce a single result, and can computer parallel prefix operations. Our picket processor provides a separate control network and data network. See U.S. Ser. No. 611,594 and other related applications.

We have hardware clusters. However, hardware clusters need not be restrain the use of partitioning of UNIX software clusters for partition. Replication can be within a software defined array, which may be within, or include more, than a hardware cluster. Broadcast to an array would include all defined processing elements defined for an array process. Spreading and the opposition of SPREAD (in the Fortran sense) are supported, and processors can be partitioned into clusters in the software sense for broadcast operations.

Our picket process has a broadcast out from a node or processing element within a node. Thus levels of broadcast operations which have identical functions are provided, with supervisory functions reserved to an array controller. A processor can receive a broadcast during a process of executing MIMD internal instructions. We broadcast instructions. With a mask bit, a processor may abstain from a broadcast.

GROUPS—The Picket, or the array controller, can assign the picket to one or more of several groups. A Picket can be in more that one group simultaneously. Groups can be selected for certain parts of a process in either SIMD or MIMD mode, and may be freely moved between these.

A a partition can exchange data with processes on other partitions. Multiple users can access the partition without interfering with another user's use.

Each processing element need not have (and does not have) an entire operating system. Code can be downloaded or broadcast, along with data, e.g. for memory maps, to processing elements in a node. Each processing element and node has memory which can be apportioned to its operations and for global memory operations. Broadcast codes, to one or more processing elements, permits the individual processing elements to execute the provided code, each acting on its own data and executing computations and branches accordingly.

Partitions can be freely configured for a single user task. Each partition can complete a task as part of a system which can be used for timesharing, batch processing, or both.

A virtual network address allocation can have protection checking that prevents a user process from sending messages to destinations outside of a partition. An array controller can send messages from one partition to another. I/O can be coordinated at various levels, ranging from a host to a node.

AUTONOMY—Each Picket contains a status latch that controls processing. If the latch is set, the Picket refrains from participating in processing. Furthermore, a Picket can reactivate itself based on tests of conditions within its own memory.

Vector elements can be handled in each processing element and node vector instructions can be a short 32-bit format, or longer formats.

Local autonomy of a processor memory element permits abstaining from a broadcast. A latch can be set or reset, and depending upon the setting a picket participates or does not participate. A participating processing element would be one that does not refrain from participating.

CONTROLLER—Instructions are provided for manipulation of vectors of numbers. These vectors can be horizontal (distributed one per Picket), or the vectors can be vertical (entire vector of numbers is contained in one picket. In addition, however, each Picket may contain a vector of numbers. Instructions provide all of the desired vector commands such as sum of two vectors, or subtract a constant from each member of a vector, or various vector products, or reductions, or others.

The controller can provide all of the desired vector commands.

STAT FUNNEL—The Picket array controller uses a 'stat funnel' to collect the status from active pickets and route the cumulative result to the array controller.

The status funnel allows all processors to indicate that their processing steps are complete, and that a next operation can proceed in accordance with a command from a controller.

There are additional features which are common to picket processors and applicable to other machines such as our APAP. These features can be employed in machines with are parallel array processors.

We have provided independent processing element with scalability, both at the processor and system level. There is thus scalability of processing, communication and I/O. Floating-integer processing is provided. There is a high bandwidth. A processor array can execute high-level language programs, do multiple job execution, both time shared and partition, with multi-user access, security between users, with a high-bandwidth I/O due to parallel communication between processing elements, a system can perform scalar and parallel execution balancing I/O, processing and memory, with high reliability and fail safe availability.

Single and multiple tasks can be performed, and processing partitions nodes and elements can be timeshared. Nodes can fetch from the same address in processor memories to execute in SIMD-mode the same instruction, or from individually chosen addresses to execute independent MIMD-mode instructions.

A controller controls multiple job execution. Normally, only a single controller is provided, but multiple arrays can be implemented.

Our systems use and extend VLSI to provide a RISC processor system at nodes of the system with local and global memory at each processing element.

Our systems can run programs with data parallel coding, and can implement applications in Fortran, C and other high level languages for parallel processing.

A picket loads a small amount of an application code into its own PE memory. The execution can utilized runtime code supplied by a library function.

Our machines support data parallel and provide for branching and synchronization.

Within each PE or PME as a memory is supplied at each point, a processor can fetch from the same address SIMD style, or from individually chosen addresses, MIMD style.

A controller can and does broadcast blocks of instructions to our processing elements of an array. Replication, spreading, reduction and permutation functions can be executed.

An individual PME does broadcast to controller as needed for a process.

A node broadcast, a PME broadcast, is performed only one at a time can can be controlled by the controller.

The processor can be partitioned into groups.

The array processor system provides a way for routing messages among processors.

Memory address space of thousands of processors is provided. Each address space can be view as local to each element or as a global address for an entire array of processing elements.

The picket processor provides for conditional enables for autonomy of processing elements.

Conditional processing can be performed via a mask bit.

A mask bit allows an individual processing element to abstain from participation in a task.

Each processing element can assign itself to a partition and a partition can include from zero to all processing elements of the system. A processing element, processor memory element or picket can be in one or more partitions simultaneously.

The picket processor can contain thousands of computational processing nodes, one or more control processors, and I/O units that support mass storage, graphic display devices, and endless peripherals. Each processing node can be considered as a unit acting as a conventional node or as a mesh of individual processing memory elements, each providing a general purpose computer that can fetch and interpret its own instruction stream and process arrays of vectors.

A status funnel is used to indicate the end of an array process.

Global bit operations produce an logical OR of status for the controller for every participating processor.

Global operations can be synchronous or asynchronous, and used independently.

Grouping provides a group of elements for a partition.

Grouping of processing elements is done with a processing element or picket address that are assigned based upon hardware availability and failures which can occur.

And, as in our preferred embodiment, where many other features can be implemented, each node is a multiprocessor memory element node, and the nodes can be formed as RAM with inbuilt memory which controls the local memory and can also function as part of a distributed system.

This brief perspective is not intended to be limiting, but rather is intended to cause those skilled in the art to review the foregoing description and examine how the many inventions we have described which may be used to move the art of massively parallel systems ahead to a time when programming is no longer a significant problem and the costs of such systems are much lower. Our kind of system can be made available, not only to the few, but to many as it could be made at a cost within the reach of commercial department level procurements.

While we have described our preferred embodiments of our invention, it will be understood that those skilled in the art, both now and in the future, upon the understanding of these discussions will make various improvements and enhancements thereto which fall within the scope of the claims which follow. These claims should be construed to maintain the proper protection for the invention first disclosed.

What is claimed is:

1. An array processing system, comprising:

a plurality of processing elements interconnected as an array processor, each having a processor and a memory coupled to said processor, and wherein each of the processing elements selectively and autonomously executes an independent instruction stream on an independent multiple data stream, thereby providing for a MIMD mode; and a control processor that dispatches a series of single instructions to the plurality of processing elements, each of the single instructions operative to command the respective processing elements to execute respective multiple instruction streams on multiple independent data streams located one per processing element, each successive instruction of said single instructions being dispatched by said control processor in response to all of said processing elements accessing an instruction immediately preceding said each successive instruction;

wherein a first one of said processing elements which has completed execution of a multiple instruction stream in response to an instruction of said single instructions accesses and begins executing an immediately subsequent instruction of said single instructions after all other processing elements have read said instruction and before all other processing elements complete execution of respective multiple instruction streams in response to said instruction, whereby the processing elements execute the series of single instructions independently of a fixed time relationship between or among the processing elements with respect to accessing a subsequent single instruction before all processing elements have completed executing multiple instructions in response to a single instruction immediately precedent to said subsequent single instruction.

2. A computer system according to claim 1 wherein individual vector elements are processed in each processing element and vector instructions include various length formats.

3. A computer system according to claim 1 wherein said control processor provides instructions to said processing elements for manipulation of vectors of numbers.

4. A computer system according to claim 1 wherein said control processor provides instructions to said processing elements for manipulation of vectors of numbers, wherein the vectors are horizontal such that the numbers are, or the vectors are vertical such that an entire vector of numbers is contained in one processing element.

5. A computer system according to claim 1 wherein each processing element contains a vector of numbers and selectively executes instructions providing for vector operations including summing two vectors, subtracting a constant from each member of said vector, forming vector products, and vector reductions.

6. A computer system according to claim 1 wherein said control processor broadcasts vector commands to said processing elements.

7. An array processing system, comprising:

a plurality of processing elements interconnected as an array processor, each having a processor and a memory coupled to said processor, and wherein each of the processing elements selectively and autonomously executes an independent instruction stream on an independent multiple data stream, thereby providing for a MIMD mode;

a control processor that selectively dispatches a single instruction stream to the plurality of processing elements to command the processing elements to execute multiple independent instruction streams stored in respective processing elements on multiple independent data streams located one per processing element; and wherein said processing elements selectively execute a vector command broadcast by said control processor to provide for a vector operation on one or more vectors each having elements distributed in at least one of the processing elements, said vector command selected from a plurality of vector commands which include at least one command which results in a vector operation requiring coordination or direct communication among at least two processing elements to execute said vector operation.

8. The array processing system according to claim 7, wherein each of said processing elements executes a respective locally stored instruction in response to said vector command.

9. The array processing system according to claim 7, wherein each of said processing elements executes a respective locally stored sequence of instructions in response to said vector command.

10. The array processing system according to claim 7, wherein each of said processing elements executes a respective instruction in response to said vector command.

\* \* \* \* \*